(12) United States Patent
Wehlin et al.

(10) Patent No.: US 12,252,198 B2
(45) Date of Patent: Mar. 18, 2025

(54) MODULAR PIPE TRAVERSING APPARATUS

(71) Applicant: ARIX TECHNOLOGIES, INC., Jackson, LA (US)

(72) Inventors: Karl Petter Wehlin, Houston, TX (US); Bryan R. Duerfeldt, Houston, TX (US); Conner S. George, Houston, TX (US); Jakob R. Salazar, Houston, TX (US); Curtis Woods Belknap, Jr., Houston, TX (US); Gail Paulin Murray, Tomball, TX (US)

(73) Assignee: ARIX TECHNOLOGIES, INC., Houston, TX (US)

( * ) Notice: Subject to any disclaimer, the term of this patent is extended or adjusted under 35 U.S.C. 154(b) by 12 days.

(21) Appl. No.: 18/198,422

(22) Filed: May 17, 2023

(65) Prior Publication Data

US 2023/0373578 A1 Nov. 23, 2023

Related U.S. Application Data

(60) Provisional application No. 63/425,348, filed on Nov. 15, 2022, provisional application No. 63/342,840, filed on May 17, 2022.

(51) Int. Cl.
*B62D 61/10* (2006.01)
*B25J 5/00* (2006.01)
*F16L 55/00* (2006.01)

(52) U.S. Cl.
CPC ............ *B62D 61/10* (2013.01); *B25J 5/007* (2013.01); *F16L 55/00* (2013.01)

(58) Field of Classification Search
CPC ............ B25J 5/007; B62D 61/10; F16L 55/00
See application file for complete search history.

(56) References Cited

U.S. PATENT DOCUMENTS 5,698,854 A 12/1997 Gupta
7,656,997 B1 2/2010 Anjelly

FOREIGN PATENT DOCUMENTS

KR 101259494 B1 * 5/2013 ............ B25J 9/1674

OTHER PUBLICATIONS

International Search Report and Written Opinion in corresponding International PCT Application No. PCT/US2023/022497; Aug. 29, 2023; 12 pages.

* cited by examiner

*Primary Examiner* — Robert J McCarry, Jr.
(74) *Attorney, Agent, or Firm* — Greenberg Traurig, LLP; Todd C. Basile

(57) ABSTRACT

A robotic apparatus having first and second wheels with rollers coupled by a frame, third and fourth wheels with rollers circumferentially offset from the first and second wheels, and a clamping assembly coupled to the frame and configured to apply a force for urging the third and fourth wheels towards the pipe to secure the robotic apparatus thereon. Another robotic apparatus having first and second wheels with rollers on a first side of a pipe, third and fourth wheels with rollers on a second, opposing side of the pipe, and a clamping member coupling the first and second wheels to the third and fourth wheels and configured to apply a force for urging the wheels towards the pipe to secure the robotic apparatus thereon. The robotic apparatuses may have a modular design in which different sized clamping members/assemblies can be swapped out to accommodate pipes of different diameters.

17 Claims, 45 Drawing Sheets

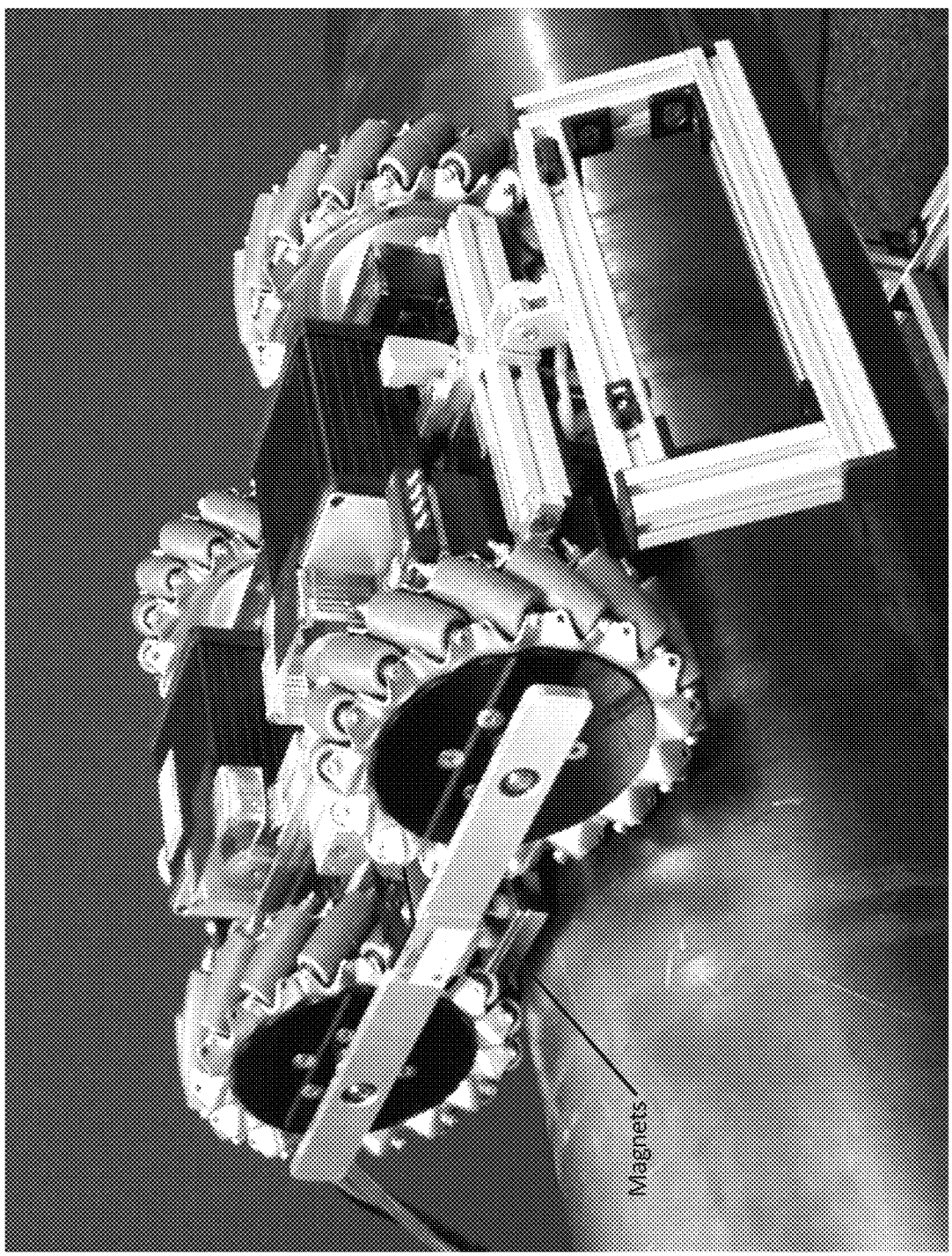
FIG. 1 – Prior Art

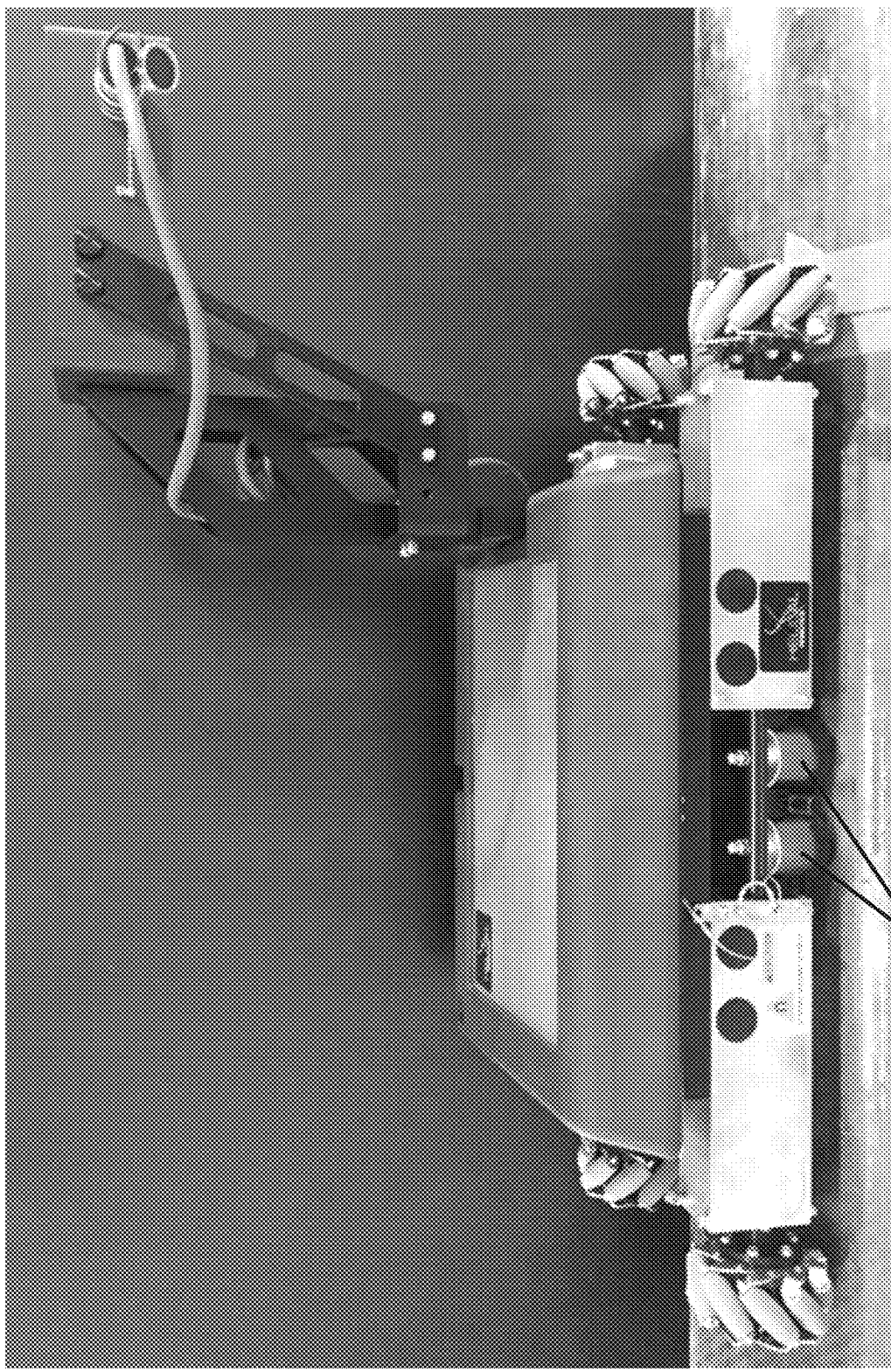
FIG. 2 – Prior Art

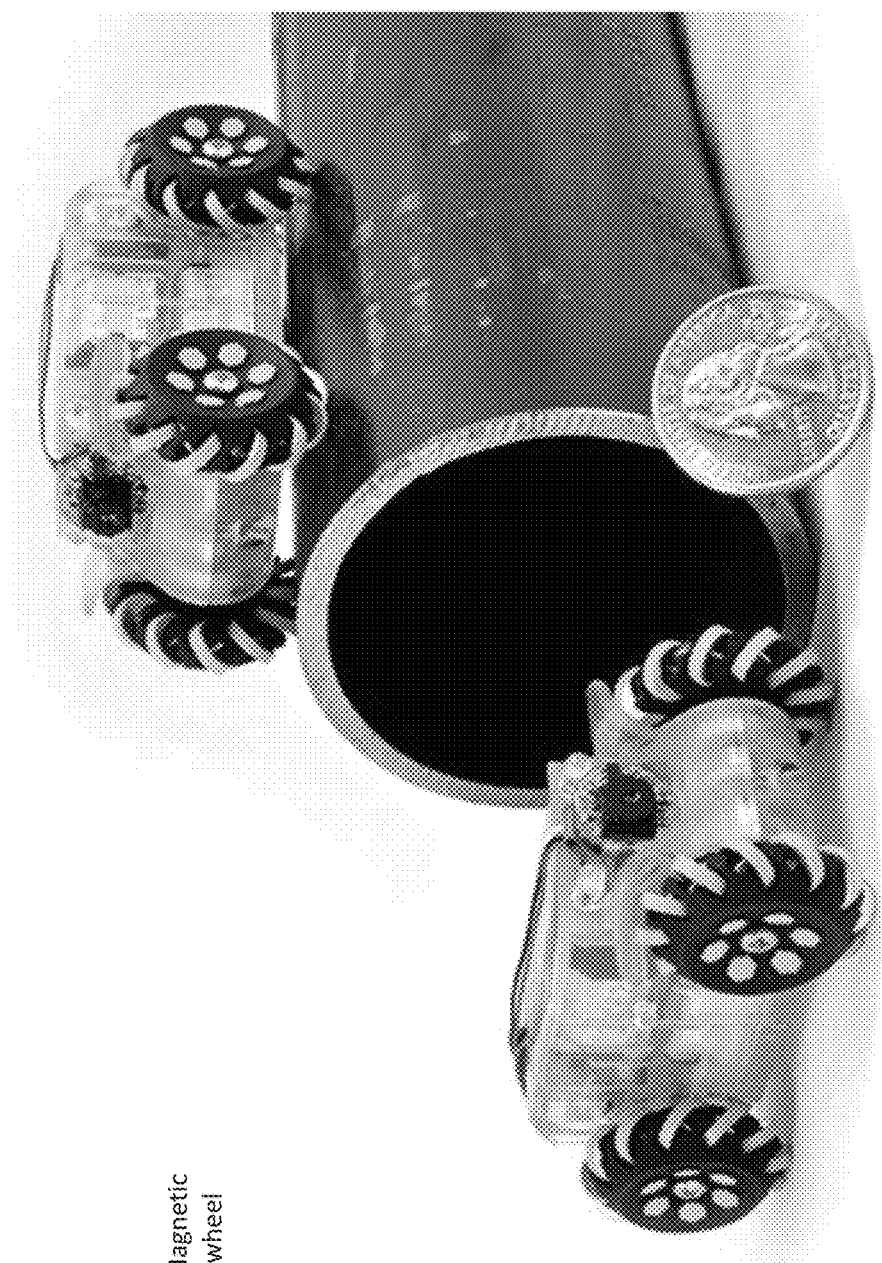
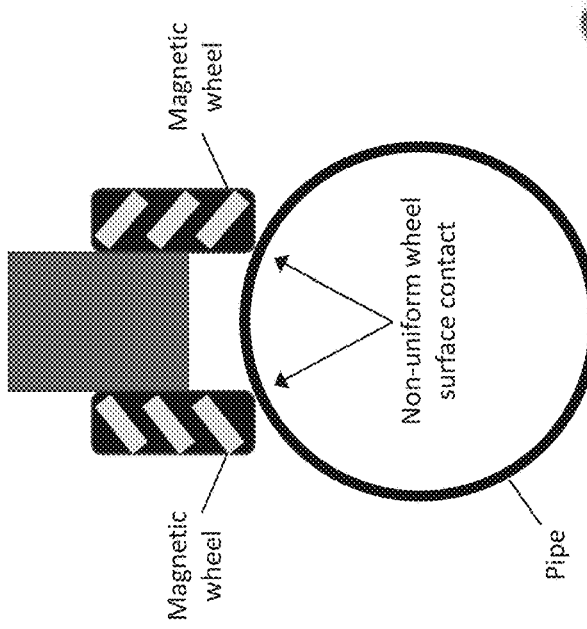
FIG. 3 – Prior Art

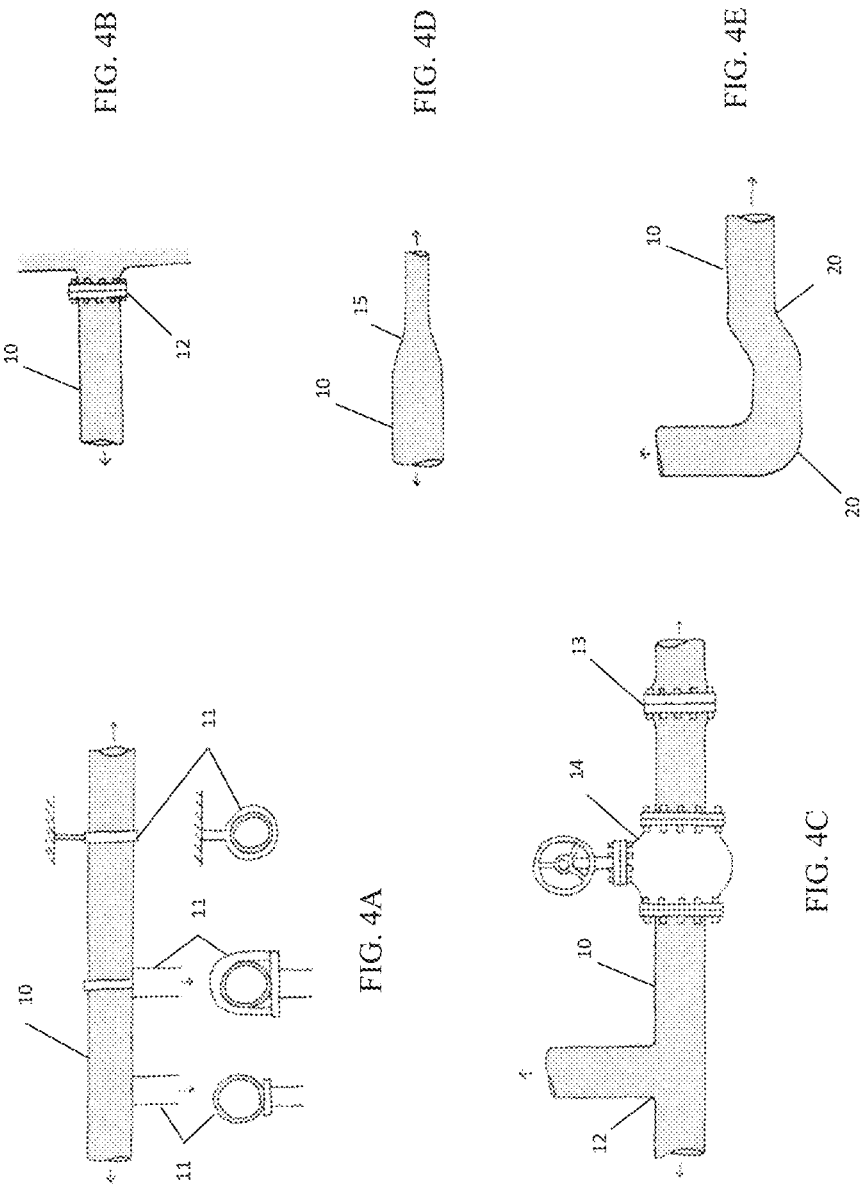

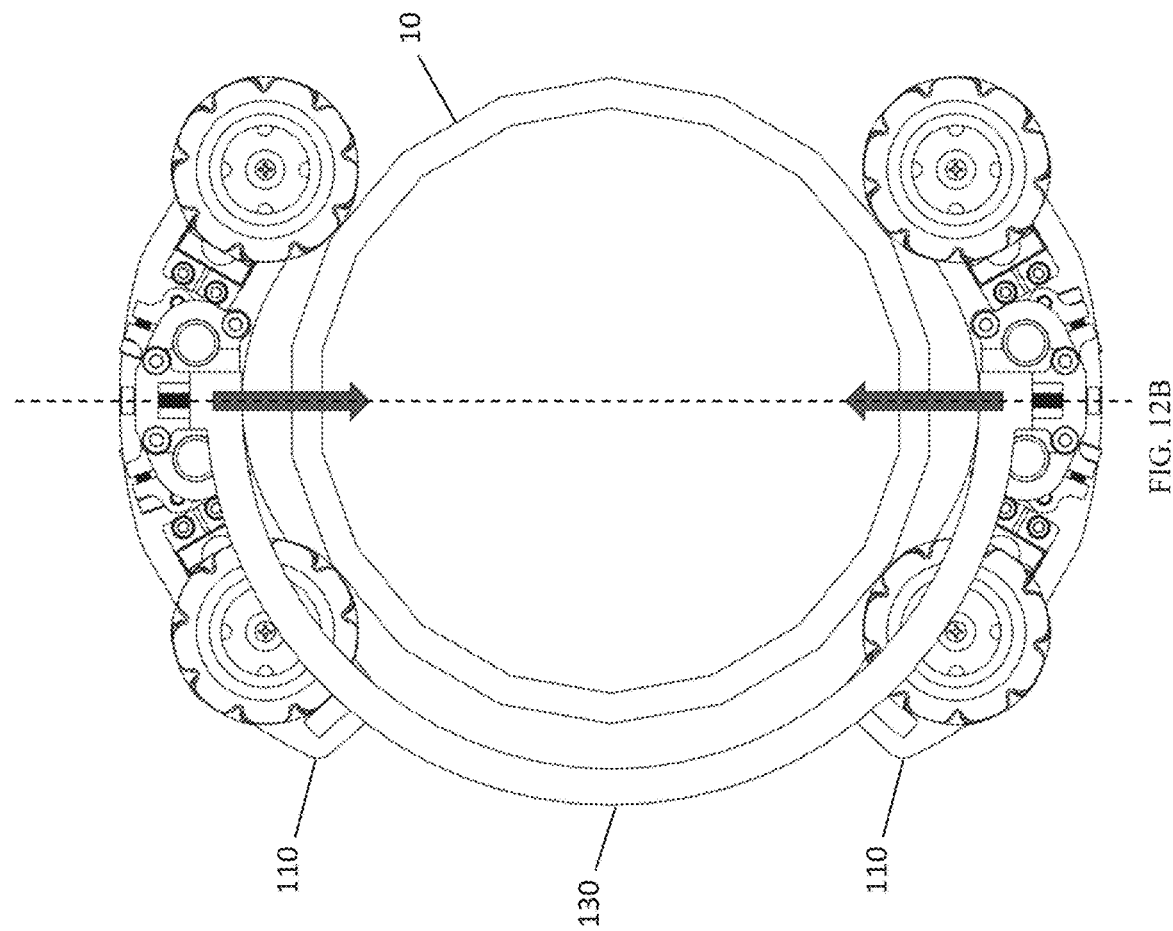
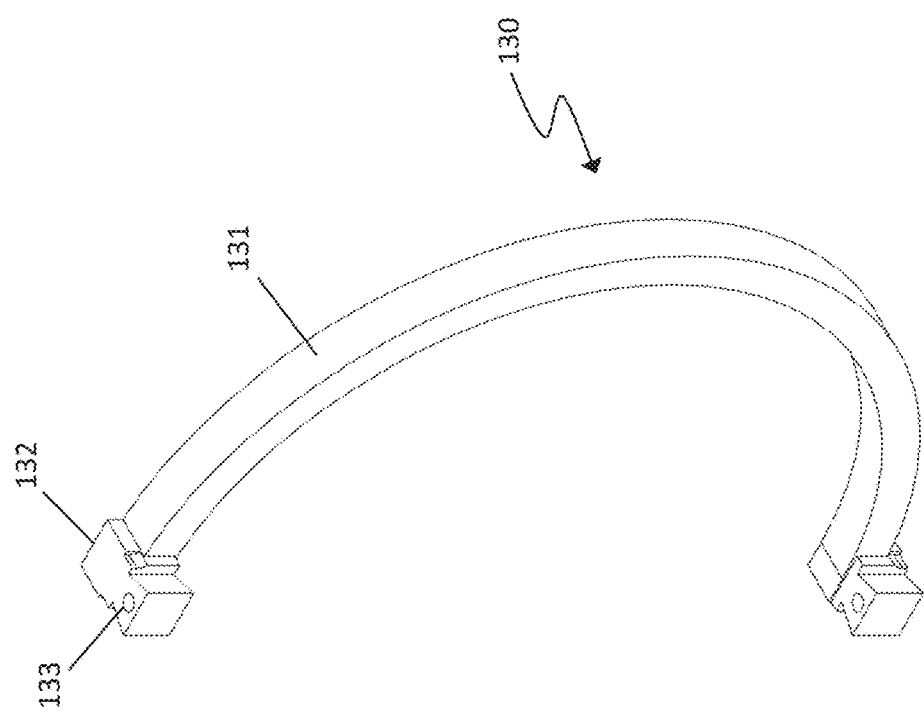
FIG. 12B
FIG. 12A

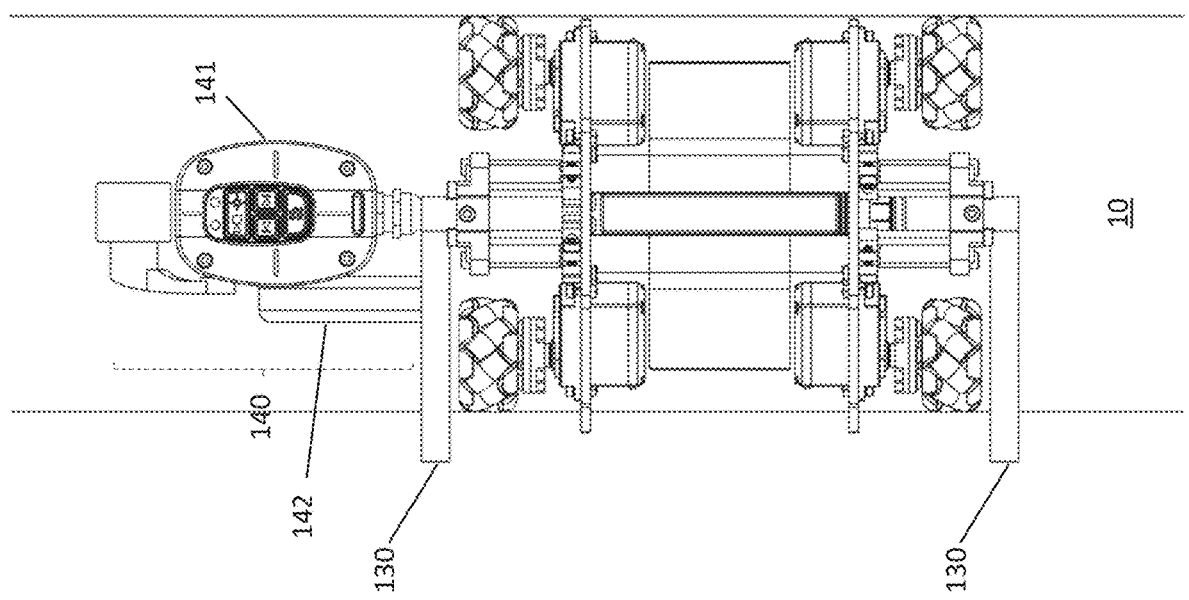

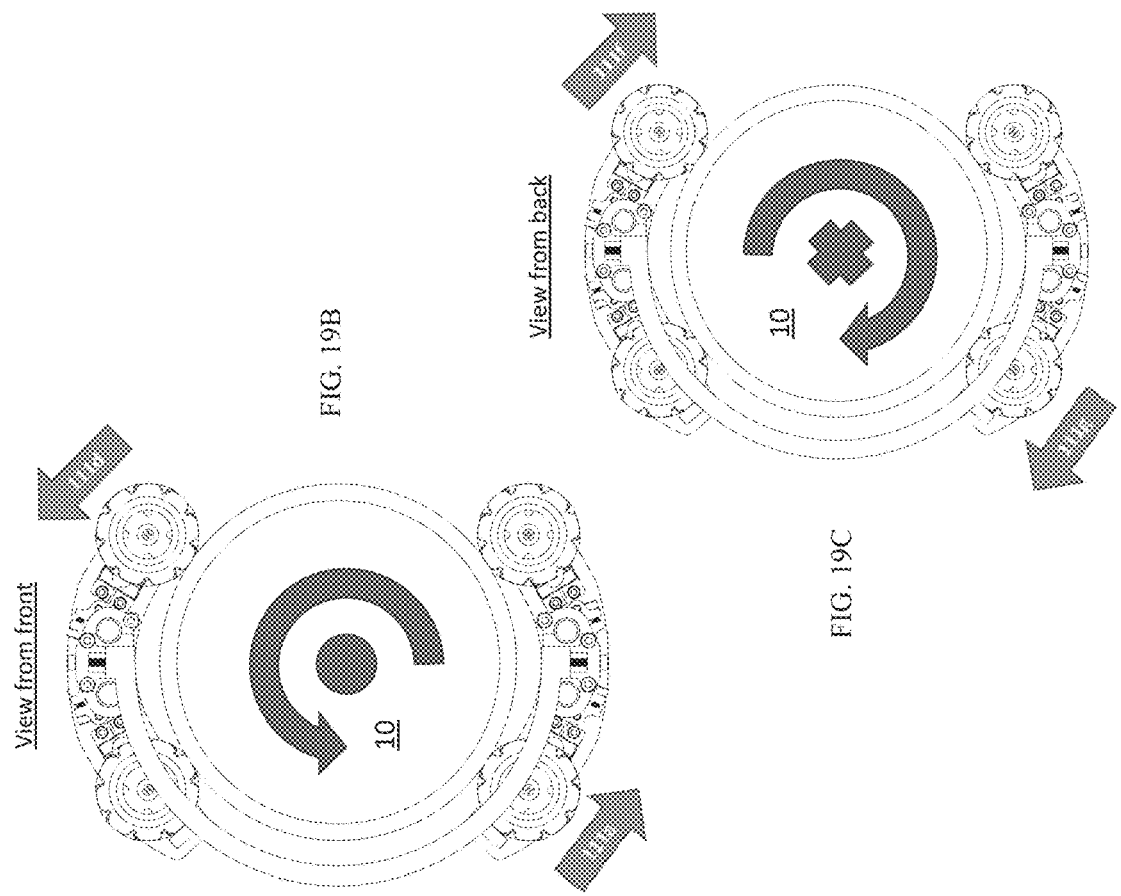
FIG. 19B
FIG. 19C
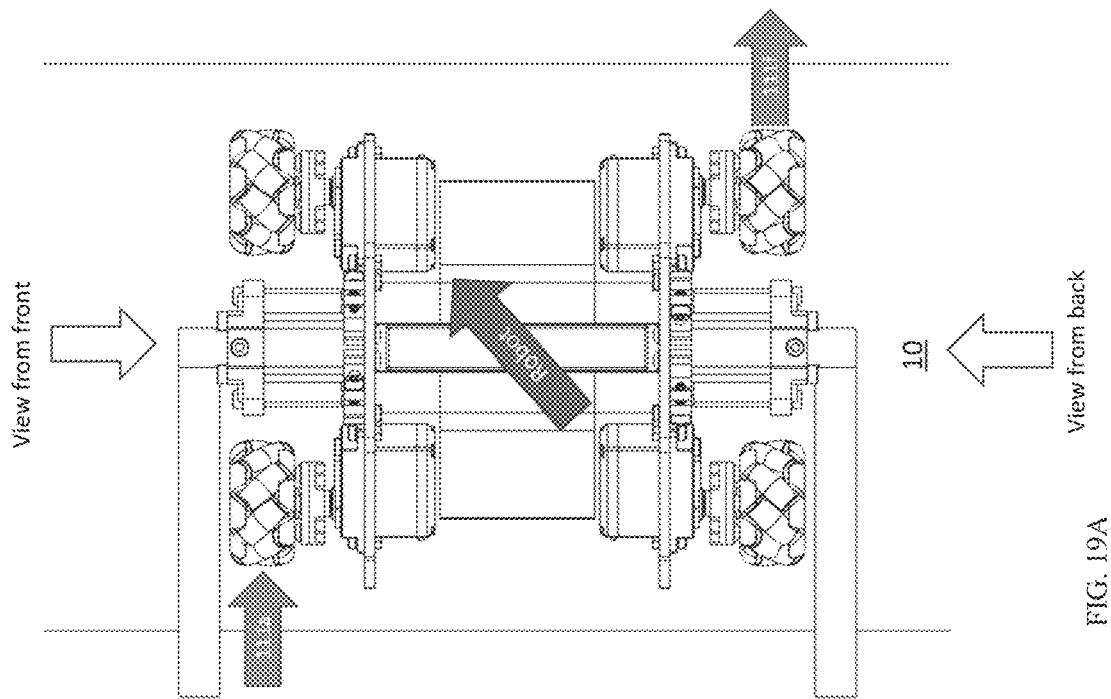
FIG. 19A

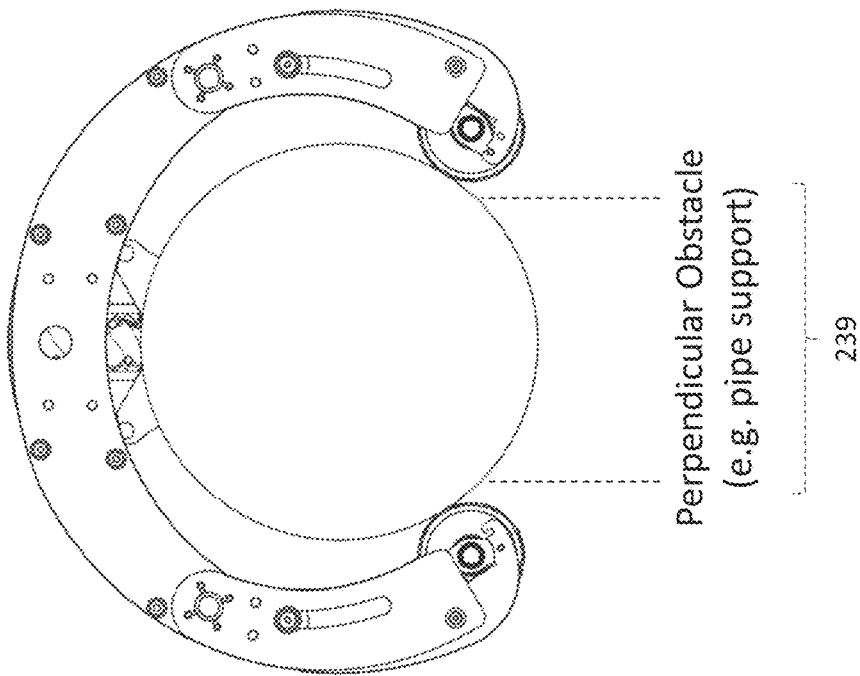
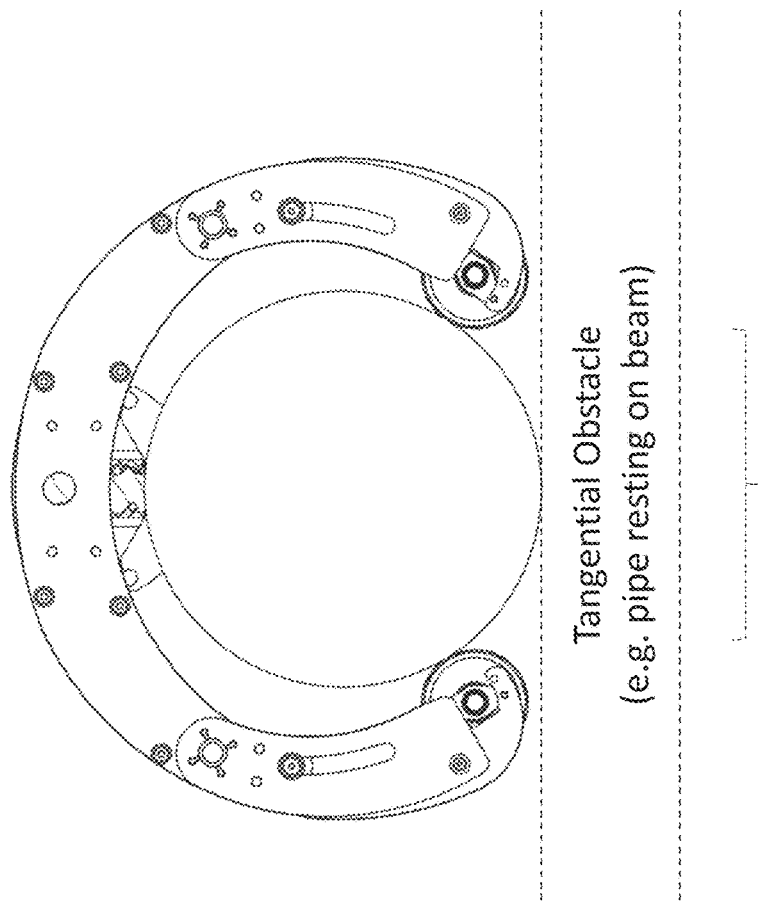
FIG. 28

MODULAR PIPE TRAVERSING APPARATUS

CROSS-REFERENCE TO RELATED APPLICATIONS

This application claims the benefit of and priority to U.S. Provisional Application No. 63/342,840, filed May 17, 2022, and U.S. Provisional Application No. 63/425,348, filed Nov. 15, 2022, each of which is hereby incorporated herein by reference in its entirety for all purposes.

BACKGROUND

Many existing pipe crawling apparatuses are designed to either travel inside of pipes or are not equipped to travel around obstacles it may encounter on the outside of pipes. In view of limitations of current technologies, a need remains for pipe-crawling apparatus that are effective in driving on horizontal and vertical pipes and navigating around and/or over potential obstacles—e.g., obstacles that present a change in the effective diameter of the pipe, a change in the effective curvature of the pipe, and/or obstacles that protrude from the pipe in one or more radial directions. More particularly, pipe-crawling apparatus are needed that are effective in navigating around and/or over flanges, valves, tees, bends, supports and the like.

In addition, a need remains for pipe-crawling apparatus that are effective in traveling relative to pipes without magnets, vacuum or aerodynamic forces. For example, with reference to FIG. 1, FIG. 2, and FIG. 3, many existing robots utilize magnets (shown) to remain attached to pipes. Reliance on magnets adds significant weight to the robot, which can increase power consumption since (i) stronger motors and more powerful batteries to move the robot along the pipe (both of which, in turn, add even more weight), and (ii) those robots utilizing electromagnets must use even more power to generate the additional magnetic force required to compensate for the added weight of the larger motors and batteries. Likewise, the added weight of the magnets themselves requires one to use an even larger magnet in order to generate enough magnetic force to keep the robot (including the weight of the magnet) secured to the pipe. Magnets also do not work well (or at all) on insulated pipes since the insulation creates a gap between the magnet and the metal pipe. Further, the added weight of magnets can make robots more difficult to transport and install on the pipes. Still further, the amount of magnetic force cannot be adjusted without swapping out one magnet for another, which can be time consuming and labor intensive when it comes to transporting additional magnets.

There is also a need for robots that can maintain substantially uniform contact with the pipe across the width of each wheel. For example, with reference to FIG. 3, many existing robots have wheels configured to spin about an axis perpendicular to the direction of travel, much like the wheels of a car. On the curved surface of a pipe, this causes the wheels to ride on their inside edges rather than contacting the pipe across the width of each wheel. This can lead to slippage and other negative conditions in operation.

Additionally, a need remains for pipe-crawling apparatus and associated systems that are effective in performing desired functions relative to the pipe itself, e.g., corrosion detection, wall thickness measurements, or based on travel along the path but independent of the pipe itself, e.g., imaging and/or sensing of locations accessible through travel along a pipe. These and other needs are advantageously satisfied by the apparatus and systems disclosed herein.

SUMMARY

The present disclosure is directed to a robotic apparatus for traversing an outer surface of a pipe. The robotic apparatus, in various embodiments, may include a first wheel and a second wheel coupled by a frame and configured to be positioned on an outer surface of a pipe, each wheel including a plurality of rollers disposed about a circumference of the wheel; a third wheel and a fourth wheel configured to be positioned on the outer surface of the pipe at locations circumferentially offset from the first wheel and the second wheel, each wheel including a plurality of rollers disposed about a circumference of the wheel; and a clamping assembly coupled to the frame, the clamping assembly coupling the third wheel and the fourth wheel and configured to apply a force for urging the third wheel and the fourth wheel towards the outer surface of the pipe for securing the robotic apparatus to the pipe. Each of the plurality of rollers on each wheel may be configured to freely rotate about a rotation axis of the respective roller.

In some embodiments, an axis of rotation of each of the first and second wheels are each configured to be perpendicular to a longitudinal axis of the pipe when the robotic apparatus is secured to the pipe. The first and second wheels of such an embodiment may be configured to contact the outer surface of the pipe at different longitudinal positions along a length of the pipe and be aligned at a common circumferential position along the outer surface of the pipe when positioned on the surface of the pipe.

In some embodiments, an axis of rotation of each of the first and second wheels are each configured to be parallel to a longitudinal axis of the pipe when the robotic apparatus is secured to the pipe. The first and second wheels of such an embodiment may be configured to contact the outer surface of the pipe at a common longitudinal position along a length of the pipe and at different circumferential positions about a circumference of the outer surface of the pipe when positioned on the surface of the pipe.

The first and second wheels, in various embodiments, may be configured to contact a first one-third portion of the circumference of the outer surface of the pipe, and the third wheel and the fourth wheel may be configured to contact second and third one-third portions of the circumference of the outer surface of the pipe, respectively.

In some embodiments, an axis of rotation of the third and fourth wheels are configured to be parallel to a longitudinal axis of the pipe when the robotic apparatus is secured to the pipe, while in other embodiments, an axis of rotation of the third and fourth wheels are configured to be perpendicular to a longitudinal axis of the pipe when the robotic apparatus is secured to the pipe.

The clamping assembly, in various embodiments, may include a static member rigidly attached to the frame, and a first articulating arm member having a proximal end rotatably coupled to the static member and a second articulating arm member having a proximal end rotatably coupled to the static member, wherein the first articulating arm member and the second articulating arm member are configured to extend around opposing sides of the pipe. The third wheel may be coupled to a distal end of the first articulating member and the fourth wheel may be coupled to a distal end of the second articulating member. In various embodiments, the clamping member may further include one or more biasing members configured to generate moments on the first articulating arm member and the second articulating arm member about their respective rotatable couplings with the static member for urging the third wheel and the fourth wheel towards the outer surface of the pipe for securing the robotic apparatus to the pipe. In various embodiments, the frame may be configured to position the first and second wheels on a first one-third portion of the circumference of the outer surface of the pipe, and a length of the first articulating arm member and a length of the second articulating arm member may be configured to position the third wheel and the fourth wheel on second and third one-third portions of the circumference of the outer surface of the pipe, respectively. In some embodiments, a length of the first articulating arm member and a length of the second articulating arm member may be configured to be adjusted so as to adjust a position of the third wheel and a position of the fourth wheel on the outer surface of the pipe.

In various embodiments, an axis of rotation of the first and second wheels may be configured to be perpendicular to a longitudinal axis of the pipe when the robotic apparatus is secured to the pipe, and an axis of rotation of the third and fourth wheels may be configured to be parallel to a longitudinal axis of the pipe when the robotic apparatus is secured to the pipe.

The first and second wheels, in various embodiments, may be configured to contact the outer surface of the pipe at different longitudinal positions along a length of the pipe and be aligned at a common circumferential position along the outer surface of the pipe when positioned on the surface of the pipe, and an axis of rotation of the third and fourth wheels may be configured to be parallel to a longitudinal axis of the pipe when the robotic apparatus is secured to the pipe. In some embodiments, the first and second wheels may be configured to contact a first one-third portion of the circumference of the outer surface of the pipe, and the third wheel and the fourth wheel may be configured to contact second and third one-third portions of the circumference of the outer surface of the pipe, respectively.

Robotic apparatus, in various embodiments, may further include a fifth wheel and a sixth wheel configured to be positioned on an outer surface of the pipe at locations circumferentially offset from the first wheel and the second wheel, and a second clamping assembly configured to apply a force for urging the fifth wheel and the sixth wheel towards the outer surface of the pipe for securing the robotic apparatus to the pipe.

In various embodiments, the first wheel, the second wheel, and the frame may define a first module; the third wheel, the fourth wheel, and the clamping assembly may define a second module; and the clamping assembly of the second module may be removably coupled to the frame of the first module. The clamping assembly, in various embodiments, may include first and second articulating arm members configured to extend around opposing sides of the pipe, and the third wheel may be coupled to a distal end of the first articulating arm member and the fourth wheel may be coupled to a distal end of the second articulating arm member. A length of the first articulating arm member and a length of the second articulating arm member, in some embodiments, may be configured to be adjusted so as to adjust a position of the third wheel and a position of the fourth wheel on the outer surface of the pipe.

The robotic apparatus, in various embodiments, may further include a third module configured to removably couple to the first module. The third module may include a fifth wheel and a sixth wheel configured to be positioned on an outer surface of a second pipe having a different diameter than that of the pipe at corresponding circumferential locations on the outer surface of the second pipe as those on the outer surface of the first pipe; and a second clamping assembly configured to apply a force for urging the fifth wheel and the sixth wheel towards the outer surface of the pipe for securing the robotic apparatus to the pipe. The second module may be configured to be detached from the first module, and the third module may be configured to be removably attached to the first module so as to accommodate the diameter of the second pipe.

Additionally or alternatively, the robotic apparatus, in various embodiments, may include a third module removably attached to the first module, the third module including a fifth wheel and a sixth wheel configured to be positioned on an outer surface of the pipe at locations circumferentially offset from the first wheel and the second wheel, each wheel including a plurality of rollers disposed about a circumference of the wheel; and a second clamping assembly configured to apply a force for urging the fifth wheel and the sixth wheel towards the outer surface of the pipe for securing the robotic apparatus to the pipe. In an embodiment, the second module may be removably attached to a first end of the first module and the third module may be removably attached to a second, opposing end of the first module.

The first module, in various embodiments, may further comprise a seventh wheel and an eighth wheel, each wheel including a plurality of rollers disposed about a circumference of the wheel. In some embodiments, the seventh wheel and the eighth wheel may be configured to be positioned on the outer surface of the pipe at positions axially offset from the positions of the first wheel and the second wheel. In an embodiment, the seventh wheel and the eighth wheel are also aligned at a common circumferential position with the first wheel and the second wheel.

In another aspect, the present disclosure is directed to another robotic apparatus configured for traversing an outer surface of a pipe. The robotic apparatus, in various embodiments, may include a first wheel and a second wheel configured to be positioned on an outer surface of a pipe on a first side of the pipe, each wheel including a plurality of rollers disposed about a circumference of the wheel; a third wheel and a fourth wheel configured to be positioned on the outer surface of the pipe on a second, circumferentially opposing side of the pipe, each wheel including a plurality of rollers disposed about a circumference of the wheel; and a clamping member coupling the first and second wheels with the third and fourth wheels, the clamping member being configured to apply a force for urging the first, second, third, and fourth wheels towards an outer surface of the pipe for securing the robotic apparatus to the pipe. Each of the plurality of rollers on each of the wheels may be configured to freely rotate about a rotation axis of the respective roller.

The first wheel and the second wheel, in various embodiments, may be configured to be axially offset from one another when positioned on the first side of the pipe, while in other embodiments, the first wheel and the second wheel, in various embodiments, may be configured to be circumferentially offset from one another when positioned on the first side of the pipe. Likewise, the third wheel and the fourth wheel, in various embodiments, may be configured to be axially offset from one another when positioned on the second side of the pipe, while in other embodiments, the third wheel and the fourth wheel may be configured to be circumferentially offset from one another when positioned on the second side of the pipe. The third and fourth wheels, in an embodiment, may be circumferentially offset by about 180 degrees from the first and second wheels on the outer surface of the pipe.

In various embodiments, each of the first, second, third, and fourth wheels may be oriented such that each has substantially uniform contact with the outer surface of the pipe across an entire width of each wheel. In one such embodiment, each of the first, second, third, and fourth wheels may be configured to be parallel to a longitudinal axis of the pipe when the robotic apparatus is secured to the pipe.

The first wheel and the second wheel, in various embodiments, may be coupled to one another by a first structure configured for supporting and positioning the first and second wheels, and a first end of the clamping member may be coupled to the first structure. The third wheel and the fourth wheel may be coupled to one another by a second structure configured for supporting and positioning the third and fourth wheels, and a second end of the clamping member is coupled to the second structure. In some embodiments, the first end of the clamping member may be configured to removably couple to the first structure, and the second end of the clamping member may be configured to removably couple to the second structure In various embodiments, a first end of the clamping member may be configured for supporting and positioning the first and second wheels, and a second end of the clamping member may be configured for supporting and positioning the third and fourth wheels. The first end of the clamping member may be configured to removably couple to the first and second wheels, and the second end of the clamping member may be configured to removably couple to the third and fourth wheels.

The robotic apparatus, in various embodiments, may further include a second clamping member configured to couple the first and second wheels with the third and fourth wheels, the second clamping member having at least one dimension or stiffness characteristic differing from that of the clamping member. The clamping member may be configured to be decoupled from the first, second, third, and fourth wheels, and the second clamping member may be configured to be removably coupled to the first, second, third, and fourth wheels so as to accommodate a different sized pipe and/or to adjust the force for the first, second, third, and fourth wheels towards the outer surface of the pipe for securing the robotic apparatus to the pipe. The clamping member, in various embodiments, may be configured to extend around a first portion of a circumference of the pipe, the first portion being less than the full circumference of the pipe, such that the robotic apparatus has an open side through which an obstacle extending from the pipe may pass unobstructed.

The robotic apparatus, in various embodiments, may further include a mechanism configured to adjust the force for urging the first, second, third, and fourth wheels towards an outer surface of the pipe for securing the robotic apparatus to the pipe. Additionally or alternatively, the robotic apparatus, in various embodiments, may include a mechanism configured to adjust a length of the clamping member so as to accommodate a different sized pipe.

The robotic apparatus, in various embodiments, may further include a fifth wheel and a sixth wheel, each including a plurality of rollers disposed about a circumference of the respective wheel, the fifth and sixth wheels being coupled to the first and second wheels and being configured to be positioned on the outer surface of the first side of the pipe; and a seventh wheel and an eighth wheel, each including a plurality of rollers disposed about a circumference of the respective wheel, the seventh and eighth wheels being coupled to the third and fourth wheels and being configured to be positioned on the outer surface of the second side of the pipe. In some embodiments, the first and second wheels may be circumferentially offset from one another, the fifth and sixth wheels may be circumferentially offset from one another, and the fifth and sixth wheels may be axially offset from the first and second wheels; and the third and fourth wheels may be circumferentially offset from one another, the seventh and eighth wheels may be circumferentially offset from one another, and the seventh and eighth wheels may be axially offset from the third and fourth wheels. The robotic apparatus, in some embodiments, may further include a second clamping member coupling the first, second, fifth, and sixth wheels with the third, fourth, seventh, and eight wheels, the second clamping member having the same dimensions and stiffness characteristics as the clamping member.

BRIEF DESCRIPTION OF THE DRAWINGS

Illustrative, non-limiting example embodiments will be more clearly understood from the following detailed description taken in conjunction with the accompanying drawings.

FIG. 1, FIG. 2, and FIG. 3 illustrate existing robots that utilize magnets to remain attached to pipes;

FIG. 4A, FIG. 4B, FIG. 4C, FIG. 4D, and FIG. 4E illustrate representative obstacles on or near a pipe;

FIG. 12A is a perspective view of a clamping member of a robotic apparatus, in accordance with an embodiment of the present disclosure;

FIG. 12B illustrates a clamping member having a semicircular shape and sized such that its ends are positioned at directly opposing circumferential positions about a pipe, in accordance with an embodiment of the present disclosure;

FIG. 16 illustrates a robotic apparatus including a sensor assembly, in accordance with an embodiment of the present disclosure;

FIG. 19A, FIG. 19B, and FIG. 19C illustrate a combination of motions suitable for causing a robotic apparatus to travel forward at a 45 degree angle with respect to the axis of a pipe that turns in a counter-clockwise direction as viewed from the front, in accordance with an embodiment of the present disclosure;

FIG. 28 illustrates how an open side of a robotic apparatus can allow the robotic apparatus to pass various obstacles on a pipe, in accordance with an embodiment of the present disclosure;

DETAILED DESCRIPTION

Figure 5B:
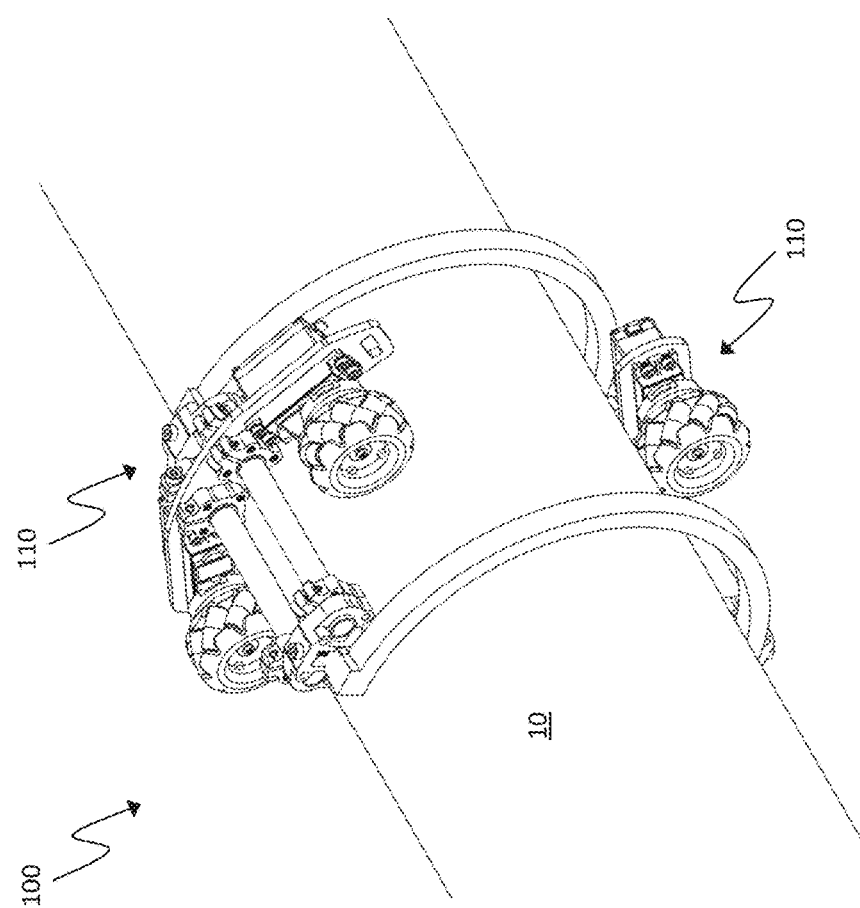
FIG. 5B illustrates the robotic apparatus of FIG. 5A secured to a pipe, in accordance with an embodiment of the present disclosure.

Embodiments of the present disclosure are directed to a robotic apparatus for traversing the exterior of piping systems, such as ones commonly found in chemical plants, power plants, manufacturing plants, and infrastructure. Piping systems can be complex and present various obstacles that can make it difficult to traverse individual pipes in an efficient and effective manner. For example, as shown in FIG. 4A, FIG. 4B, FIG. 4C, FIG. 4D, and FIG. 4E, representative obstacles may include supports 11 (FIG. 4A), junctions 12 (FIG. 4B and FIG. 4C), flanges 13 (FIG. 4C), valves 14 (FIG. 4C), vents or bleeders (similar to smaller valves), changes in diameter 15 (FIG. 4D), and bends 16 (FIG. 4E), amongst others such as nearby pipes and other nearby structures (later shown in FIG. 21 and FIG. 22A, FIG. 22B, FIG. 22C, FIG. 22D, and FIG. 22E). Various embodiments of the robotic apparatus may be configured to traverse pipes 10 and navigate such obstacles as encountered through a unique architecture and approach, as later described in more detail. The robotic apparatus may also be adapted to traverse the exterior of other structures that are similarly shaped, such as structural cables (e.g. on suspension bridges), structural beams, powerlines, underwater cables and underwater piping systems.

Embodiments of the present disclosure may be useful in many applications including, without limitation:

Pipeline inspection using cameras, non-destructive testing (NDT or NDI), or other sensors;

Inspecting equipment in the vicinity of the piping system

Performing maintenance on the piping system (e.g., cleaning the external surface, removing insulation, applying a patch/clamp to stop a leak)

Transporting tools or equipment along the piping system (e.g., facilitating installation of sensors on the pipe).

Various embodiments of the robotic apparatus may be capable of traversing pipes arranged in any orientation (including horizontal and vertical), and pipes made of any material (e.g., steel, aluminum), even those with insulation about the exterior of the pipe. Insulation is typically a semi-rigid material, such as a mineral wool or calcium silicate, protected by a thin metal jacket, such as aluminum or stainless steel. For clarity, the outer surface of any insulation on the exterior of a pipe may, for simplicity, be referred to as the outer surface of the pipe. As such, references herein to the robotic apparatus being positioned on, secured to, contacting, or otherwise interfacing with the outer surface of a pipe should not be strictly construed as referring only to interfacing with the metal exterior of the pipe under such insulation, but rather may additionally or alternatively encompass the robotic apparatus being positioned on, secured to, contacting, or otherwise interfacing with the outer surface of the insulation on the exterior of the pipe. Simply stated, references to the outer surface of the pipe should be construed as the outer surface of insulation on the pipe when discussing the robotic apparatus in the context of traversing insulated pipes.

Generally speaking, embodiments of the robotic apparatus of the present disclosure may attach to a pipe by applying a clamping force on opposing sides of the pipe. Various embodiments may be capable of holding a static position on the pipe and may support its own weight on a range of pipe sizes in any orientation (e.g., horizontal or vertical). The robotic apparatus, in various embodiments, may be configured to drive along paths in the longitudinal direction of the pipe (sometimes referred to herein as axial translation), in a circumferential direction on the pipe (sometimes referred to herein as circumferential translation), along a helical path (i.e., a combination of circumferential and longitudinal vectors), and various combinations thereof, on pipes of varying sizes and orientation. Such maneuvering, in combination with the ability to expand or contract the clamping arm around the pipe, and the robots low-profile and open-sided architecture, may allow the robotic apparatus to navigate a variety of bends and obstacles encountered along the length of the pipe. A low profile of the robotic apparatus may enable it to drive along pipes in close proximity to other pipes or obstacles situated close by. The robotic apparatus may additionally be capable of actively controlling the amount of clamping force it exerts on the pipe, thereby allowing the robot to selectively apply more clamping force in situations where additional traction is desired (e.g., while climbing or remaining stationary a vertical pipe) and selectively apply less clamping force in situations where less traction is desired (e.g., while traversing a horizontal pipe), which can help reduce power consumption and thus battery size, motor size, and associated weight. Active control of clamping force can also help ensure that the robotic apparatus does not damage the pipe or insulation. Further, the robotic apparatus may be capable of actively sensing whether the wheels slip on the pipe surface and actively control individual wheels to steer the robotic apparatus back to the centerline of the pipe.

The robot, in various embodiments, may have a modular architecture in which various components can be added, removed, or replaced with similar components having different properties. Such modularity can allow the robotic apparatus to be reconfigured in the field as needed to adapt to different operating conditions, such as for operation on pipes of varying sizes (diameter) and orientations (e.g., horizontal, vertical), and to carry different payloads (e.g., inspection sensors, batteries).

In various embodiments, the robotic apparatus may be configured to carry and deploy a payload along the pipe, such as cameras (e.g. visual spectrum and IR cameras), various sensors like NDT sensors (e.g., ultrasonic testing probes, pulsed eddy current probes, digital radiography equipment, acoustic sensors) and gas monitors for the purpose of inspecting the piping system or equipment in its vicinity, and/or other payloads like tools and equipment. The robotic apparatus, in various embodiments, may include an onboard power supply (e.g., batteries) and operate via wireless communication with an operator, thereby obviating the need for a power cord or tether. Of course, in various embodiments, the robotic apparatus may utilize a power cord (or other suitable power source) and/or wired communication (or other suitable communications means). Such a configuration may be advantageous in certain cases, such as if one or more components of a particular payload (e.g., an NDT instrument) is too large to be carried onboard while maintaining the robot's low profile as described herein. In such an example, the NDT probe could be located onboard the robotic apparatus and connected to the NDT instrument on the ground with the operator via a power cord and/or tether.

Robotic Apparatus 100

High-Level Architecture

Figure 5A:
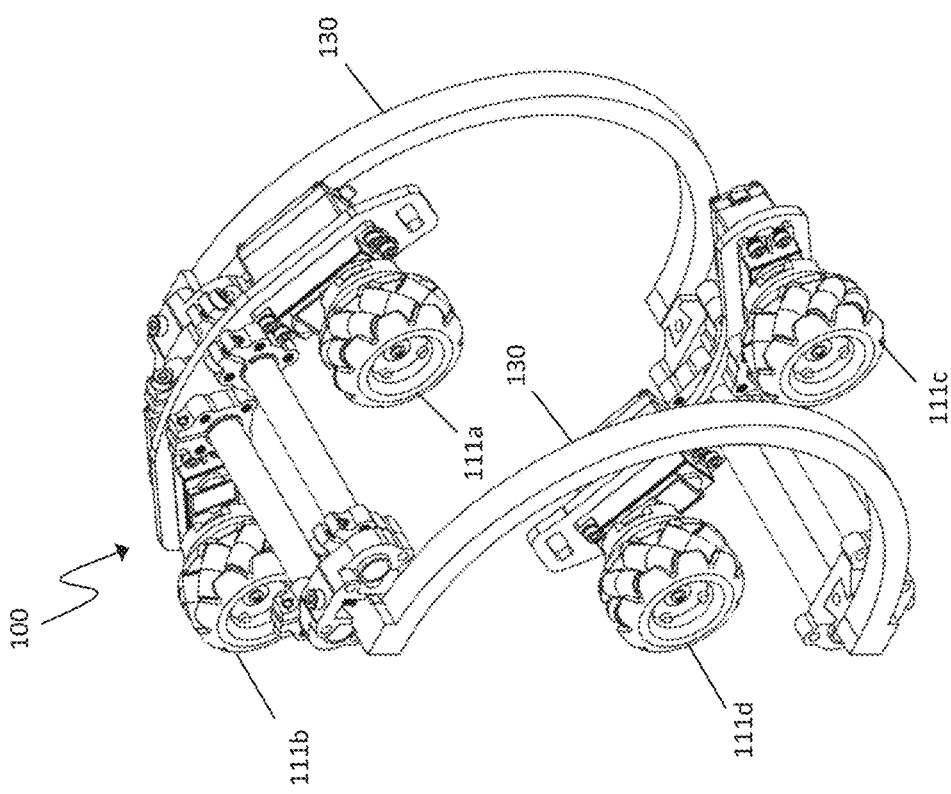
FIG. 5A is a perspective view of a robotic apparatus, in accordance with an embodiment of the present disclosure.

FIG. 5A is a perspective view of a representative embodiment of robotic apparatus 100. Robotic apparatus 100, in various embodiments, may generally include four or more wheels 111 having a plurality of rollers 112 disposed about a circumference thereof. Wheels 111 can rotate (freely or under power) much like a traditional wheel, and the rollers 112 on each wheel 111 may freely rotate about their respective rotation axes on the main wheel portion itself. Generally speaking, rollers 112 allow a respective wheel 111 to slide laterally or with a lateral vector component (depending on an orientation of the rollers 112 about the circumference of wheel 111) on the surface of pipe 10 with minimal friction when the robotic apparatus 100 is moving in a direction not fully aligned with the direction of rotation of the respective wheel 111. In some embodiments, rollers 112 have rotation axes perpendicular to the main axis of rotation of the main wheel portion (not shown), while in other embodiments, rollers 112 may have rotation axes that are angled relative to the main axis of rotation of the main wheel portion (e.g., at 45 degrees as shown). Sometimes referred to as poly wheels, omni wheels, or mecanum wheels, such wheels 111 having rollers 112 are generally known in the art and the present disclosure should not be limited to any particular embodiment thereof unless specified exclusively. Even when a particular embodiment is specified (e.g., wheels with mirrored 45 degree angle rollers), one of ordinary skill in the art will recognize alternative configurations suitable for producing the same motion on pipe 10.

In various embodiments, the diameter of wheels 111 may be chosen based on the size of certain obstacles encountered on the surface of the pipe. Generally speaking, it may be preferable to use a large enough wheel 111 to drive over such obstacles, but no larger, so as to minimize the amount of clearance needed around pipe 10 in order for robotic apparatus 100 to travel. The diameter necessary to drive over such obstacles can vary based on many factors (e.g., traction, torque, speed), but testing has shown that diameters twice the height of such obstacles are sufficient. One having ordinary skill in the art will be able to select an appropriate wheel diameter based on the teachings of the present disclosure without undue experimentation.

Robotic apparatus 100, in various embodiments, may generally include four wheels 111, with half of the wheels 111 (e.g., first and second wheels 111a, 111b in the four-wheeled embodiment shown) configured to be positioned on a first side of pipe 10 and half of the wheels 111 (e.g., third and fourth wheels 111c, 111d in the four-wheeled embodiment shown) configured for positioning on a second, opposing side of pipe 10. For clarity, unless otherwise specified herein, the terms "first side" and "second, opposing side" of a pipe both refer to the exterior surface of the pipe (or insulation thereon, if the pipe is insulated) and, more specifically, to circumferentially-opposing halves thereof.

Wheels 111a, 111b and wheels 111c, 111d, in various embodiments, may be grouped onto separate drive platforms 110a, 110b (shown, but not labeled), especially in modular embodiments of robotic apparatus 100, as later described in more detail. One or more clamping members 130 (two shown here) may couple the first and second wheels 111a, 111b with the third and fourth wheels 111c, 111d and be configured to apply a force for urging the first, second, third, and fourth wheels 111 towards an outer surface of the pipe 10 for securing the robotic apparatus 100 to the pipe 10. FIG. 5B illustrates the robotic apparatus 100 of FIG. 5A secured to pipe 10.

Figure 6B:
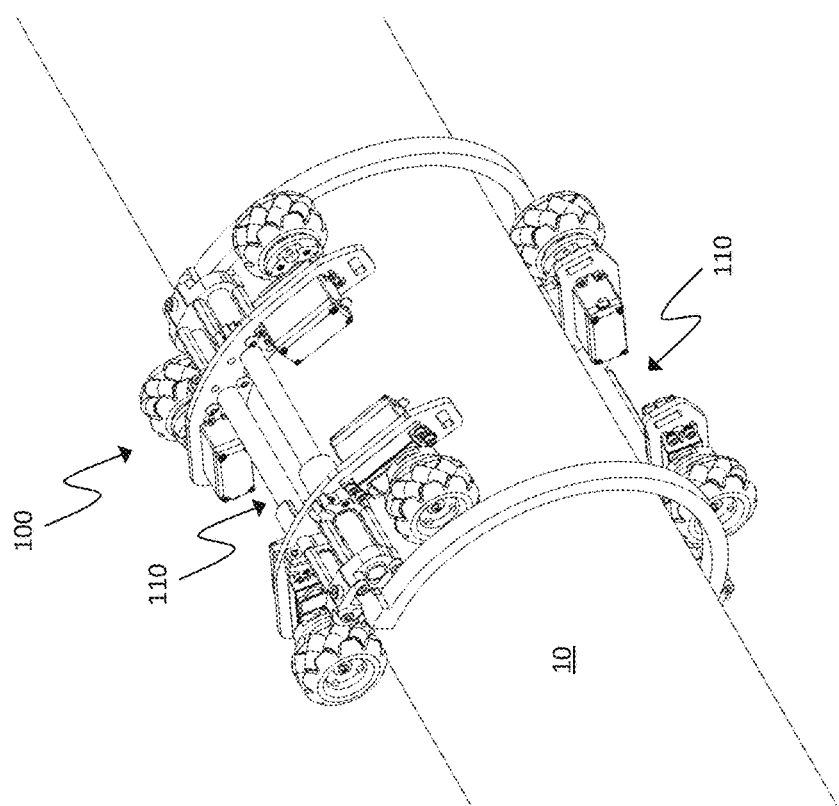
FIG. 6B illustrates the robotic apparatus of FIG. 6A secured to a pipe, in accordance with an embodiment of the present disclosure.
Figure 6A:
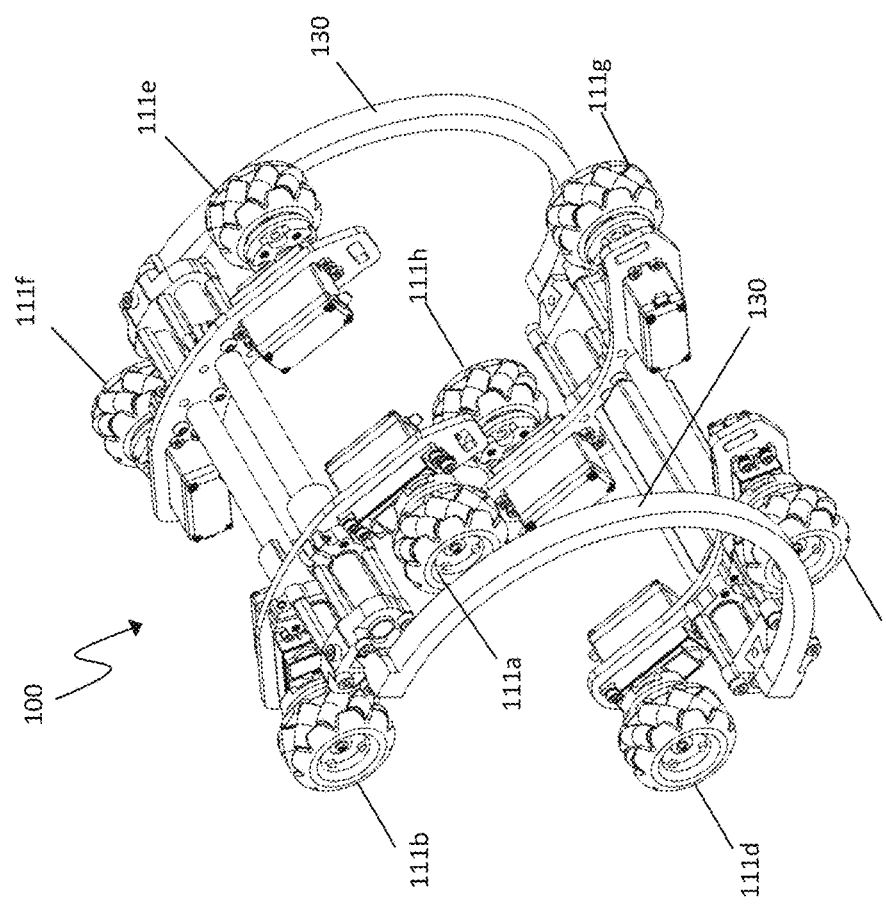
FIG. 6A is a perspective view of another robotic apparatus, in accordance with an embodiment of the present disclosure.

FIG. 6A is a perspective view of another representative embodiment of robotic apparatus 100. In this representative embodiment, robotic apparatus 100 includes eight wheels 111, with (i) first and second wheels 111a, 111b and fifth and sixth wheels 111e, 111f configured to be positioned on a first side of pipe 10 and (ii) second and third wheels 111c, 111d and seventh and eighth wheels 111g, 111h configured to be positioned on a second, opposing side of pipe 10. Wheels 111a, 111b, 111e, 111f and wheels 111c, 111d, 111g, 111h, in various embodiments, may be grouped onto separate drive platforms 110a, 110b (shown, but not labeled), especially in modular embodiments of robotic apparatus 100, as later described in more detail. One or more clamping members 130 (two shown here) may couple the first, second, fifth, and sixth wheels 111a, 111b, 111e, 111f with the third, fourth, seventh, and eighth wheels 111c, 111d, 111g, 111h and be configured to apply a force for urging the wheels 111 towards the outer surface of the pipe 10 for securing the robotic apparatus 100 to the pipe 10. FIG. 6B illustrates the robotic apparatus 100 of FIG. 6A secured to pipe 10.

Embodiments of the present disclosure may, of course, comprise any number of wheels 111 and clamping members 130 suitable for securing robotic apparatus 100 to pipe 10 and enabling the motions later described herein. For ease of explanation only, embodiments of the present disclosure will primarily be described in the context of an eight-wheeled robot; however, one of ordinary skill in the art will recognize, based on the teaching of the present disclosure, how to adapt the concepts described herein to embodiments of robotic apparatuses 100 having a different number of wheels 111.

Various wheels 111 may be powered such that robotic apparatus 100 may travel along pipe 10 in axial and circumferential directions and in various combinations thereof (e.g., along helical paths of varying pitch), and thereby position robotic apparatus 100 to pass over a particular portion(s) of pipe 10 and/or avoid an obstacle(s) extending from a surface of pipe 10, as later described in more detail.

Drive Platform 110

Figure 7:
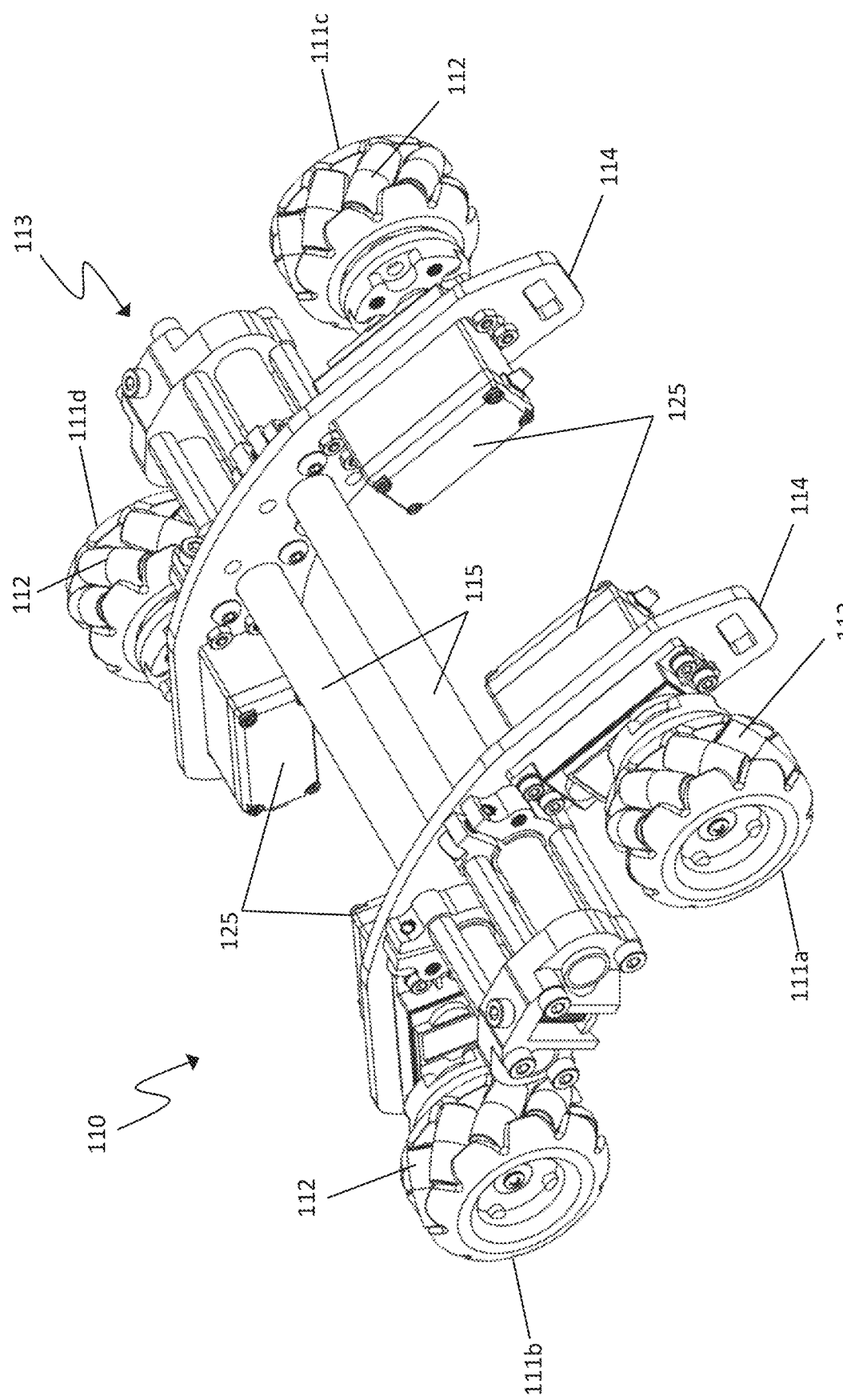
FIG. 7 is a perspective view of a representative drive platform of a robotic apparatus, in accordance with an embodiment of the present disclosure.
Figure 8A:
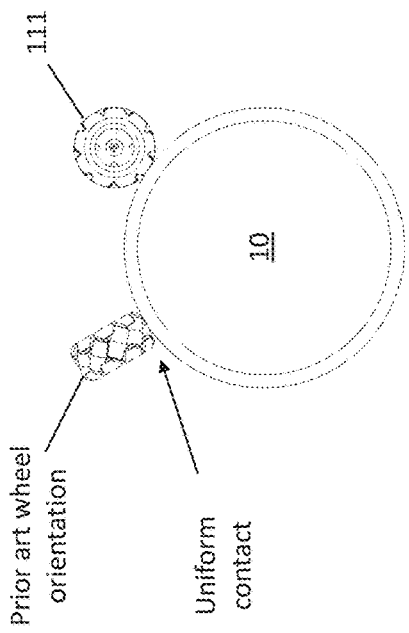
FIG. 8A, FIG. 8B, FIG. 8C, and FIG. 8D illustrate a difference in surface contact between a wheel oriented as described herein and that of a wheel oriented similar to those shown in FIG. 3 (prior art), when placed on pipes of varying diameter, in accordance with an embodiment of the present disclosure.
Figure 8B:
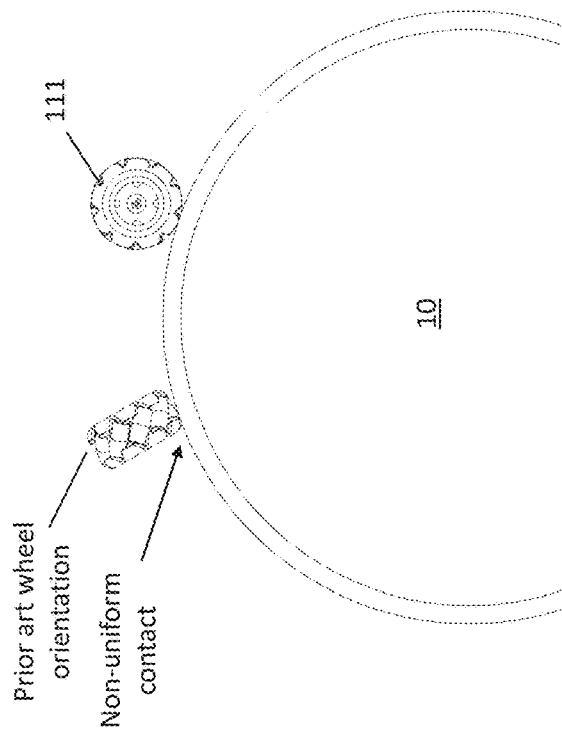
Figure 8C:
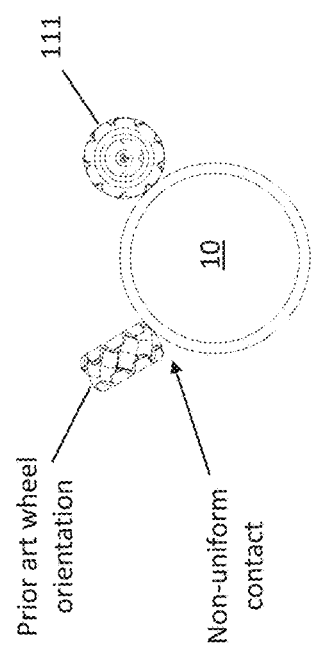
Figure 8D:
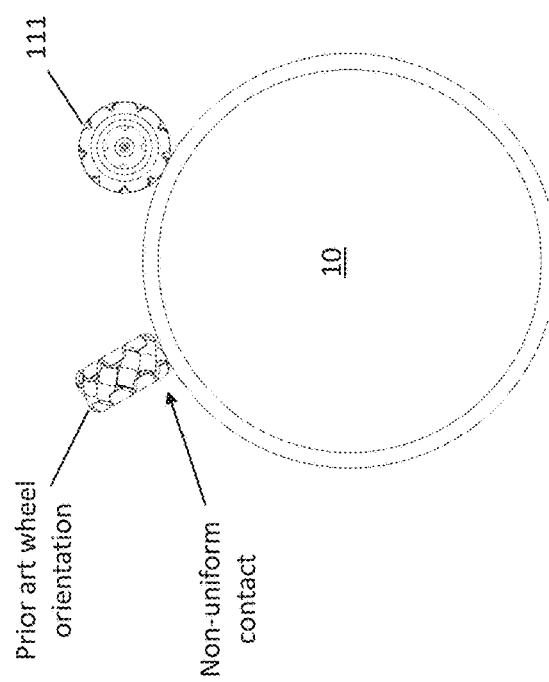

FIG. 7 is a perspective view of a representative drive platform 110 of robotic apparatus 100. In an eight-wheeled embodiment such as that shown in FIG. 6A, wheels 111a, 111b, 111e, 111f may be grouped onto a first drive platform 110a and wheels 111c, 111d, 111g, 111h may be grouped onto a second drive platform 110b. Various embodiments of drive platform 110 may generally include a frame 113 onto which wheels 111 and motors 125 are mounted.

With continued reference to FIG. 7, wheels 111 may be oriented such that the axis of rotation of each wheel 111 is parallel with a longitudinal axis of pipe 10 when robotic apparatus 100 is secured to pipe 10. Such orientation, in combination with the orientations of rollers 112 of each respective wheel 111, allows robotic apparatus 100 to move in all directions along pipe 10 as well as maintain substantially uniform contact with the outer surface of pipe 10 across an entire width of each wheel 111. For example, FIG. 8A, FIG. 8B, FIG. 8C, and FIG. 8D illustrate a difference in surface contact between a wheel 111 oriented as described herein and that of a wheel oriented similar to those shown in FIG. 3 (prior art), when placed on pipes 10 of varying diameter. By virtue of orienting wheels 111 such that their axes of rotation are parallel to the longitudinal axis of the pipe, wheels 111 of the present disclosure maintain substantially uniform contact with pipe 10 across the entire width of each wheel, as shown in each of FIGS. 8A-8D. Conversely, a robot with wheels oriented similar to those of FIG. 3 only has substantially uniform contact on one particular diameter of pipe (FIG. 8B) and the robot starts to ride on its wheel edges on smaller or larger pipes.

Wheels 111, in various embodiments, may be grouped into pairs in which the rollers 112 of one wheel 111 have an orientation mirroring that of the rollers 112 on the other wheel 111. For example, in the four-wheeled embodiment of robotic apparatus 100 shown in FIG. 5A, the orientation of rollers 112 of wheel 111a mirrors that of the rollers 112 of wheel 111b, and the orientation of rollers 112 of wheel 111c mirrors that of the rollers 112 of wheel 111d. Likewise, in in the eight-wheeled embodiment of robotic apparatus 100 shown in FIG. 6A, the orientation of rollers 112 of wheel 111a mirrors that of the rollers 112 of wheel 111b, the orientation of rollers 112 of wheel 111c mirrors that of the rollers 112 of wheel 111d, the orientation of rollers 112 of wheel 111e mirrors that of the rollers 112 of wheel 111f, the orientation of rollers 112 of wheel 111g mirrors that of the rollers 112 of wheel 111h. In the embodiments shown, such pairings are made between wheels 111 that are circumferentially offset from one another at the same axial location on a given side of pipe 10; however, it should be recognized that such pairings may be made between wheels 111 that are axially offset from one another at the same circumferential location on a given side of pipe 10—especially in embodiments where all wheels 111 on a given side of pipe 10 are at the same circumferential position (not shown). One of ordinary skill in the art will recognize, based on the teachings of the present disclosure, roller orientation configurations suitable for enabling robotic apparatus 100 to move in all directions along pipe 10 as later described herein.

Wheels 111 may be mounted to a frame 113 of drive platform 110. Frame 113, in various embodiments, may be configured to position wheels 111 in the various configurations described herein. Frame 113, in various embodiments, may include one or more lateral frame members 114 configured to position, for example, wheels 111a, 111b at circumferentially offset locations from one another on pipe 10 and wheels 111e, 111f at circumferentially offset locations from one another on pipe 10, as shown in FIG. 7. Lateral frame member(s) 114, in various embodiments, may have a curvature designed to match that of the outer surface of a representative pipe 10 to which robotic apparatus 100 will be secured. Additionally or alternatively, frame 113, in various embodiments, may include one or more longitudinal frame members 115 configured to position wheels 111a, 111b at axially offset locations from wheels 111e, 111f on pipe 10. Frame 113, in various embodiments, may further support one or more motors 125 for powering one or more of wheels 111. In the embodiment shown, each wheel 111 is separately powered by a corresponding motor 125; however, one of ordinary skill in the art will recognize that, in various embodiments, fewer than all of the wheels 111 may be powered and/or that multiple wheels 111 may be powered by one motor 125. In such cases as the latter, it should be further recognized that robotic apparatus 100 may further include a transmission (not shown) that permits the multiple wheels powered by one motor 125 to be selectively engaged/disengaged from powered rotation, rotated at different speeds from one another, and/or rotated in different directions from one another. Accordingly, one having ordinary skill in the art will recognize various numbers and combinations of motors 125 (and, if applicable, corresponding transmission configurations) suitable for use with various numbers and configurations of wheels 111 without undue experimentation.

Figure 9:
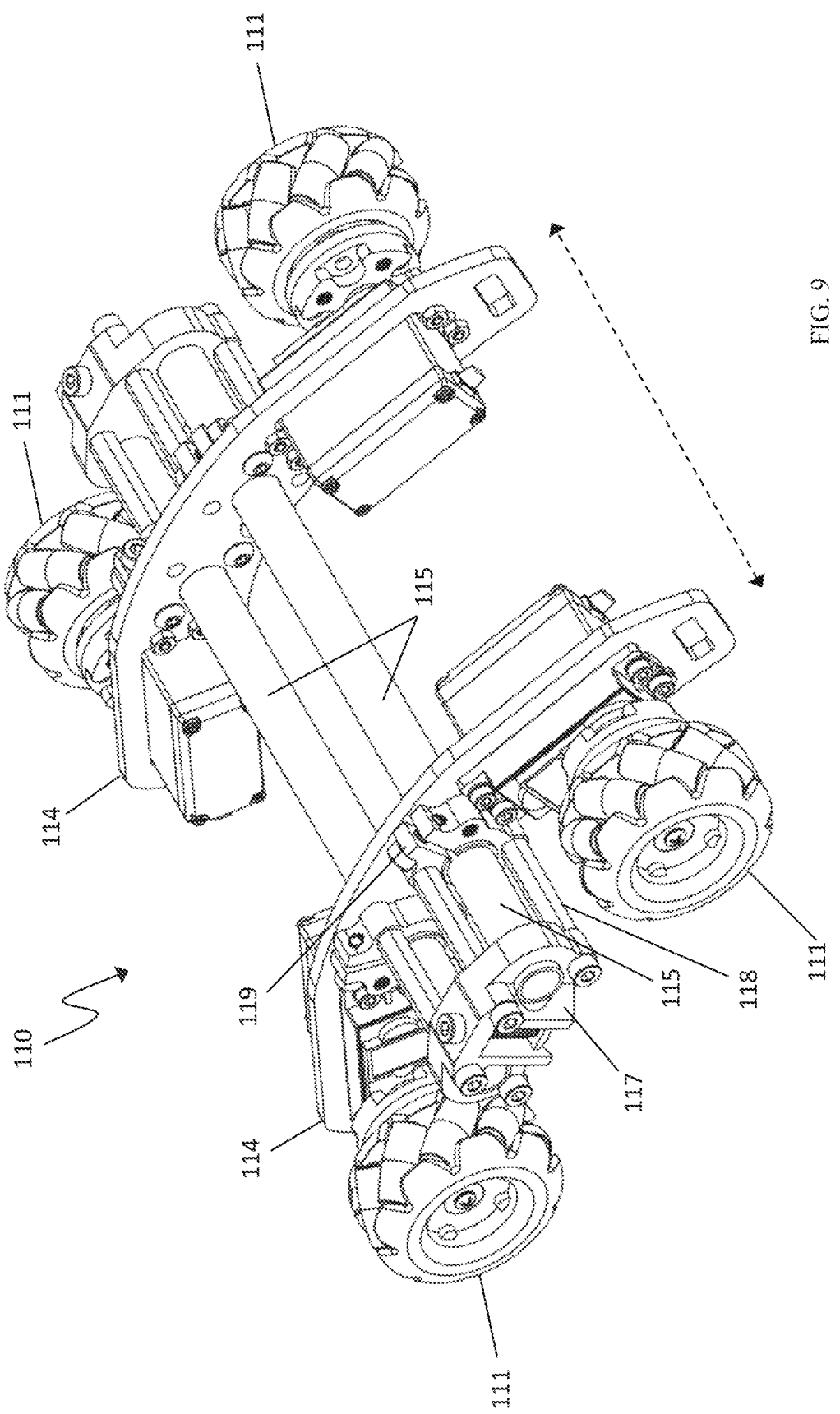
FIG. 9 and FIG. 10 schematically depict an embodiment of a drive platform configured to allow the longitudinal and lateral positions of wheels to be adjusted thereon, in accordance with an embodiment of the present disclosure.
Figure 10:
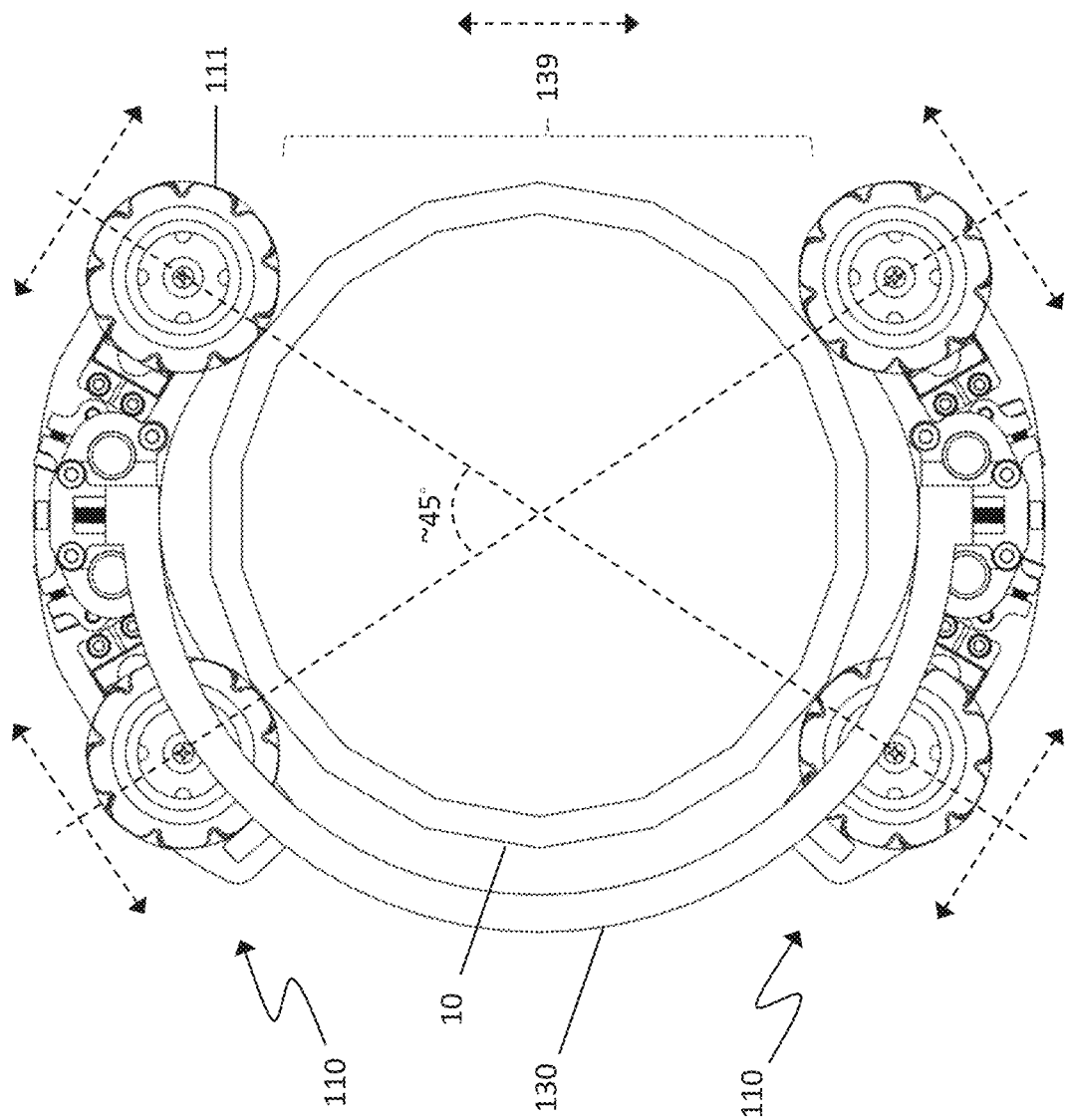

FIG. 9 and FIG. 10 schematically depict an embodiment of drive platform 110 configured to allow the longitudinal and lateral positions of wheels 111 to be adjusted thereon. Referring first to FIG. 9, in some embodiments, a longitudinal offset between wheels 111 may be adjusted by repositioning lateral frame members 114 on longitudinal frame member 115. For a smaller offset, lateral frame members 114 may be moved closer together on longitudinal frame members 115 and, for a larger offset, lateral frame members 114 may be moved further away from one another on longitudinal frame members 115. In the embodiment shown, frame 113 may comprise adjustable mounting hardware (such end cap 117, clamp 119, and adjustable length spacers 118 therebetween) to secure lateral frame members 114 in the desired longitudinal locations during the adjustment. Referring now to FIG. 10, additionally or alternatively, in some embodiments, a lateral offset between wheels 111 may be adjusted by repositioning wheels on lateral frame members 114. In various embodiments, lateral frame members 114 may comprise a slot or other mounting features (not shown) that allow for wheels 114 (and corresponding motors 125) to be repositioned along the length of lateral frame member 114.

The ability to adjust the relative positioning of wheels 111 on some embodiments of drive platform 110 may allow robotic apparatus 100 to be adapted to various operating environments without having to swap out one set of drive platforms 110 with one particular wheel configuration well suited for one operating environment for another set of drive platforms 110 with a different wheel configuration better suited for a different operating environment. For example, increasing the lateral offset between wheels 111 on drive platform 113 (and thus the circumferential positioning of wheels 111 on pipe 10) can provide additional stability to the robotic apparatus 100 on pipe 10 and, conversely, decreasing the circumferential offset can increase the size of open side 139 of robotic apparatus opposite clamping member 130 as shown in FIG. 10 and thereby allow robotic apparatus to navigate larger obstacles on or near pipe 10. In many cases, it may be preferable to provide as much lateral offset as possible (for increased stability) while still maintaining a large enough open side 139 for anticipated obstacles to pass through. As another example, increasing the longitudinal offset between wheels 111 on drive platform 113 (and thus the axial positioning of wheels 111 on pipe 10) can allow for more or larger electronics and batteries to be positioned between the longitudinally offset wheels 111 (later shown in FIG. 11), whereas decreasing the longitudinal offset can improve the ability of robotic apparatus 100 to traverse pipe 10 having a combination of obstacles that are in different orientations and close together. Stated otherwise, if pipe 10 has two obstacles that are 180 degrees apart (circumferentially) and two feet apart (axially), a robotic apparatus 100 with a longitudinal offset of less than two feet could traverse these obstacles, but one having a greater longitudinal offset may not. The shorter robotic apparatus 100 could, for example, (i) traverse the first obstacle by aligning open side 139 with the first obstacle and advancing axially past the first obstacle until robotic apparatus 100 is positioned between the two obstacles, and (ii) traverse the second obstacle by maneuvering circumferentially to align open side 139 with the second obstacle and then advancing axially to clear the second obstacle. A robotic apparatus 100 with a larger longitudinal offset may not be capable of fitting axially between the obstacles and thus could not execute such maneuvers to traverse the two obstacles. One having ordinary skill in the art will recognize, based on the present disclosure, a longitudinal offset suitable for balancing the need to accommodate certain sized payloads with the need for having sufficient axial clearance to navigate obstacles positioned axially close together. Of course, as later described in more detail, the modularity afforded by the ability to swap out drive platforms 110 and clamping members 130 is in and of itself highly beneficial and not to be discounted. In some embodiments, wheel position is adjustable on modular drive platforms 110 as well.

Figure 11:
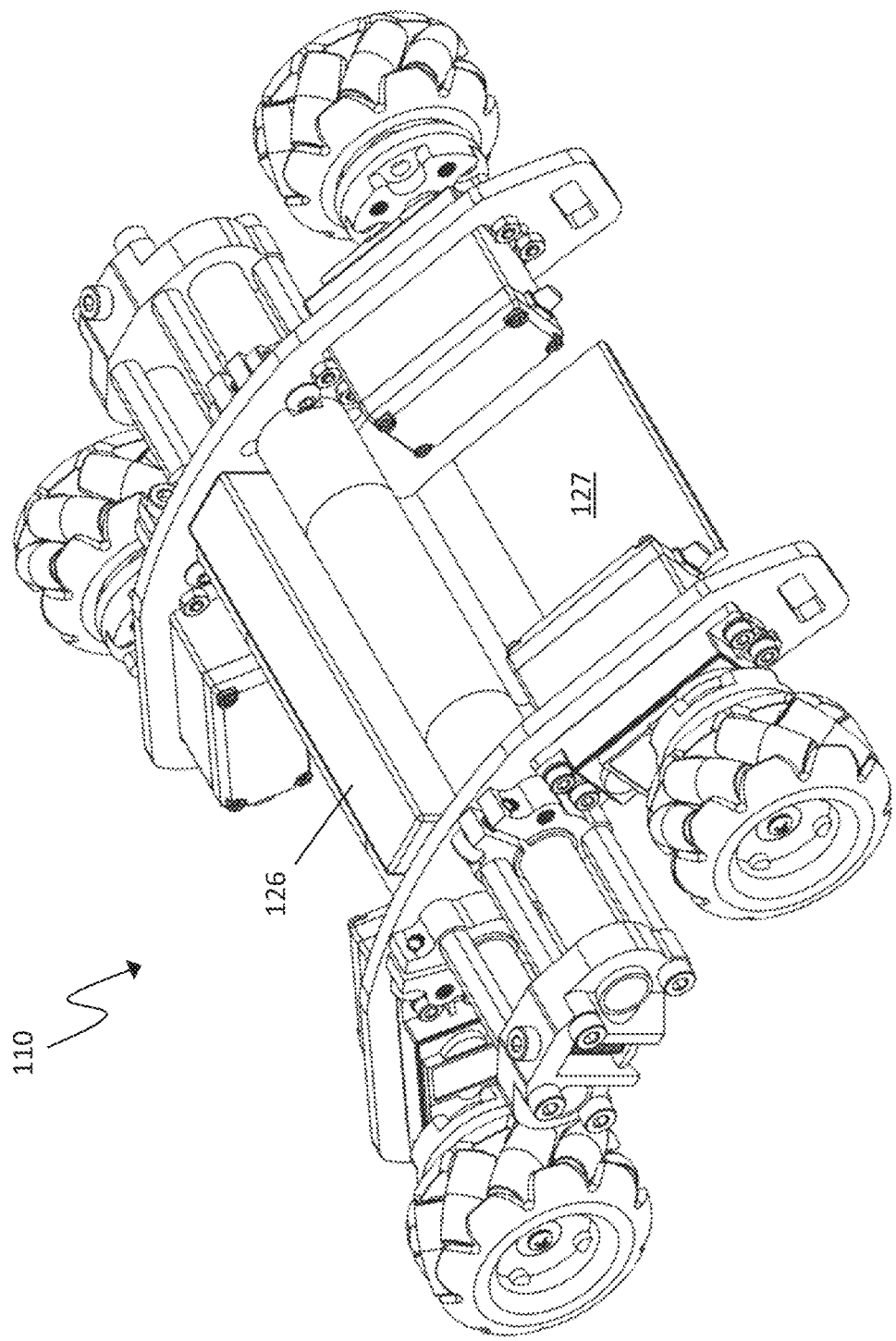
FIG. 11 shows the drive platform of FIG. 7 outfitted with various payloads, in accordance with an embodiment of the present disclosure.
Figure 13A:
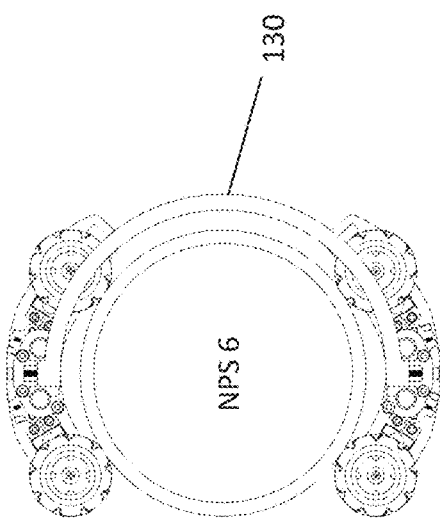
FIG. 13A, FIG. 13B, FIG. 13C, and FIG. 13D shows a modular robotic apparatus positioned on different sized pipes, in accordance with an embodiment of the present disclosure.
Figure 13B:
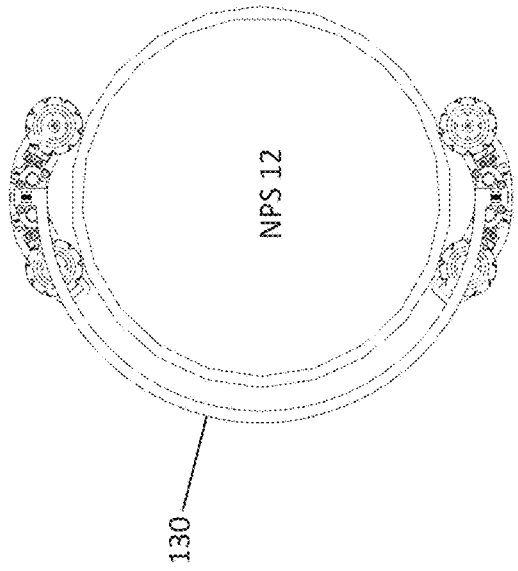
Figure 13C:
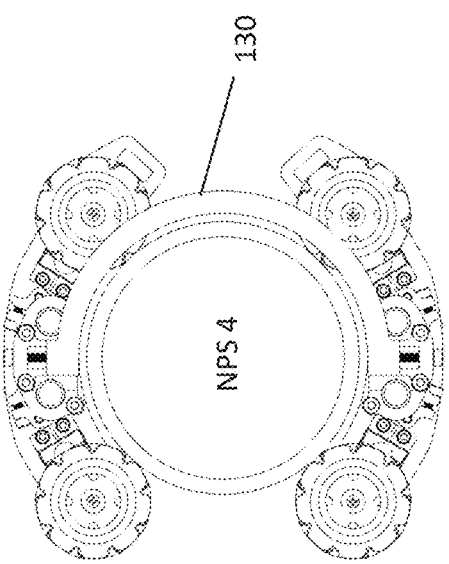
Figure 13D:
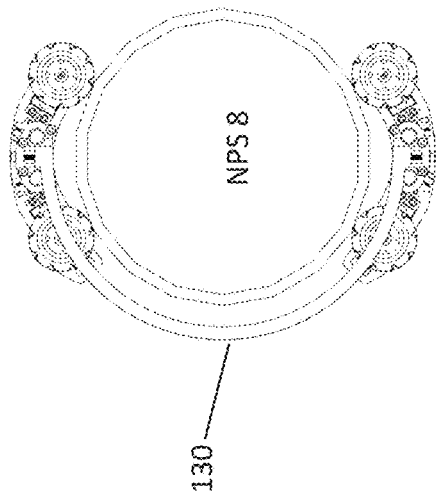

FIG. 11 shows the drive platform 110 of FIG. 7 outfitted with various payloads, such as battery 126 and electronics circuit board 127. Battery 126 may power motors 125, electronics hardware 127, sensor payloads 140 (later shown in FIG. 16), and other onboard electronics. Electronics hardware 127 may contain components for operating robotic apparatus 100, such as a circuit board with a controller configured to actuate motors 125 in accordance with executable instructions stored on a memory component. In some embodiments, payload(s) may be carried on one or more drive platforms 110, on frame 113, or on any other suitable location on robotic apparatus 100. Of course, robotic apparatus 100 could additionally or alternatively be powered via a power cord or other suitable power source in various embodiments.

Figure 21C:
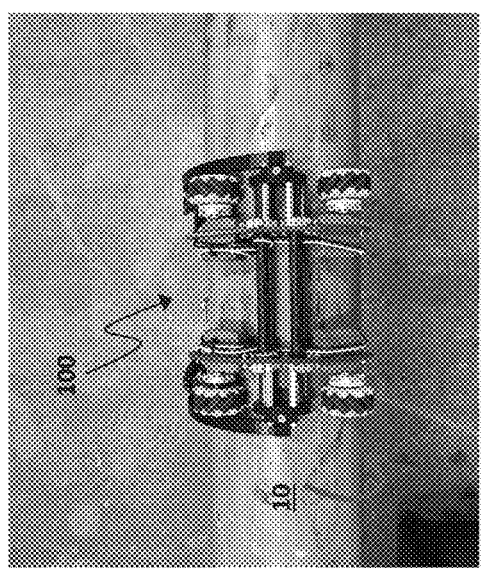
FIG. 21A, FIG. 21B, FIG. 21C, FIG. 21D, and FIG. 21E illustrate a prototype of a robotic apparatus at various circumferential positions on a pipe, in accordance with an embodiment of the present disclosure.
Figure 21D:
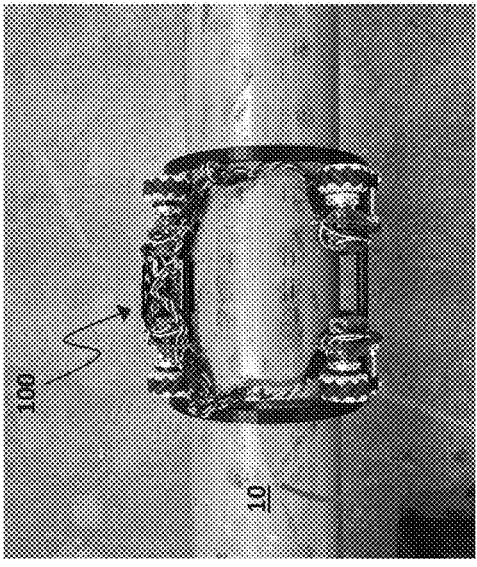
Figure 21E:
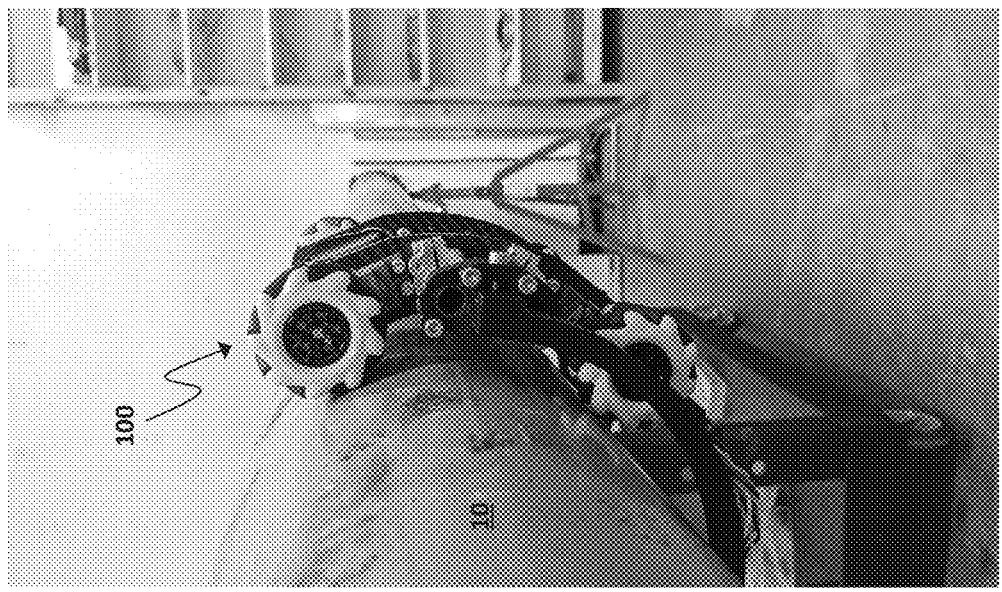
Figure 21A:
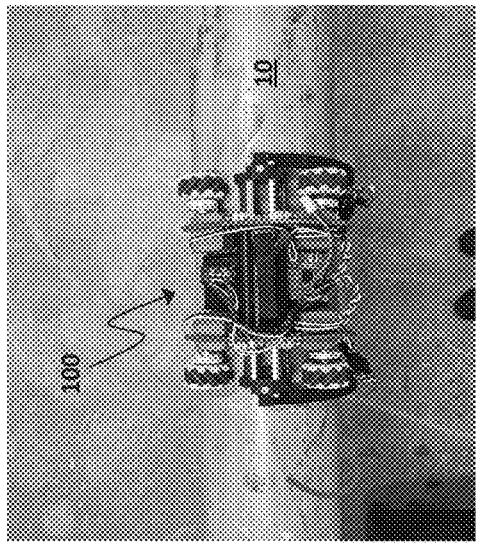

As later shown in FIGS. 21A and 21D, a detachable umbilical cord may be used to connect various payloads (for power and/or electronic communications), which may be particularly convenient in modular embodiments where drive platforms 110 may be swapped out for use in various operating environments. In some embodiments, the detachable umbilical cord is external to robotic apparatus 100 and secured so as not to flop around, while in other embodiments, body portion 131 of clamping member 130 may be equipped with internal electronic conduits (e.g., wires) connecting electronic contacts on ends 132. In the latter example, drive platforms 110 (or frame 113 or other suitable structure associated with opposing sets of wheels) may also include electronic contacts positioned such that the electronic contacts on clamping member 130 are in electrical communication with the electronic contacts on drive platforms 110 when clamping member 130 is installed. As configured, simply installing clamping member 130 may place drive platforms 110 into electronic communication with one another, thereby allowing for power and electronic communications to be routed therebetween.

While much of the present disclosure discusses wheels 111 and motors 125 in the context of being mounted on modular drive platforms 110, it should be recognized that (i) wheels 111 may be mounted on any structure suitable for positioning and orienting wheels 111 in at least one of the configurations described herein; (ii) motor(s) 125 may be mounted in any suitable location on any structure suitable for allowing motor(s) 125 to drive wheels 111, whether directly or through a transmission; and (iii) drive platforms 110 need not be modular (i.e., selectably attached/detached from clamping member 130) but rather can be permanently affixed to clamping member 130.

Clamping Member 130

FIG. 12A is a perspective view of a representative clamping member 130 of robotic apparatus 100. Generally speaking, clamping member 130, in various embodiments, may couple the wheels 111 positioned on a first side of pipe 10 with the wheels 111 positioned on a second, opposing side of pipe 10, and may be configured to apply a force for urging the wheels 111 towards an outer surface of the pipe 10 for securing the robotic apparatus 100 to the pipe 10. For ease of description, this force may also be referred to herein as the "clamping force."

The amount of clamping force needed is primarily governed by the weight of robotic apparatus 100 and the friction of wheels 111 on the surface of pipe 10. Generally speaking the clamping force should be enough for wheels 111 to have sufficient normal force to generate friction sufficient to propel the weight of robotic apparatus 100. For example, if robotic apparatus 100 weighs 20 pounds and is traversing a vertical pipe 10 with a coefficient of friction between wheels 111 and pipe 10 equal to 0.5, then the total clamping force needed may be at least 40 pounds-force. That said, if the clamping force is too large, wheels 111 may deform some pipes with softer insulations and robotic apparatus 100 would need to increase the driving force needed to drive over obstacles on the surface of the pipe 10. Larger clamping forces also require the use of stronger components, which can increase the weight of robotic apparatus 100.

As shown throughout the FIGURES, in some embodiments, robotic apparatus 100 may include two or more clamping members affixed at any given time. In still further embodiments, robotic apparatus 100 may be provided as a kit with multiple clamping members of different properties, and each may be interchanged to tailor the robotic apparatus for use under corresponding operating conditions.

Clamping member 130, in various embodiments, may include a body portion 131 connecting first and second ends 132. Body portion 131, in various embodiments, may have a curvature and size designed to substantially complement that of the curvature and diameter of a representative pipe 10 to which robotic apparatus 100 will be secured. More specifically, in various embodiments, the curvature of body portion 131 may be semi-circular and sized such that ends 132 are positioned over opposing sides of pipe 10 and, most preferably, at directly opposing circumferential positions about pipe 10 as shown in FIG. 12B. Such positioning allows for clamping member 130 to apply the clamping force through ends 132 at directly opposing vectors through the centerline of the pipe 10, which may better secure robotic apparatus 100 to pipe 10 than configurations in which the clamping force vectors at ends 132 are not directly opposing and possibly do not pass through the centerline of pipe 10. Of course, such a configuration is not necessary to securely couple robotic apparatus 100 to pipe 10 and, in many cases, the same clamping member 130 may be used on pipes 10 of fairly similar diameters and still adequately secure robotic apparatus to such pipes 10. Likewise, clamping member 130 need not necessarily have a curvature directly complementing that of the outer surface of pipe 10 so long as the shape of clamping member 130 is capable of applying a clamping force suitable for securing the robotic apparatus 100 to the pipe 10. Notwithstanding the foregoing, in various embodiments it may be advantageous for clamping member 130 to have a size and curvature that highly complements that of the pipe 10 on which it will travel such that clamping member 130 can be positioned very close to the outer surface of pipe 10 without causing interference. As configured, clamping mechanism may be provided with a very low profile that allows it maximum clearance to navigate operating environments in which obstacles (e.g., other pipes) are positioned very close to pipe 10.

Clamping member 130, in various embodiments, may comprise any material(s) and construction suitable for applying the clamping force when robotic apparatus is installed on pipe 10. In some embodiments, clamping member 130 may be substantially rigid, while in other embodiments, clamping member 130 may have a high stiffness but still be flexible enough for body portion 131 to bend when ends 132 are pulled apart. In rigid embodiments, clamping member 130 may serve as a backstop for a biasing mechanism (e.g. spring or adjustment screw) to push the drive platforms 110 inwards towards pipe 10 and thereby provide the clamping force, as later described in more detail. A stiff-but-flexible construction may allow clamping member 130 to be pried open to an expanded state during installation of robotic apparatus 100 on pipe 10 and then released once drive platforms 110 are properly positioned on pipe 10, allowing clamping member 130 to contract back to its neutral state and thereby apply the clamping force. One having ordinary skill in the art will recognize, based on the present disclosure, various sizes, curvatures, material(s), and constructions suitable for providing clamping member 130 with such rigidity or suitable stiffnesses for these purposes without undue experimentation.

Ends 132 of clamping member 130, in various embodiments, may be configured for coupling with drive platforms 110 (or other structure supporting and positioning wheels 111; for simplicity, such coupling will only be discussed in the context of being with drive platforms 110). In some embodiments, ends 132 may be configured to detachably couple to drive platforms 110, thereby allowing different clamping members 130 and/or different drive platforms 110 to be swapped in and out by the user. This modular configuration may allow a single robotic apparatus 100 to be used (and in many cases, optimized for such use) in different operating conditions, such as on various sized pipes (as shown in FIG. 13A, FIG. 13B, FIG. 13C, and FIG. 13D), various pipe orientations (e.g., increased clamping force to account for gravity when used on vertical pipes compared with horizontal pipes), and with different payloads.

Figure 14:
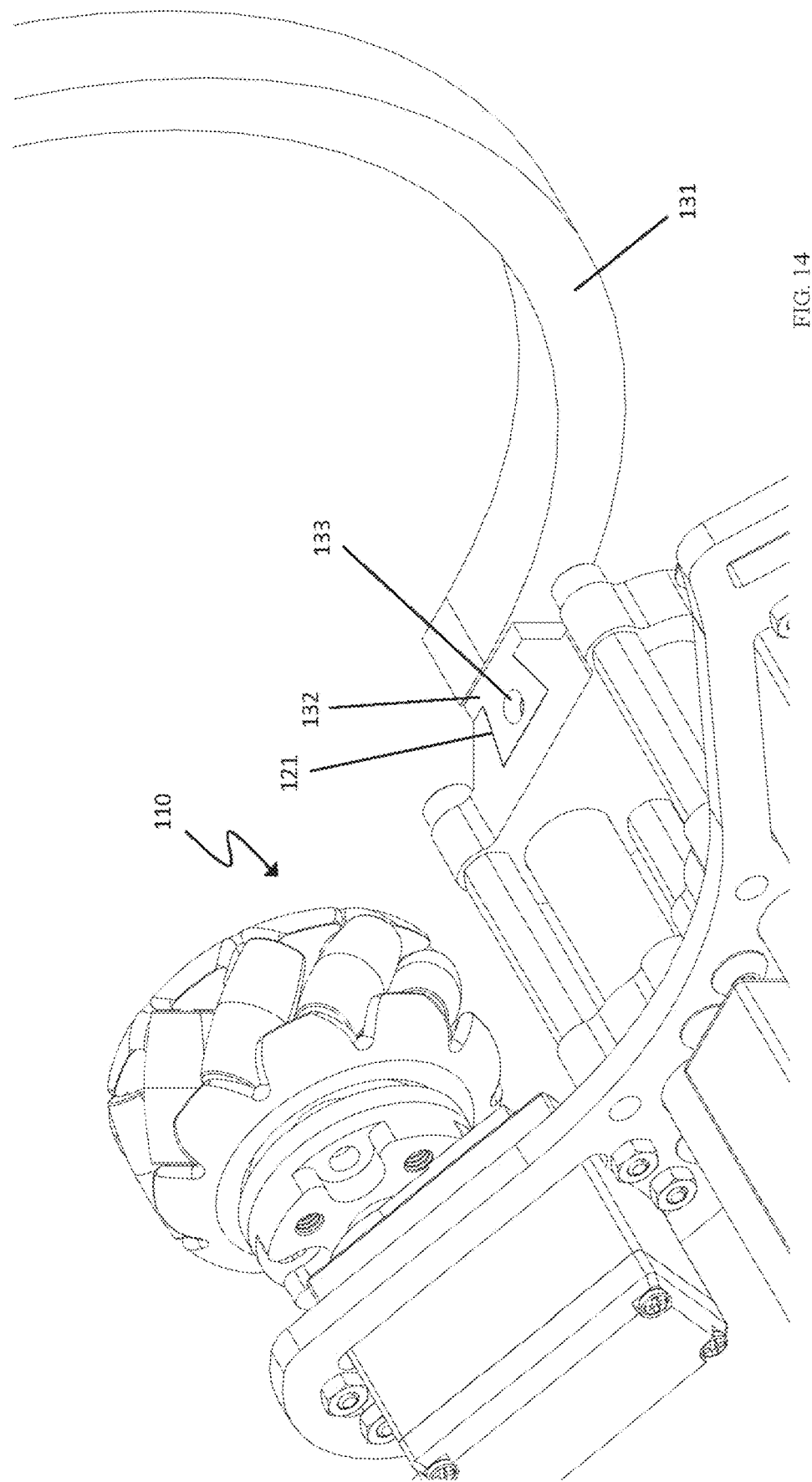
FIG. 14 illustrates ends of a clamping member shaped and dimensioned for coupling with a component of a drive platform having a complementary feature, in accordance with an embodiment of the present disclosure.

Referring to FIG. 14, in one embodiment, ends 132 of clamping member 130 may be shaped and dimensioned for coupling with a component of drive platform 110 having a complementary feature. Here, ends 132 have a key shape and each drive platform 110 has a similarly shaped and dimensioned keyhole recess 121 into which ends 132 are inserted. A friction fit or keyhole with the bottom closed off (not shown) may be sufficient to securely couple end 132 to drive platforms 110 in spite of the downward (towards pipe surface)-vectored clamping force, while in other embodiments, a coupler such as a screw may be used to provide a detachable coupling. In the embodiment shown in FIG. 14, end 132 is provided with a hole 133 such that a screw may be used to securely couple clamping member 130 to drive platform 110.

Clamping member 130, in various embodiments, may be provided with a biasing mechanism 135 configured to adjust the amount of clamping force produced by clamping member 130. In some embodiments, such as those in which clamping member 130 is rigid, clamping member 130 as a backstop against which to brace the biasing mechanism 135 while pushing the drive platforms 110 inwards towards pipe 10 to increase the clamping force. In other embodiments, such as those in which clamping member 130 is semi-rigid, biasing member 135 may be used to pull end 132 of clamping member 130 outwards (away from pipe 10), thereby increasing the flex of clamping member 130 and thus the corresponding clamping force exerted by clamping member 130. In both cases, reversing operation of biasing mechanism 135 can reduce the amount of clamping force exerted by clamping member 130.

Figure 15:
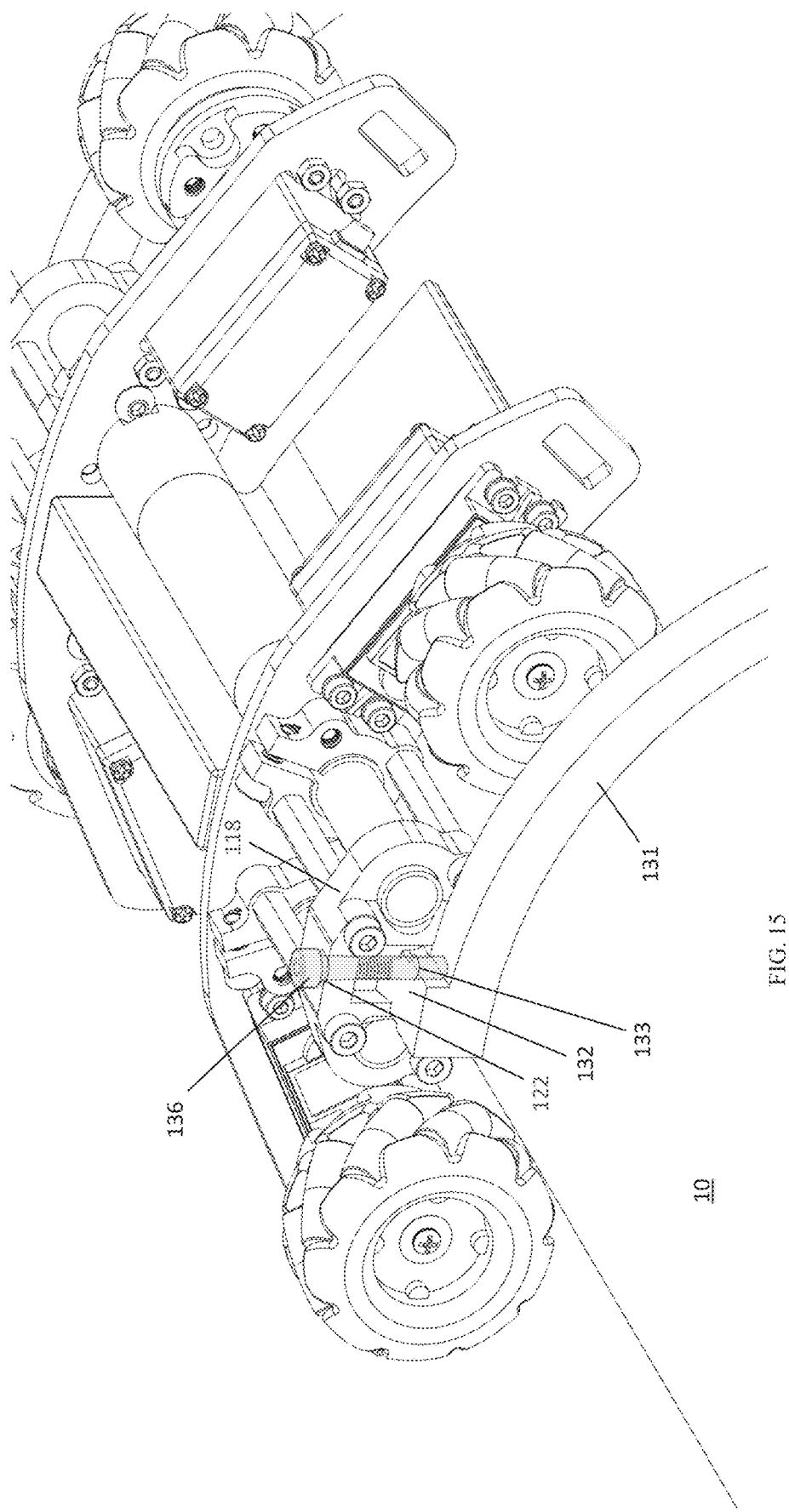
FIG. 15 shows a biasing mechanism in the form of an adjustment screw, in accordance with an embodiment of the present disclosure.

FIG. 15 shows one embodiment of biasing mechanism 135 in the form of an adjustment screw 136. In this embodiment, adjustment screw 136 is inserted through a hole 122 in end cap 117 of drive platform 110 and into hole 133 in end 132 of clamping member 130. As configured, if clamping member 130 is rigid, adjustment screw 136 can be turned to adjust the height of drive platform 110 relative to end 132 of clamping member 130 until drive platform 110 is pressing down firmly against the surface of pipe 10. Clamping member 130 thus provides a reaction force against adjustment screw 136 such that the clamping force is vectored inwards towards pipe 10. If clamping member 130 is semi-rigid, turning adjustment screw 136 causes end 132 to be pulled up towards drive platform 110 and away from pipe 10, thereby increasing the flex of clamping member 130 and the corresponding clamping force exerted. In both cases, adjustment screw 136 can be turned in the other direction to reduce flex in the clamping member 130 and thereby reduce the clamping force.

In another embodiment, biasing mechanism 135 may comprise a compressed spring (not shown) situated between the bottom of end 132 and an upward-facing surface of drive platform 110. As configured, if clamping member 130 is rigid, the bottom of end 132 of clamping member 130 provides a reaction force against the compressed spring such that end 132 pushes drive platform 110 down harder onto the surface of pipe.

Biasing mechanism 135, in various embodiments, may be configured for manual and/or automated adjustment. Whether manual or automated, the ability to adjust the clamping force can prove very beneficial, allowing the robot to be adjusted for use on pipes of various diameters and orientations, and for use on uninsulated pipes and insulated pipes, without having to without changing out the clamping member 130. Not only can such adjustments make the robotic apparatus 100 capable of operating under the changed conditions, such adjustments can also be made optimize certain performance factors. For example, the robotic apparatus 100 may not need as much clamping force to remain securely attached to a horizontal pipe 10 and thus it may be desirable to use a lesser clamping force when operating on horizontal pipes to optimize drag (and thus power consumption) and/or traverse pipe 10 at a higher speed, and then adjust to a higher clamping force when traversing vertical pipes 10. Similarly, a user may wish to use a lesser clamping force when traversing an insulated pipe 10 so as to avoid damaging the insulation. Automated embodiments have the added benefit of being able to remotely adapt the robotic apparatus 100 to changing conditions rather than having to stop operation and perform adjustments manually.

Sensors & Other Payloads

FIG. 16 illustrates an embodiment of robotic apparatus 100 including a sensor assembly 140. Sensor assembly 140, in various embodiments, may be configured for any suitable purpose, such as for performing structural inspections of pipe 10 or tracking motion of robotic apparatus 100 on pipe 10. Sensor assembly 140, in various embodiments, may comprise sensor 141 and a support 142. While only one sensor assembly 140 is shown, it should be recognized that robotic apparatus 100 may be equipped with any number of sensor assemblies in any suitable configurations.

Sensor 141, in various embodiments, may include one of a variety of sensors suitable for inspecting or otherwise gathering information concerning pipe 10 and/or the surrounding environment. For example, in an embodiment, inspection sensor 141 may include an ultrasonic sensor or other sensor suitable for non-destructive inspection (NDI) of structural aspects of pipe 10, such as measuring wall thickness or detecting cracks/corrosion. In another embodiment, inspection sensor 141 may include a sensor configured to sample air proximate to pipe 10 for traces of fluids (e.g., natural gas, oil) that may have leaked out of pipe 10. Such traces may be indicative of cracks or corrosion in pipe 10, and thus may be used for structural inspection purposes.

Sensor 141, in various embodiments, may include one or more sensors used by robotic apparatus 100 to evaluate its operating environment and/or location therein. For example, sensor 141 may include one or more sensors configured to measure a diameter of pipe 10, as shown and described in U.S. Pat. No. 11,154,989 entitled "Pipe Traversing Apparatus, Sensing, and Controls" and granted on Oct. 26, 2021, which is incorporated by reference herein in its entirety for all purposes. As another example, sensor 141 may include one or more sensors configured to track a location of robotic apparatus 100 on pipe 10, as shown and described in the incorporated patent reference.

Support 142, in various embodiments, may couple sensor 141 to robotic apparatus 100 and be moved to position sensor 141 relative to the surface of pipe 10. Various embodiments of support 142 are shown and described in the context of the supports disclosed in the incorporated patent reference including, without limitation, the movable and spring loaded sensor support arms described therein.

One having ordinary skill in the art will recognize how to adapt such components for use on robotic apparatus 100 of the present disclosure without undue experimentation.

Sensor assembly 140 and other payloads can be attached to any suitable portion of robotic apparatus 100, including on drive platforms 110 and/or on clamping member(s) 130. The mounting location for sensor assembly(s) 140 may take into consideration the ease with which clamping member(s) 130 can be replaced, as well as trying to keep the center of mass of robotic apparatus 100 as close to the center of pipe 10 as possible to minimize the moment exerted by gravity on robotic apparatus 100 (especially when driving on horizontal pipes 10).

Robotic apparatus 100 may also be provided with fail-safe arms, such as those shown and described in U.S. patent application Ser. No. 17/887,281 entitled "Radiography Inspection and Fail-Safe Mechanism for Pipe Traversing Robots" filed Aug. 12, 2022, which is incorporated herein in its entirety for all purposes. Such fail-safe arms may be adapted for use with robotic apparatus 100 hereof in any suitable manner including miniaturizing or making the fail-safe arms more compact to fit within a small clearance. Fail-safe arms can also be provided with different tracks of different lengths and/or curvature to fit different pipe sizes. These tracks may be modular, potentially by having the fail-safe mechanism mounted to the modular clamping member 130 of the appropriate size, or separately modular.

Traversing Pipeline and Avoiding Obstacles

In operation, robotic apparatus 100 may be mounted on an exterior surface of pipe 10 and traverse pipe 10 to deliver, perform, and/or support various functionalities, such as inspecting pipe 10 for structural defects or corrosion, and sampling the surrounding environment for traces of fluids that may have leaked from pipe 10. In doing so, robotic apparatus 100 may at times need to reposition itself circumferentially on pipe 10 to, for example, navigate one or more obstacles extending from pipe 10 or to inspect a particular side(s) of pipe 10. Similarly, at times it may be advantageous for robotic apparatus to corkscrew or otherwise follow a helical pattern about the exterior of pipe 10 when attempting to inspect the majority of the exterior of pipe 10 or the surrounding environment. Accordingly, robotic apparatus 100 of the present disclosure may be configured to traverse pipe 10 along straight, circumferential, and/or helical paths (and any combination thereof). Generally speaking, travel along these paths may be accomplished by driving wheels 111 in various combinations, as further described in more detail below.

In order to travel an axial pathway, all wheels are driven at the same speed, and wheels 111 having a first roller 112 orientation are driven in a first direction and wheels 111 having a second, mirrored roller 112 orientation are driven in a second, opposing direction. The first and second directions of rotation can be reversed to reverse the direction of axial travel.

Figure 17B:
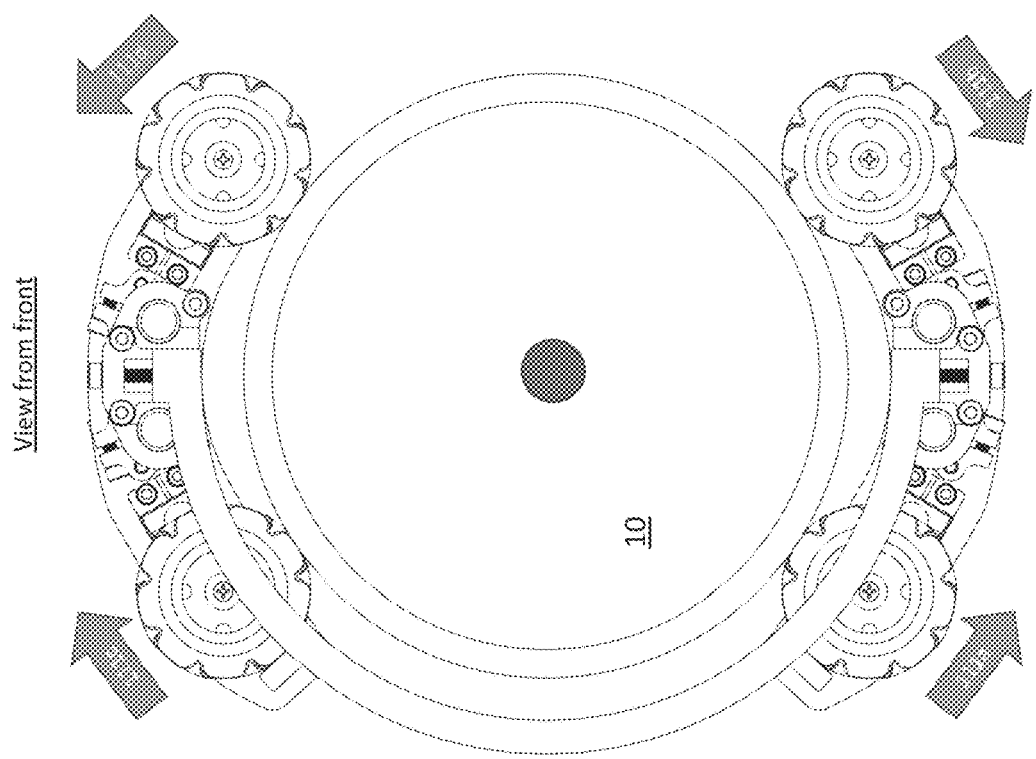
FIG. 17A and FIG. 17B illustrate a combination of wheel motions for advancing the eight-wheeled robotic apparatus of FIG. 6A along an axial pathway on a pipe, in accordance with an embodiment of the present disclosure.
Figure 17A:
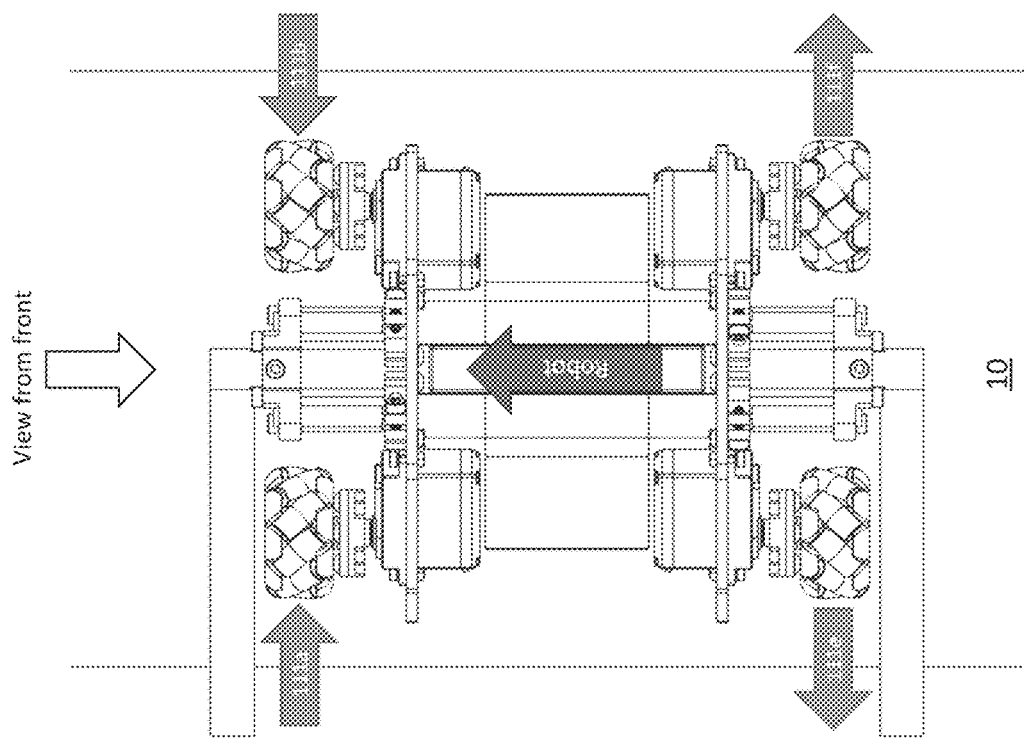

FIG. 17A and FIG. 17B illustrate such a combination of wheel 111 motions for advancing the representative eight-wheeled robotic apparatus 100 of FIG. 6A along an axial pathway on pipe 10. Because robotic apparatus 100 does not necessarily have a "front" and a "back" due to its symmetry, a front and rear have been arbitrarily assigned for ease of explanation. Wheels 111a, 111f have right-handed roller orientation and as such are rotated counter-clockwise, as seen from the front, to generate traction along pipe 10 in a forward and counter-clockwise direction, as seen from the front. Conversely, wheels 111b, 111e have left-handed roller orientation and as such are rotated clockwise, as seen from the front, to generate traction along pipe 10 in a forward and clockwise direction, as seen from the front. The clockwise and counter-clockwise vector components cancel each other out, resulting in axial motion in the forward direction.

In order to travel a circumferential pathway, all wheels are at the same speed, and wheels 111 are driven in the same direction. The direction of rotation can be reversed to reverse the direction of circumferential travel.

Figure 18B:
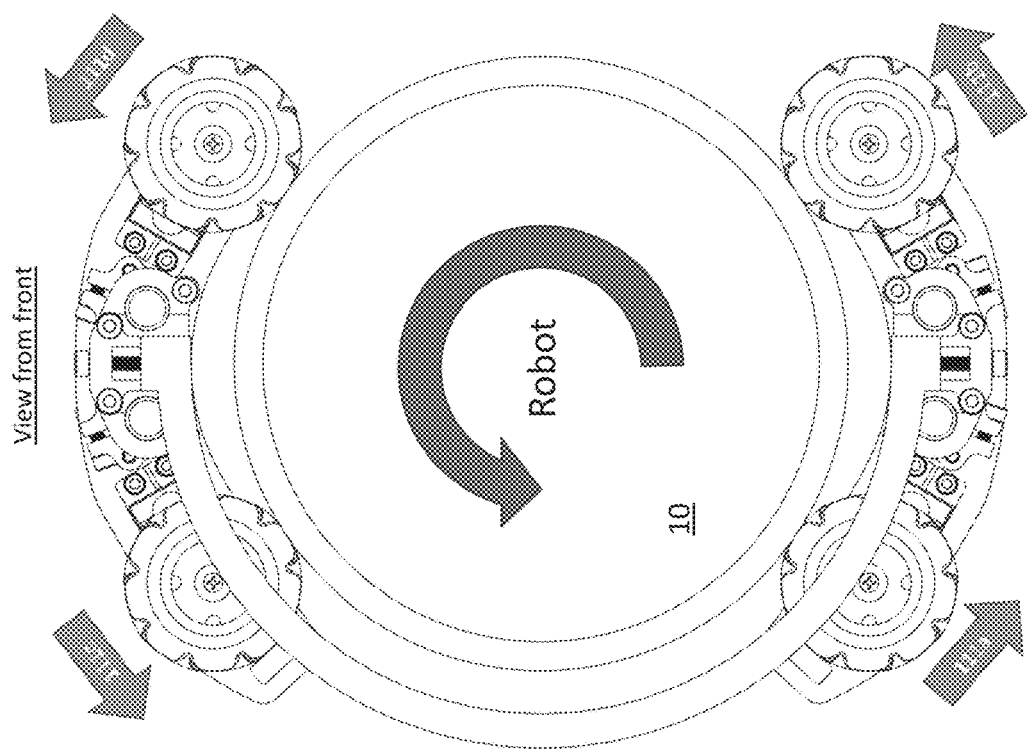
FIG. 18A and FIG. 18B illustrate a combination of wheel motions for advancing the eight-wheeled robotic apparatus of FIG. 6A along circumferential pathway on a pipe, in accordance with an embodiment of the present disclosure.
Figure 18A:
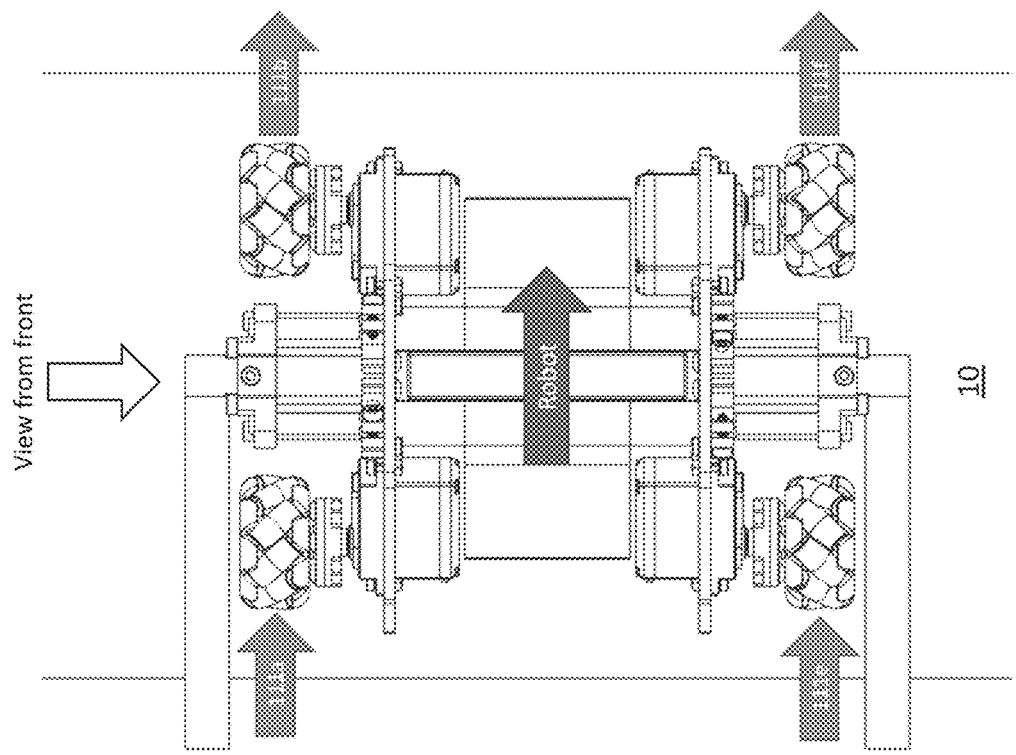

FIG. 18A and FIG. 18B illustrate such a combination of wheel 111 motions for advancing the representative eight-wheeled robotic apparatus 100 of FIG. 6A along circumferential pathway on pipe 10. Because robotic apparatus 100 does not necessarily have a "front" and a "back" due to its symmetry, a front and rear have been arbitrarily assigned for ease of explanation. Wheels 111a, 111f have right-handed roller orientation and as such are rotated counter-clockwise, as seen from the front, to generate traction along pipe 10 in a forward and counter-clockwise direction, as seen from the front. Conversely, wheels 111b, 111e have left-handed roller orientation, and as such are rotated counter-clockwise, as seen from the front, to generate traction along pipe 10 in a rearward and counter-clockwise direction, as seen from the front. The forward and rearward vector components cancel each other out, resulting in circumferential motion in the rightward direction.

In order to travel a pathway having both axial and circumferential components, relative wheel speed and/or wheel rotation directions can varied as necessary to produce the desired vectors.

For example, FIG. 19A, FIG. 19B, and FIG. 19C illustrate a combination of motions suitable for causing robotic apparatus 100 to travel forward at a 45 degree angle with respect to the axis of pipe 10 that turns in a counter-clockwise direction as viewed from the front. Those wheels 111 having right-handed roller orientations are driven at the same speed as one another, and those wheels having left-handed roller orientations are not driven at all. The resultant traction vectors point forward and to the right at 45 degrees (assuming the rollers 112 are at 45 degree angles), and thus the robotic apparatus 100 travels a purely helical pathway that turns in a counter-clockwise direction as viewed from the front. Conversely, to travel a purely helical pathways that turns to the left, those wheels 111 having left-handed roller orientations are driven at the same speed as one another, and those wheels having right-handed roller orientations are not driven at all. The resultant traction vectors point forward and to the left at 45 degrees (assuming the rollers 112 are at 45 degree angles), and thus the robotic apparatus 100 travels a purely helical pathway that turns in a clockwise direction as viewed from the front. The respective directions of rotation can be reversed to cause the robotic apparatus 100 to travel backwards at 45 degree angle with respect to the axis of pipe 10 that turns in the corresponding direction.

In order to travel along a helical pathway that has shorter turns (i.e., smaller pitch) or longer terms (i.e., greater pitch), all wheels 111 may be driven, albeit with those of one handedness being rotated at a faster speed than those of the other handedness. Which handedness is driven faster versus which handedness is driven slower depends on the particular combination of wheel rotation directions being employed. Generally speaking, in order to travel a helical pathway with shorter turns (i.e., a greater circumferential component than axial component), one may choose to employ the wheel rotation configuration used for circumferential travel and vary wheel speed accordingly to achieve the desired smaller pitch. Likewise, in order to travel a helical pathway with longer turns (i.e., a greater axial component than circumferential component), one may choose to employ the wheel rotation configuration used for axial travel and vary wheel speed accordingly to achieve the desired smaller pitch.

Of course, robotic apparatus 100 of the present disclosure need not be constrained to travel along only axial, circumferential, and helical pathways—the principles described above can be combined as appropriate to move along any pathway on pipe 10. Likewise, while the present disclosure may refer to all wheels 111 being driven (akin to all-wheel drive in an automobile), in embodiments having more than two wheels 111, only two of such wheels 111 need be driven (akin to two-wheel drive in an automobile), noting that the two wheels 111 selected to be driven should be selected in accordance with the teachings above to produce the required resultant traction vector for a desired motion. The remaining wheels 111 can be free to rotate.

Figure 20A:
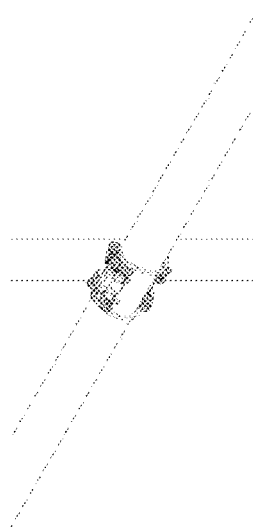
FIG. 20A, FIG. 20B, FIG. 20C, FIG. 20D, and FIG. 20E illustrate a representative approach for navigating past a pipe situated very close to (i.e., so close that it would interfere with the clamping member and/or drive platforms, despite the low profile configuration of the robotic apparatus) or even touching the pipe on which the robot is travelling, in accordance with an embodiment of the present disclosure.
Figure 20B:
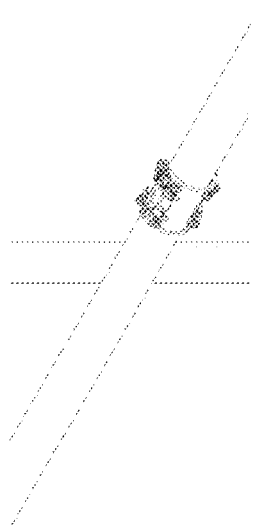
Figure 20C:
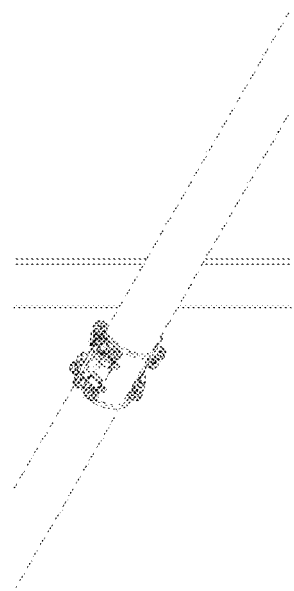
Figure 20D:
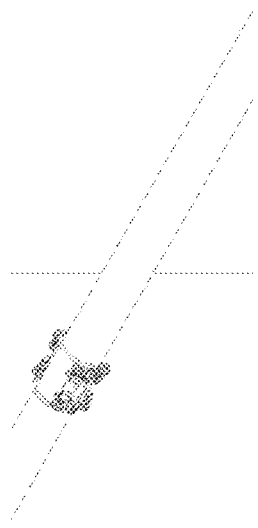
Figure 20E:
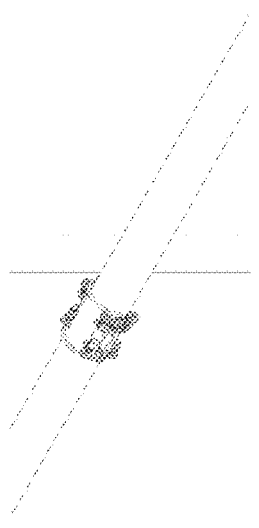

In operation, robotic apparatus 100 may be maneuvered along various pathways for a variety of purposes including, without limitation, to following a desired inspection pattern or to navigate around an obstacle on or near pipe 10. As previously explained, in various embodiments, robotic apparatus 100 may be configured with an open side 139 through which a obstacle can pass without interference. Open side 139, in various embodiments, is situated opposite clamping member 130 as shown. FIG. 20A, FIG. 20B, FIG. 20C, FIG. 20D, and FIG. 20E illustrate a representative approach for navigating past a pipe 10' situated very close to (i.e., so close that it would interfere with clamping member 130 and/or drive platforms 110, despite the low profile configuration of robotic apparatus 100) or even touching pipe 10. In FIG. 20A and FIG. 20B robotic apparatus 100 is approaching pipe 10'. The open side 139 is not axially aligned with the area where pipe 10' abuts pipe 10 and thus, in robotic apparatus's 100 current orientation, pipe 10' may interfere with robotic apparatus 100 as it tries to pass pipe 10'. In FIG. 20C robotic apparatus has maneuvered in a circumferential direction to align open side 139 with the area in which pipe 10' abuts pipe 10. In FIG. 20D robotic apparatus 100 travels along an axial pathway to traverse where pipe 10' abuts pipe 10. FIG. 20E illustrates robotic apparatus 100 having passed pipe 10'.

Figure 21B:
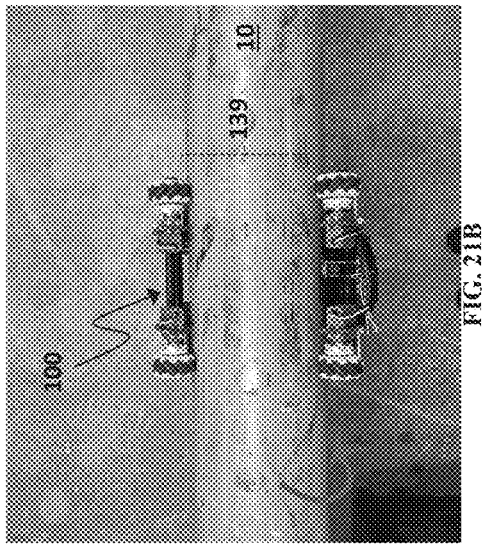

FIG. 21A, FIG. 21B, FIG. 21C, FIG. 21D, and FIG. 21E illustrate a prototype of robotic apparatus 100 at various circumferential positions on a pipe 10. FIG. 21B in particular shows open side 139 well.

Figure 22B:
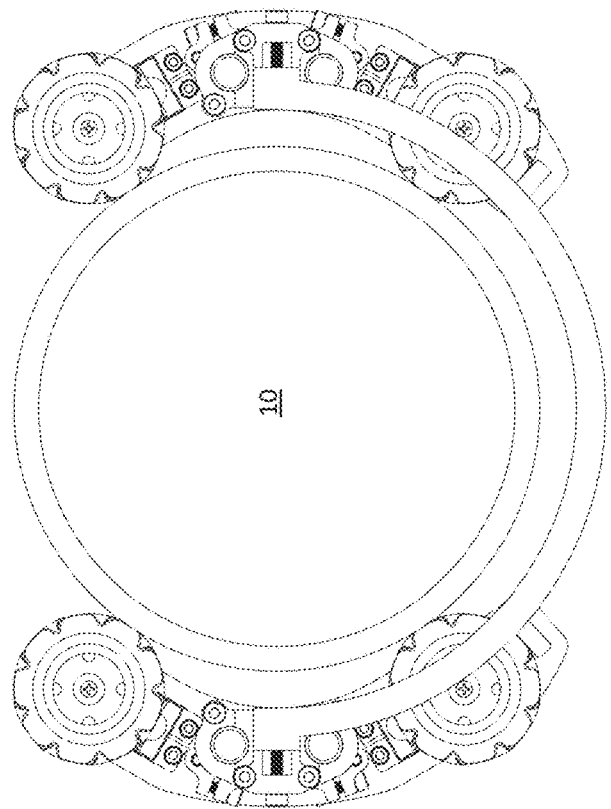
FIG. 22A and FIG. 22B illustrate a combination of motions suitable for causing a robotic apparatus to recover from a radial slip condition, in accordance with an embodiment of the present disclosure.
Figure 22A:
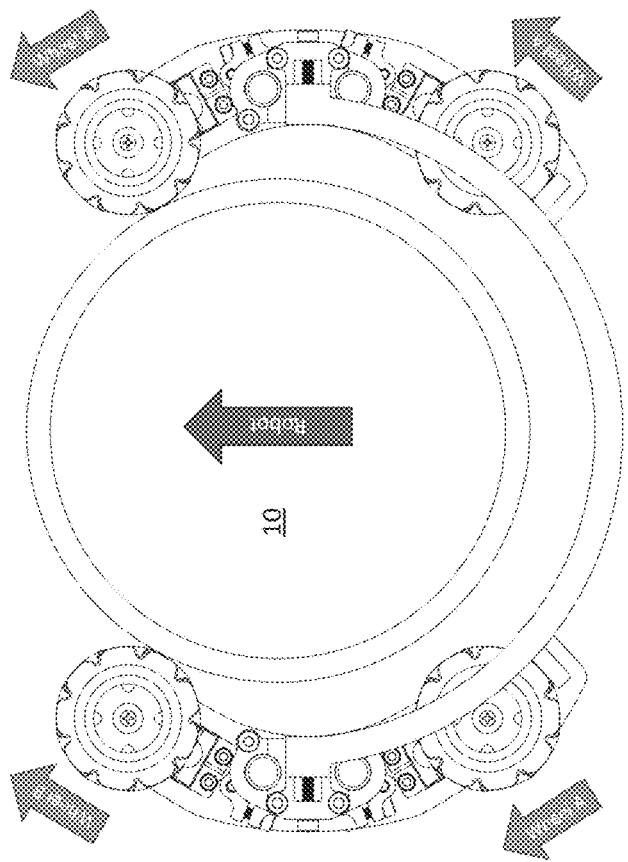

FIG. 22A and FIG. 22B illustrate a combination of motions suitable for causing robotic apparatus 100 to recover from a radial slip condition. As used herein, the term radial slip refers to any slipping between wheels 111 and the pipe 10 that results in the robotic apparatus 100 exhibiting uncontrolled radial movement.

In order to recover from a radial slip condition, all wheels are driven towards the direction of recovery. In the embodiment shown, robotic apparatus 100 has undergone radial slip where its inner wheels have disengaged from pipe 10. By rotating all wheels towards the direction of recovery, traction vectors are generated in the direction of recovery and axial components of such vectors cancel one another out. Wheel rotation speed and direction can be varied in accordance with the present disclosure to make adjustments if the radial slip is not symmetrical.

Robotic Sensing and Controls

Robotic apparatus 100, in various embodiments, may include sensing and control capabilities similar to those shown and described in the "Robotic Sensing and Controls" section of the incorporated patent reference. One having ordinary skill in the art will recognize how to adapt such capabilities to robotic apparatus 100 of the present disclosure without undue experimentation.

Robotic Apparatus 200

Embodiments of the present disclosure are further directed to a robotic apparatus 200 for traversing the exterior of piping systems, such as ones commonly found in chemical plants, power plants, manufacturing plants, and infrastructure. Like robotic apparatus 100, various embodiments of robotic apparatus 200 clamps on to a pipe 10, can drive in any direction along the surface of that pipe 10, requires very low clearance around the pipe 10, and fits on a large range of different pipe 10 sizes. Robotic apparatus 200, in various embodiments, may have improved ability to drive over small obstacles on the pipe 10 (e.g., insulation bands), improved ability to drive past obstacles tangential to the pipe (e.g., a beam on which pipe 10 rests), and improved stability on large pipe 10 sizes.

High-Level Architecture

Figure 23:
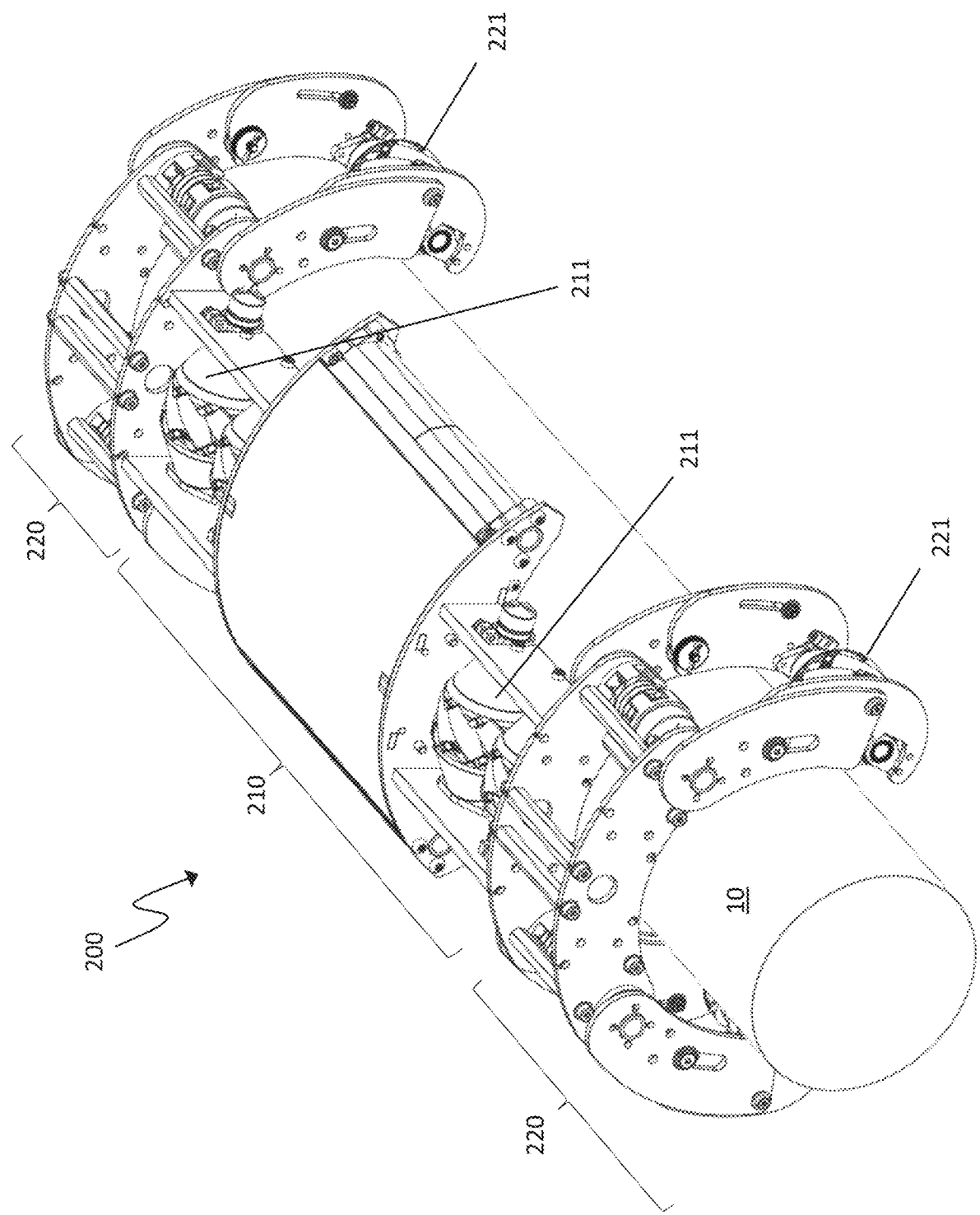
FIG. 23 is a perspective view of a representative embodiment of robotic apparatus, in accordance with an embodiment of the present disclosure.

FIG. 23 is a perspective view of a representative embodiment of robotic apparatus 200. Robotic apparatus 200, in various embodiments, may generally include a center drive module 210 and one or more clamping drive modules 220. Generally speaking, center drive module 210 and clamping drive module(s) 220 may include a plurality of wheels 211, 221 powered by one or more motors 215, 225, respectively, to move and steer robotic apparatus 200 along pipe 10, and each clamping drive module 220 may be configured to bias wheels 211, 221 against pipe 10 to secure robotic apparatus 200 to pipe. While modules 210, 220 may be referred to herein as "drive" modules, the present disclosure is not intended to be limited to embodiments in which all modules 210, 220, respectively, comprise motors 215, 225, nor to embodiments in which all or any particular combination of wheels 211, 221 are powered. One having ordinary skill in the art will recognize appropriate configurations of powered/unpowered wheels 211, 221 to effect the desired motion of robotic apparatus 200 on pipe 10.

Embodiments of robotic apparatus 200 typically have numerous advantages over existing or alternative solutions, including:

Clearance. The design is very compact compared to other pipe crawling robots. For example, the embodiment shown in the FIGS. requires no more than 2.4" in any direction around pipe 10. For comparison, the most compact robot on the market known to the inventors requires about 2.75" of clearance. A big reason for this low clearance is the clamping drive module 220 design, where the clamping assembly 230 is custom made for specific pipe sizes. This allows a design that is much more compact compared to a robot design that is design to handle a large range of pipe sizes with the same parts.

Low Weight. The design is also very lightweight. The design in the FIGS. weighs around 15 lbs. Similar to the clearance, the clamping drive module 220 design helps lower the weight of the robot as well. Since this robot does not rely on magnets to adhere to the pipe, it can avoid the weight associated with those.

Maneuverability. Thanks to the driven wheels 211, 221, the robot can drive in any direction along the surface of the pipe, including purely axial or circumferential motion. Since there are no constraints on the direction of travel, the robot can drive in a straight line from its current position to any desired point on the surface of the pipe. This simplifies the control of the robot, improves its efficiency, and the ability to navigate different potential obstacles along the pipe.

Large Range of Pipe Sizes. Thanks to the modular clamping drive modules 220, the robot can be configured to fit on a large range of different pipe sizes (e.g., diameters between 4.5" to 14" for the example embodiment). One set of clamping drive modules 220 would be used for one specific pipe size, but with the optional adjustment mechanism 235 one set of clamping drive modules 220 could work with a range of pipe sizes. This would reduce the total number of different clamping drive modules 220 the operator would need in order to use the robot on any pipe size within the robot's full range. Additionally or alternatively, the modular design also allows the operator to swap out clamping drive modules 220 of various sizes to accommodate different pipe sizes.

Vertical and Horizontal Pipes. This robot can drive on both horizontal and vertical pipes. Unlike some designs, that rely on gravity by balancing on the top of horizontal pipes, this robot uses a clamping force to attach to the pipe and can therefore drive on both vertical and horizontal pipes.

Bare and Insulated Pipes. This robot can drive on both bare and insulated pipes. Unlike some designs, that rely on magnets to attach to the pipe, this robot uses a clamping force to attach to the pipe and can therefore drive on both bare and insulated pipes.

Open Side to Pass Obstacles. This robot has an open side through which obstacles can pass as the robot traverses pipe 10.

Center Drive Module 210

Figure 24:
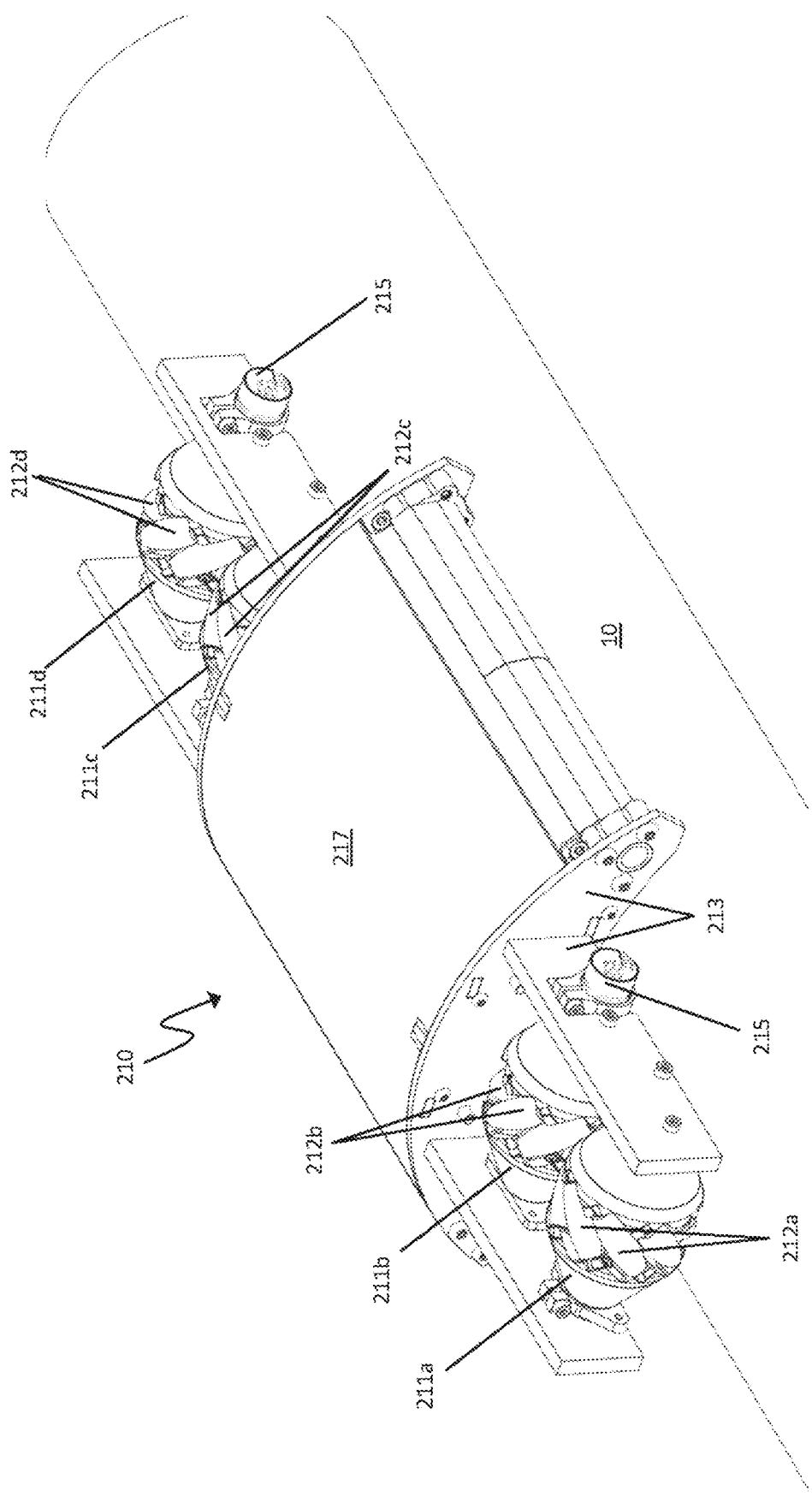
FIG. 24 is a perspective view of a representative center drive module, in accordance with an embodiment of the present disclosure.

FIG. 24 is a perspective view of a representative center drive module 210. Center drive module 210, in various embodiments, may generally include one or more wheels 211 powered by one or more motors 215, which are similar to wheels 111 and motors 125 of robotic apparatus 100, respectively. In the embodiment shown, center drive module 210 includes four independently-powered wheels 211, with two wheels 211a, 211b mounted on a first end of frame 213 on a first side of center drive module 210 and two wheels 211c, 211d mounted to a second end of frame 213 on a second side of center drive module 210. In some embodiments, frame 213 may be rigid while, in other embodiments, those "arm" portions to which wheels 211 are mounted may articulate up/down relative to the central portion and be biased (e.g., spring loaded) towards pipe 10 (i.e., downwards) to more effectively spread the resulting normal force, traction, and load more evenly between wheels 211, as well as allow robotic apparatus 200 to drive over small obstacles on the surface of pipe 10 more easily.

Wheels 211, in various embodiments, may be grouped into pairs in which the rollers 212 of one wheel 211 have an orientation mirroring that of the rollers 212 on the other wheel 211. For example, in the four-wheeled embodiment of center drive module 210 shown in FIG. 24, the orientation of rollers 212a of wheel 211a mirrors that of the rollers 212b of wheel 211b, and the orientation of rollers 212c of wheel 211c mirrors that of the rollers 212d of wheel 211d. As with the similar mirrored-roller configuration of robotic apparatus 100, travel along various paths on pipe 10 may be accomplished by driving wheels 211 (alone or in combination with wheels 221) in various combinations, as further described in more detail below.

In various embodiments, such as that shown in FIG. 24, the main rotation axis of each wheel 211 may be oriented to be perpendicular to a longitudinal axis of the pipe 10 when the robotic apparatus 200 is secured to pipe 10 (e.g., oriented in a lateral direction on frame 213). Stated otherwise, wheels 211 are orientated such that they rotate in the direction of axial travel along pipe 10, much like the wheels of a car rotate in the direction the car is heading on a road. Such a configuration tends to maintain more traction between wheel 211 and pipe 10 when driving over small obstacles on the surface of pipe 10, such as insulation banding, compared with wheels oriented in a longitudinal direction on frame 213, as the former can use the circular cross-section of the wheel 211 to gradually lift itself over an obstacle, whereas the latter has a rectangular cross-section in the direction of travel which does not tend to lift itself over obstacles.

In configurations where the main rotation axis of each wheel 211 is oriented to be perpendicular to a longitudinal axis of the pipe 10 when the robotic apparatus 200 is secured to pipe 10 (e.g., oriented in a lateral direction on frame 213), wheels 211 are preferably mounted along a centerline of center drive module 210 such that wheels 211 contact pipe 10 at different longitudinal positions along a length of pipe 10 and at a common circumferential position about a circumference of pipe 10, as shown. Positioning wheels 211 in such fashion helps ensure the main rotation axis of wheels 211 remains parallel to the contacted surface of pipe 10, thereby maximizing the contact area between wheels 211 and the surface of pipe 10. Conversely, were wheels 211 to be circumferentially offset from one another the main rotation axis of wheels 211 not being directly parallel with the contacted surface of pipe 10, causing wheel 211 to partially ride along its "rim" and thus reducing the contact area between the wheels 211 and the surface of pipe 10. This is illustrated in FIG. 8.

In an alternative embodiment (not shown), the main rotation axis of each wheel 211 may instead be oriented to be parallel with a longitudinal axis of pipe 10 (e.g., in a longitudinal direction on frame 213). Stated otherwise, wheels 211 are orientated such that they rotate in the direction of circumferential travel along pipe 10. Such a configuration tends to maintain more traction between wheel 211 and pipe 10 when driving in a circumferential direction about pipe 10, but may experience reduced traction when travelling over small obstacles on the surface of pipe 10, such as insulation banding, for reasons similar to those explained above. In such a configuration, wheels 211 are preferably mounted off the centerline of center drive module 210 such that wheels 211 contact pipe 10 at different circumferential positions about a circumference of pipe 10. This circumferential spacing between wheels 211 of a given pair can provide extra stability to robotic apparatus 200 on pipe 10 since the clamping force can be applied from four directions, compared with three. The circumferentially-offset wheels 211 of a given pair may be arranged at a common longitudinal position on pipe 10.

Various electronics 217 may be mounted on a center portion of frame 213 between the two sets of wheels 211. For example, electronics 217 may contain components for operating robotic apparatus 200, such as a circuit board with a controller configured to actuate motors 215, 225 in accordance with executable instructions stored on a memory component. In some embodiments, payload(s) may be carried on one or more drive platforms 110, on frame 113, or on any other suitable location on robotic apparatus 100. Of course, robotic apparatus 100 could additionally or alternatively be powered via a power cord or other suitable power source in various embodiments.

Clamping Drive Module 220

Figure 25A:
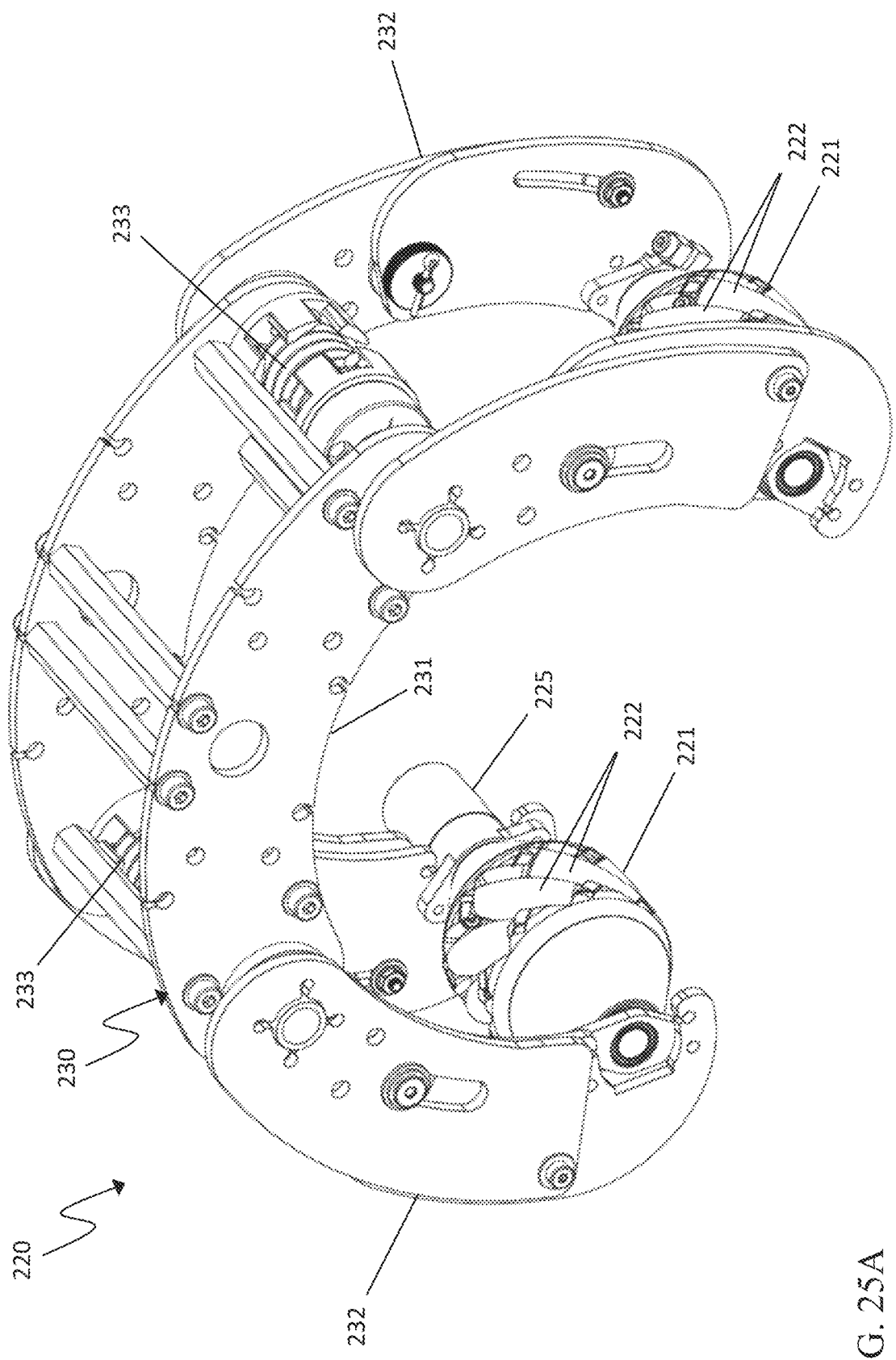
FIG. 25A and FIG. 25B are perspective views of representative clamping drive modules for use on small diameter pipes and large diameter pipes, respectively, in accordance with two embodiments of the present disclosure.
Figure 25B:
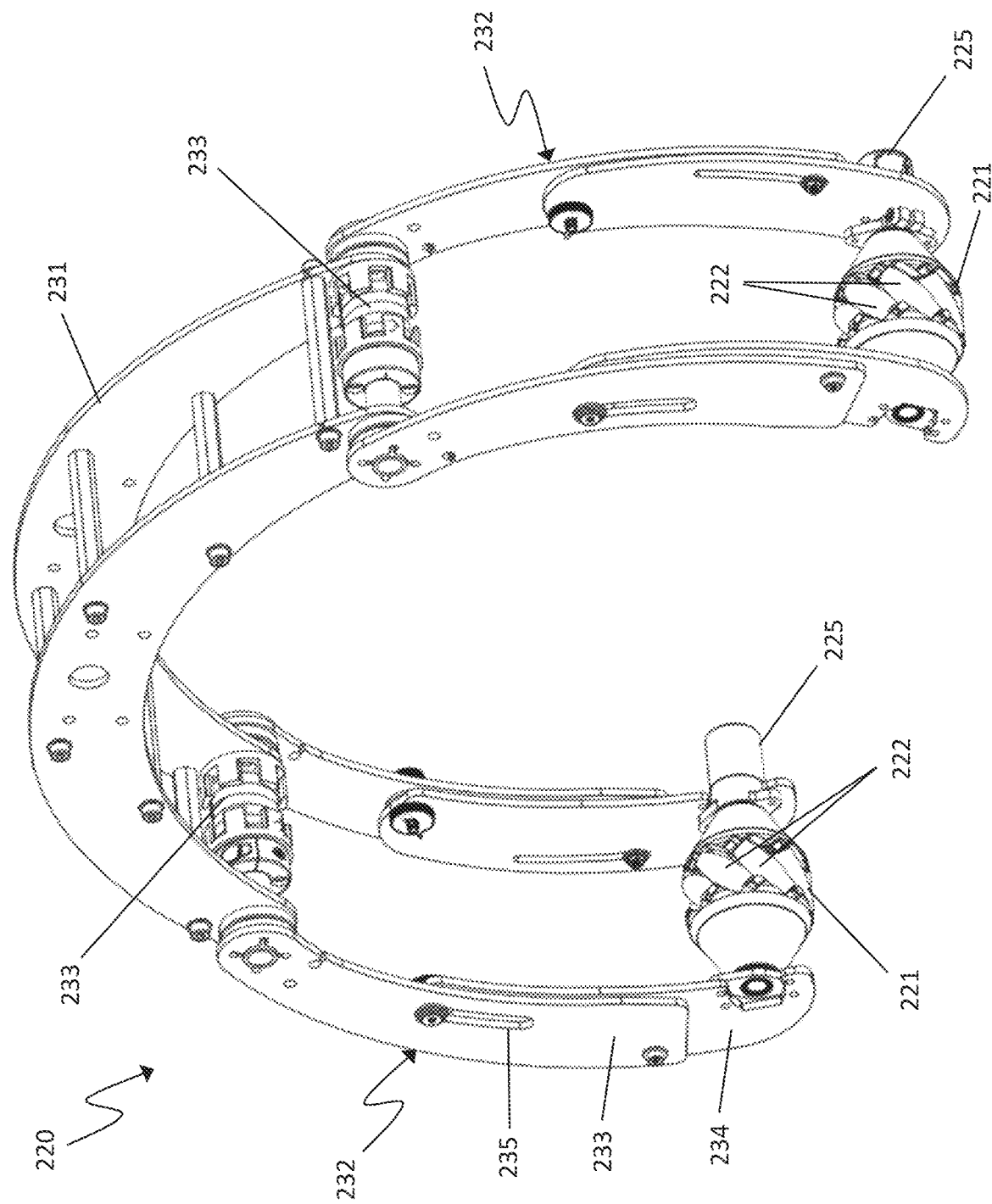
Figure 26:
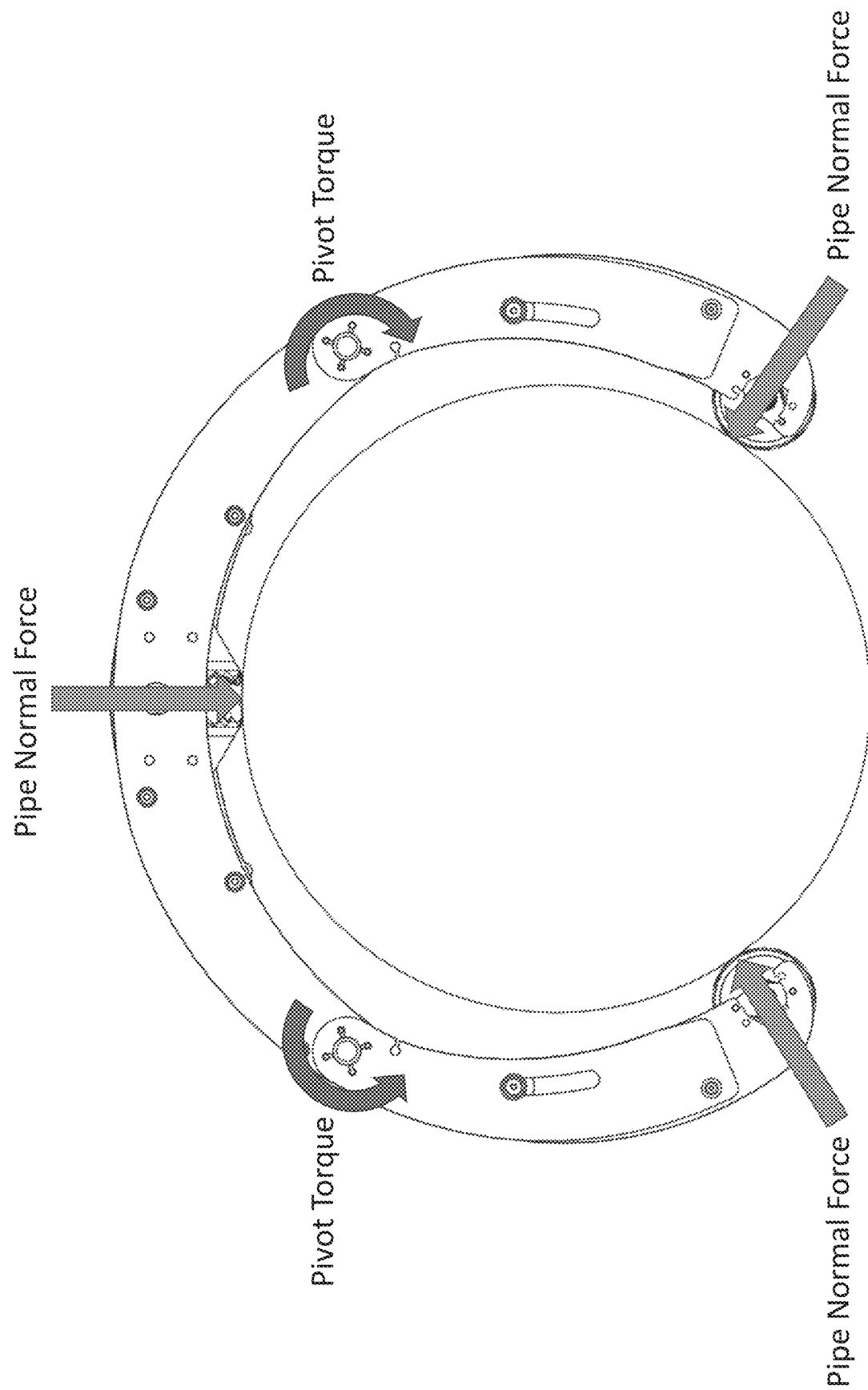
FIG. 26 is a schematic illustration of forces applied to secure an embodiment of a robotic apparatus to a pipe, in accordance with an embodiment of the present disclosure.

FIG. 25A and FIG. 25B are perspective views of representative clamping drive modules 220 for use on small diameter pipes and large diameter pipes, respectively. Clamping drive module 220 may generally include two or more wheels 221 powered by two or more motors 225, as well as a clamping assembly 230. Generally speaking, clamping drive module 220 is sized and shaped to wrap around a portion of the circumference of pipe 10. Similar to clamping member 130 of robotic apparatus 100, clamping assembly 230 may be configured to apply a force for urging wheels 211, 221 towards an outer surface of pipe 10 for securing robotic apparatus 200 to pipe 10. Here though, clamping drive module 220 may be configured to position wheels 221 not on directly opposing sides of pipe 10, but rather closer together than that—preferably in a manner that forms a triangle-like arrangement with wheels 211 about the circumference of pipe 10 when robotic apparatus 200 is viewed head-on such that the normal forces applied by the circumferentially offset wheels balance to provide stability and secure robotic apparatus 200 to pipe 10, as later shown in FIG. 26.

Still referring to FIG. 25A and FIG. 25B, clamping assembly 230, in various embodiments, many comprise a static member 231 and two articulating arm members 232. Static member 231 may rigidly attach to center drive module 210 (e.g., with wheels 211 contacting pipe 10 somewhere on its top third) and articulating arm members 232 may extend around opposing sides of pipe 10 (e.g., such that wheels 221 contact pipe 10 somewhere on its bottom two thirds, respectively, to provide mechanical stability). Static member 231 and articulating arm members 232 may be rotatably coupled so as to form articulated joints between static member 231 and each of articulating arm members 232. Biasing members 233, such as a torsion spring, may be configured to apply a force that urges each articulating arm 232 towards pipe 10. The torque should be tuned such that the resulting normal forces on wheels 221 are sufficient (based on the coefficient of friction) for wheels 221 to get traction and not slip on pipe 10. However, an excessive torque can start to deform some insulation materials that are commonly used on industrial piping (such as mineral wool), place excessive loads on various structural parts of robotic apparatus 200, and or increase the power required to drive robotic apparatus 200 along pipe 10. As configured, clamping assembly 230 "hugs" pipe 10, pulling wheels 221 and wheels 211 against pipe 10 to secure clamping drive module 220 and center drive module to pipe 10. Notably, in various embodiments, clamping drive module 220 does not fully circumscribe pipe 10, but rather leaves an open side 239 opposite center drive module 210 through which obstacles can pass as robotic apparatus 200 traverses pipe 10, as later shown in FIG. 27 and FIG. 28.

Referring to FIG. 25B, articulating arm members 232 may be adjustable in length in some embodiments. In one such embodiment, articulating arm member 232 may be comprised of a first member 233 and a second member 234, and coupled together by an adjustable coupler 235 such as the slot-and-screw coupler shown. For a shorter articulating arm member 232, the screw can be loosened and second member 234 moved upwards so as to increase an amount of overlap between a proximal end of second member 234 and a distal end of first member 233, whereupon the screw can be retightened. Conversely, for a longer articulating arm member 232, the screw can be loosened and second member 234 moved downwards so as to decrease an amount of overlap between a proximal end of second member 234 and a distal end of first member 233, whereupon the screw can be retightened. These lengthwise adjustments can be made to help fit the specific pipe size optimally.

Figure 27A:
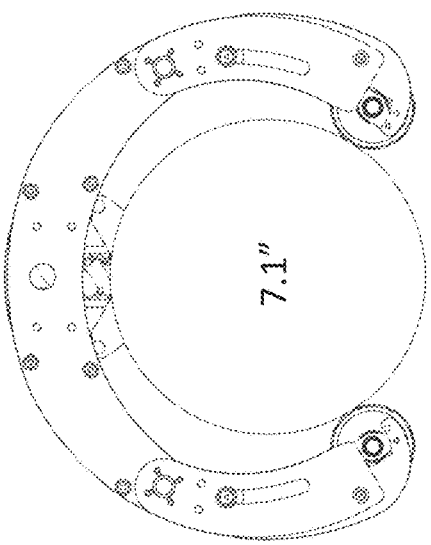
FIGS. 27A-27E illustrate embodiments of a robotic apparatus on various sizes of pipes ranging from 4.5" in FIG. 27A TO 11.5" in FIG. 27E, in accordance with some embodiments of the present disclosure.
Figure 27B:
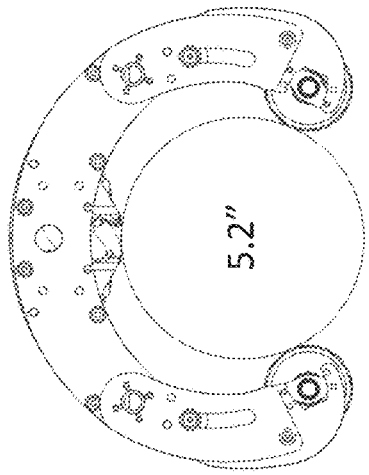
Figure 27C:
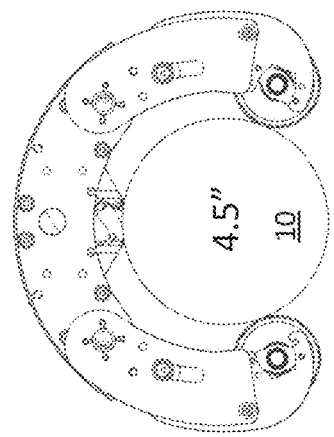
Figure 27D:
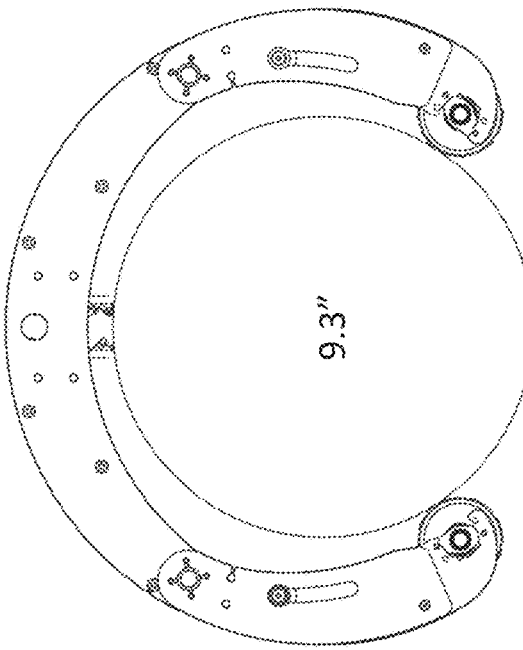
Figure 27E:
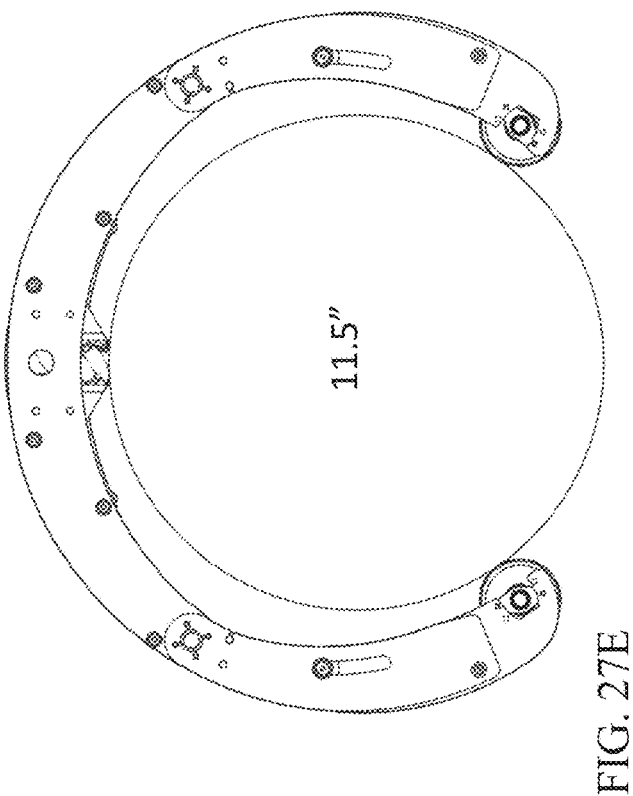

FIGS. 27A-27E illustrate embodiments of robotic apparatus 200 on various sizes of pipes 10 ranging from 4.5" in FIG. 27A TO 11.5" in FIG. 27E. Robotic apparatus 200, in various embodiments, has a modular configuration in which a given clamping drive modules 220 can be detached from center drive module 210 and replaced with a different sized clamping drive module 220, thereby allowing robotic apparatus 200 to operate on pipes 10 of various sizes. For example, a small clamping drive module 220 is shown in use on the smaller pipe of FIG. 27A whereas a large clamping drive module 220 is shown in use on the larger pipe of FIG. 27E. Generally speaking, an appropriate sized clamping drive module 220 may have a static member 231 and articulating arm members 232 of similar or slightly larger radius of curvature as that of pipe 10, and articulating arm members 232 may have a length configured to position wheels 221 in the arrangement previously described. It is generally not desirable to use a larger clamping drive module 220 than necessary, as the extra size will increase the amount of clearance around pipe 10 necessary for robotic apparatus 200 to traverse pipe 10 without interference from nearby obstacles, potentially reduce the size of open side 239, and potentially position wheels 221 unfavorably from a stability standpoint.

Additionally or alternatively, robotic apparatus 200, in various embodiments, has a modular configuration in the sense that articulating arm members 232 can be lengthened or shortened to accommodate various pipe sizes. One set of clamping drive modules 220 would be used for one specific pipe size, but with the optional adjustment mechanism 235 one set of clamping drive modules 220 could work with a range of pipe sizes. This would reduce the total number of different clamping drive modules 220 the operator would need in order to use the robot on any pipe size within the robot's full range.

In various embodiments, the rollers 222 of one wheel 221 on a given clamping drive module 220 may have the same orientation as the rollers 222 of the other wheel 221, as shown. In various other embodiments, the rollers 222 of one wheel 221 on a given clamping drive module 220 may have an orientation mirroring that of the rollers 222 on the other wheel 221. Travel along various paths on pipe 10 may be accomplished by driving wheels 221 (alone or in combination with wheels 211) in various combinations, as further described in more detail below.

In various embodiments, such as those shown in FIG. 25A and FIG. 25B, the main rotation axis of each wheel 221 may be oriented parallel to the longitudinal axis of pipe 10. Stated otherwise, wheels 221 are orientated such that they rotate in the direction of circumferential travel along pipe 10. Positioning wheels 211 in such fashion ensures the entire width of wheel 221 contacts pipe 10, thereby ensuring traction along the circumferential direction of pipe 10 under all conditions. Conversely, were the main rotation axis of wheels 221 to be oriented perpendicular to the longitudinal axis of pipe 10, a mismatch in the length of articulating clamping arms 232 and the diameter of pipe 10 may result in the main rotation axis of wheels 221 not being directly parallel with the contacted surface of pipe 10, causing wheel 221 to partially ride along its "rim" and thus reducing the contact area between the wheels 221 and the surface of pipe 10.

In an alternative embodiment (not shown), the main rotation axis of each wheel 221 may instead be oriented perpendicular to the longitudinal axis of pipe 10. Stated otherwise, wheels 221 are orientated such that they rotate in the direction of axial travel along pipe 10. Such a configuration tends to maintain more traction between wheel 221 and pipe 10 when driving in an axial direction along pipe 10 and thus does well when travelling over small obstacles on the surface of pipe 10, such as insulation banding, for reasons similar to those explained above. That said, as explained above, such a configuration requires a precise match between the length of articulating clamping arms 232 and the diameter of pipe 10 to ensure uniform contact across the width of wheel 221 rather than wheel 221 partially riding along its "rim".

Figure 29:
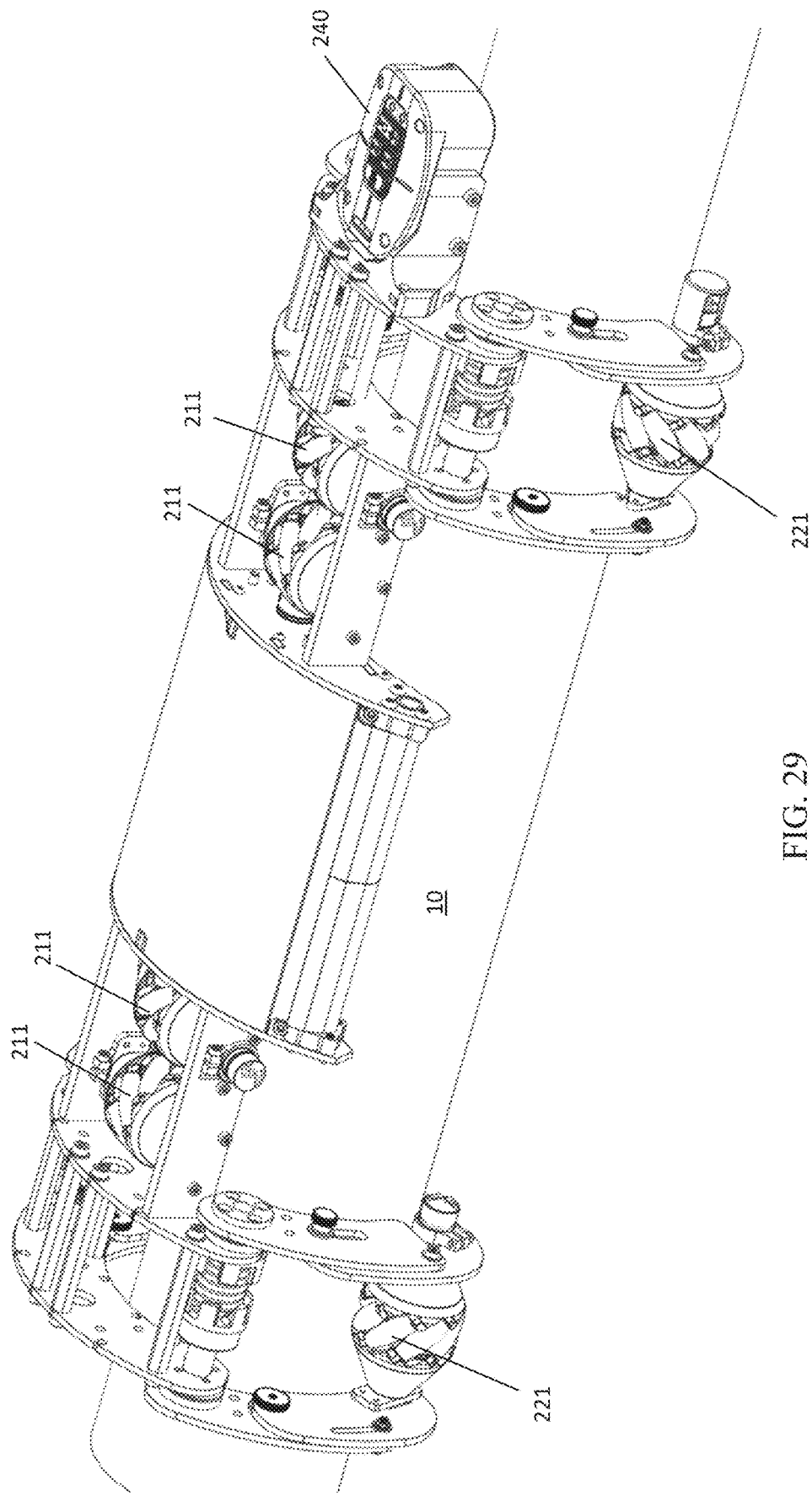
FIG. 29 is a perspective view of a representative embodiment of robotic apparatus on a pipe, in accordance with an embodiment of the present disclosure.
Figure 30:
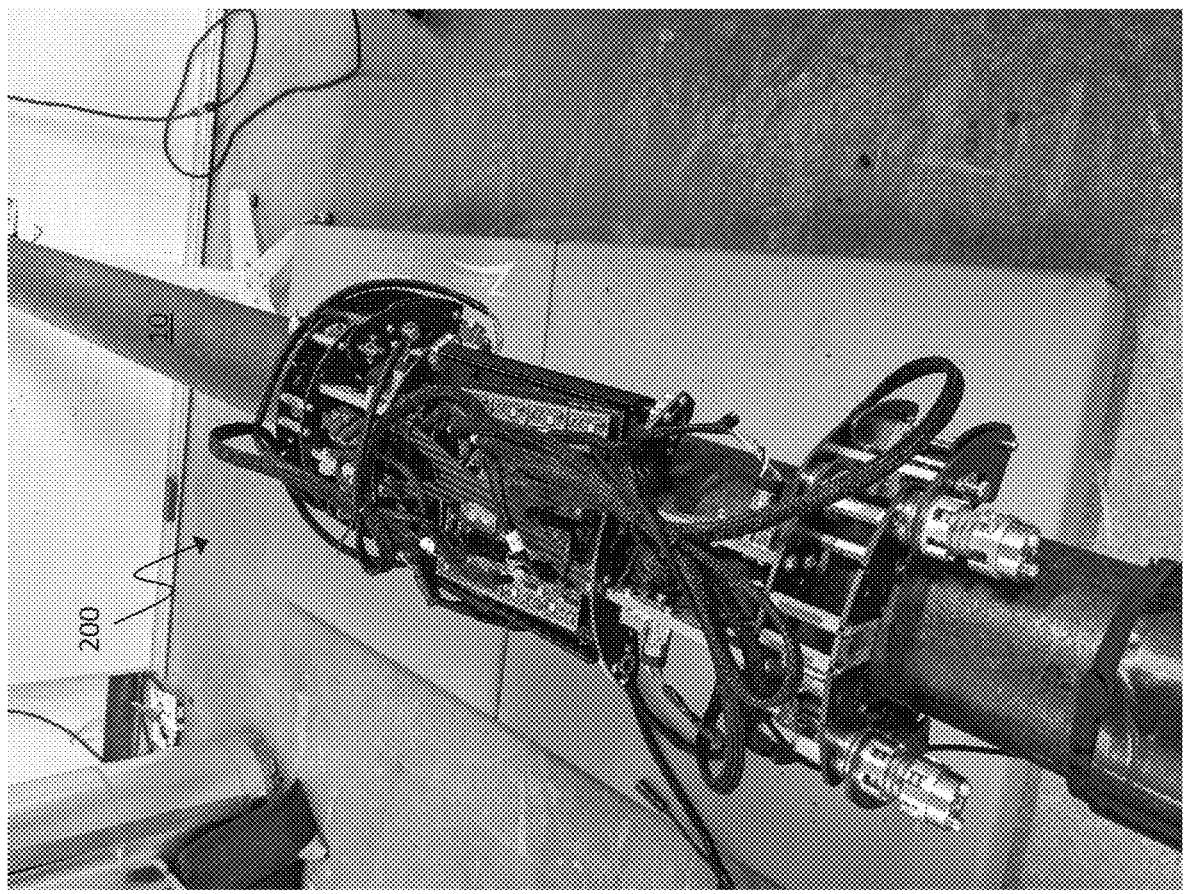
FIG. 30 shows a prototype robotic apparatus on a pipe, in accordance with an embodiment of the present disclosure.

FIG. 29 is a perspective view of a representative embodiment of robotic apparatus 200 on a pipe 10. In this preferred embodiment, the main rotation axis of wheels 211 of center drive module 210 are oriented perpendicular to the longitudinal axis of pipe 10 such that they rotate in the direction of axial travel along pipe 10, and the main rotation axis of wheels 221 of clamping drive module 220 are oriented parallel to the longitudinal axis of pipe 10 such that they rotate in the direction of circumferential travel along pipe 10. This particular combination ensures good traction in both the axial and circumferential directions, with center drive module 210 providing the best traction for travel in the axial direction and clamping drive modules 220 providing the best traction for travel in the circumferential direction. Notably, neither suffers from mismatch issues which may cause its respective wheels to ride on their rims or otherwise not have uniform contact across the entire width of the wheel.

Various payloads can optionally be added to robotic apparatus 200 (in some embodiments, on clamping drive module 220) to enable robotic apparatus 200 to perform different tasks. Such payloads can be attached to either end of robotic apparatus 200. For example, FIG. 29 shows a probe attached to a clamping member 220. Representative payloads include, without limitation, cameras and non-destructive inspection equipment such as pulsed eddy current equipment and ultrasonic testing equipment.

Traversing Pipeline and Avoiding Obstacles

Figure 31A:
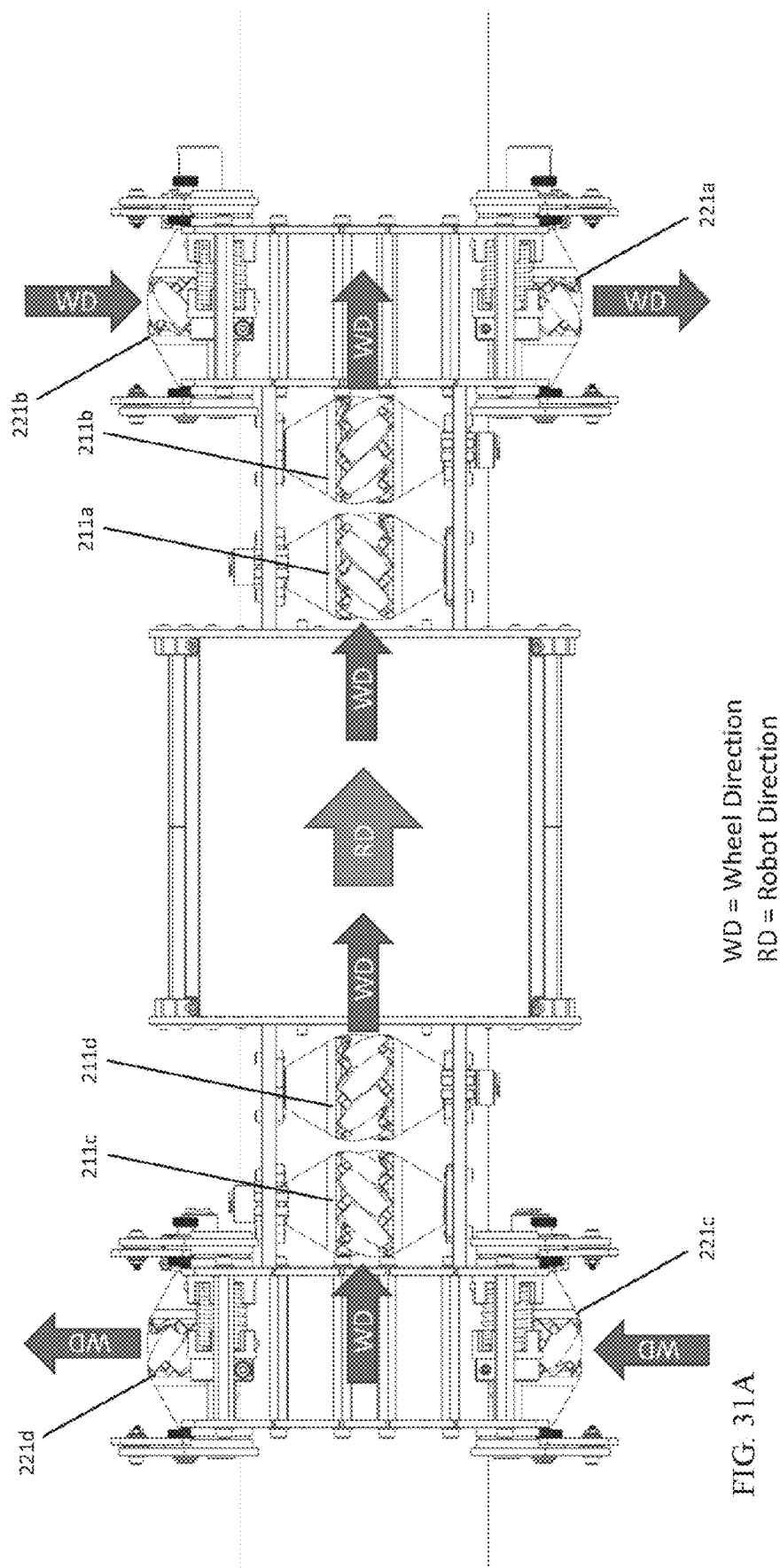
FIG. 31A, FIG. 32A, and FIG. 33A show the directions that the wheels need to be driven, for an exemplary embodiment having a center drive module and two clamping drive modules, to drive the whole robotic apparatus axially, circumferentially or helically around the pipe, respectively, in accordance with an embodiment of the present disclosure.
Figure 32A:
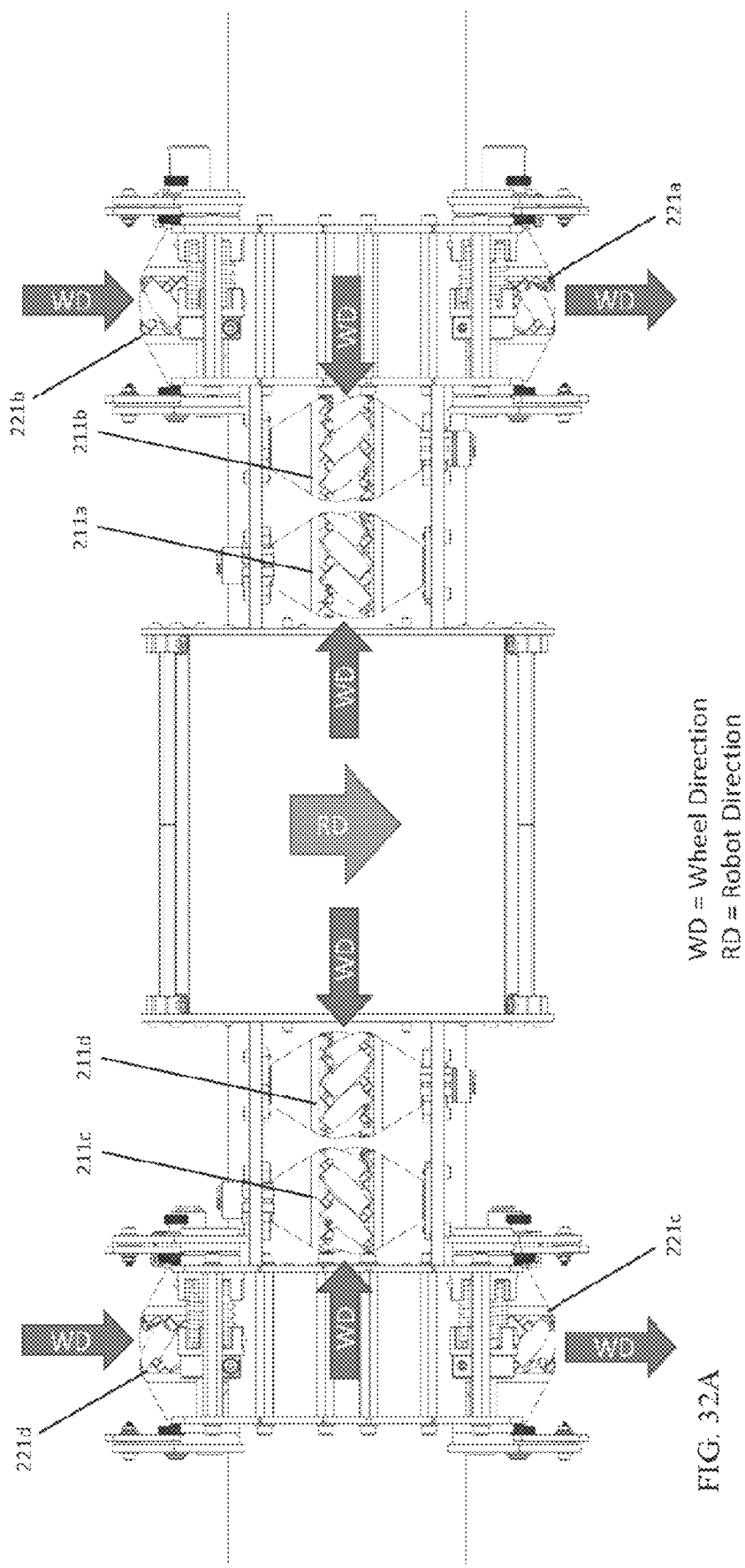
Figure 33A:
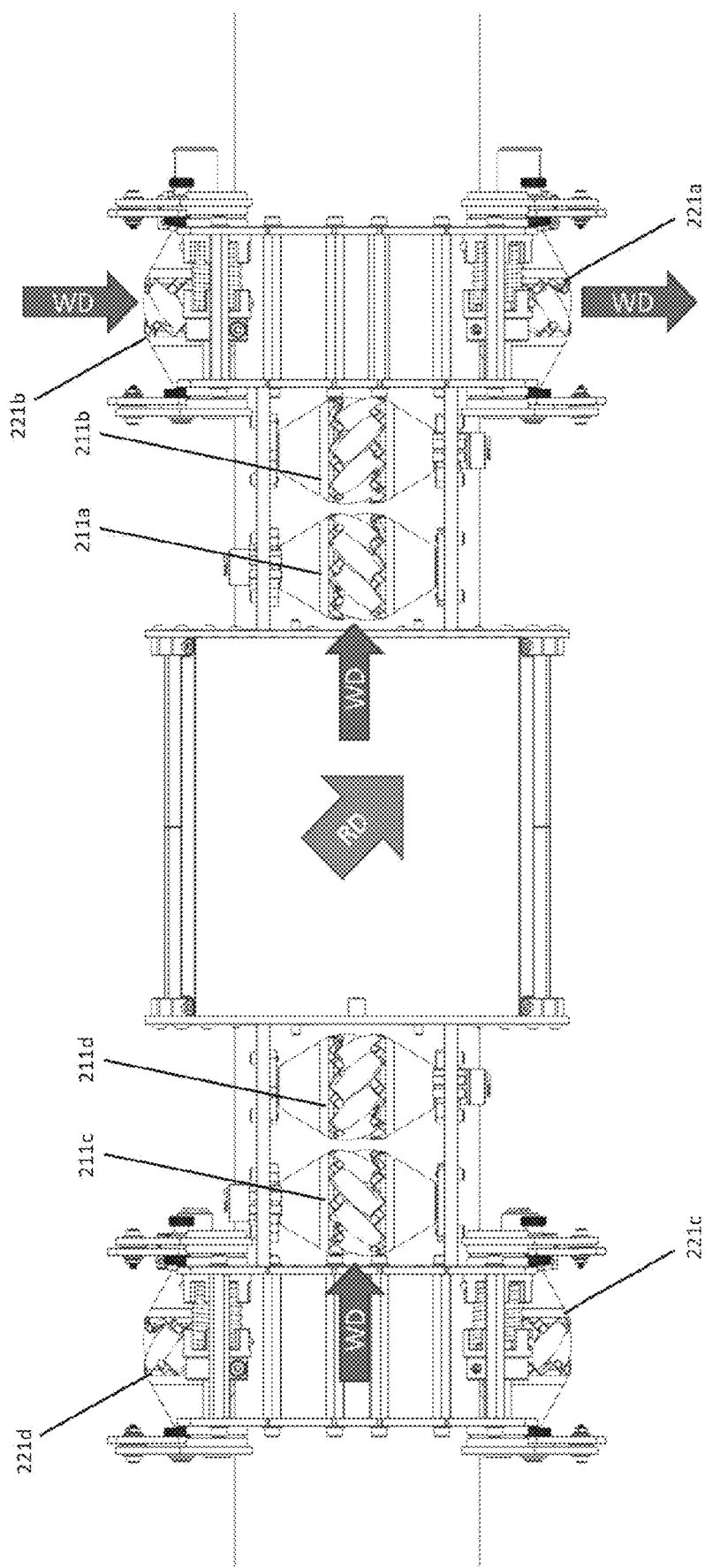

FIG. 31A, FIG. 32A, and FIG. 33A show the directions that the wheels 211, 221 need to be driven, for the exemplary embodiment of FIG. 29 having a center drive module and two clamping drive modules, to drive the whole robotic apparatus axially, circumferentially or helically around the pipe, respectively.

Referring first to FIG. 31A, robotic apparatus 200 may be advanced in an axial direction by (i) simultaneously rotating, at equal speeds, wheels 211a, 211b, 211c, 211d in the same direction as one another, and (ii) simultaneously rotating, at equal speeds, wheels 221a, 221b in a first direction and wheels 221c, 221d in a second, opposing direction. Of course, this example assumes all wheels 211, 221 are powered. In various embodiments, fewer than all of the wheels 211, 221 may be powered yet robotic apparatus 200 can still be advanced in an axial direction. For example, in some embodiments, wheels 211a, 211b may be powered and wheels 211c, 211d may be unpowered, or vice versa; in either case, the opposite-handedness of the rollers 212 of either pair ensures that robotic apparatus 200 is advanced in an axial direction. Likewise, in some embodiments, only one wheel of pair 221a, 221b and only one wheel of pair 221c, 221d may be powered. Many different combinations of powered vs. non-powered wheels can be implemented to advance robotic apparatus 200 in an axial direction. One of ordinary skill in the art can deduce how the wheel driving directions need to change if any wheel handedness (left-hand or right-hand) or wheel orientation changes based on the teachings of the present disclosure.

Referring to FIG. 32A, robotic apparatus 200 may be advanced in an circumferential direction by (i) simultaneously rotating, at equal speeds, (a) wheels 211a, 211b in opposing direction, (b) wheels 211c, 211d in opposing directions; and (ii) simultaneously rotating, at equal speeds, wheels 221a, 221b, 221c, 221d in the same direction as one another. Of course, this example assumes all wheels 211, 221 are powered. In various embodiments, fewer than all of the wheels 211, 221 may be powered yet robotic apparatus 200 can still be advanced in a circumferential direction. One of ordinary skill in the art can deduce how the wheel driving directions need to change if any wheel handedness (left-hand or right-hand) or wheel orientation changes based on the teachings of the present disclosure.

Referring to FIG. 33A, robotic apparatus 200 may be advanced in an helical direction by (i) simultaneously rotating, at equal speeds, wheels 211a, 211c in the same direction as one another, and (ii) simultaneously rotating, at equal speeds, wheels 221a, 221b in the same direction as one another. Here, wheels 211b, 211d, and 221c, 221d may be allowed to freely rotate, as shown. In various embodiments, fewer than all of the wheels 211, 221 may be powered yet robotic apparatus 200 can still be advanced in a circumferential direction. One of ordinary skill in the art can deduce how the wheel driving directions need to change if any wheel handedness (left-hand or right-hand) or wheel orientation changes based on the teachings of the present disclosure.

Figure 31B:
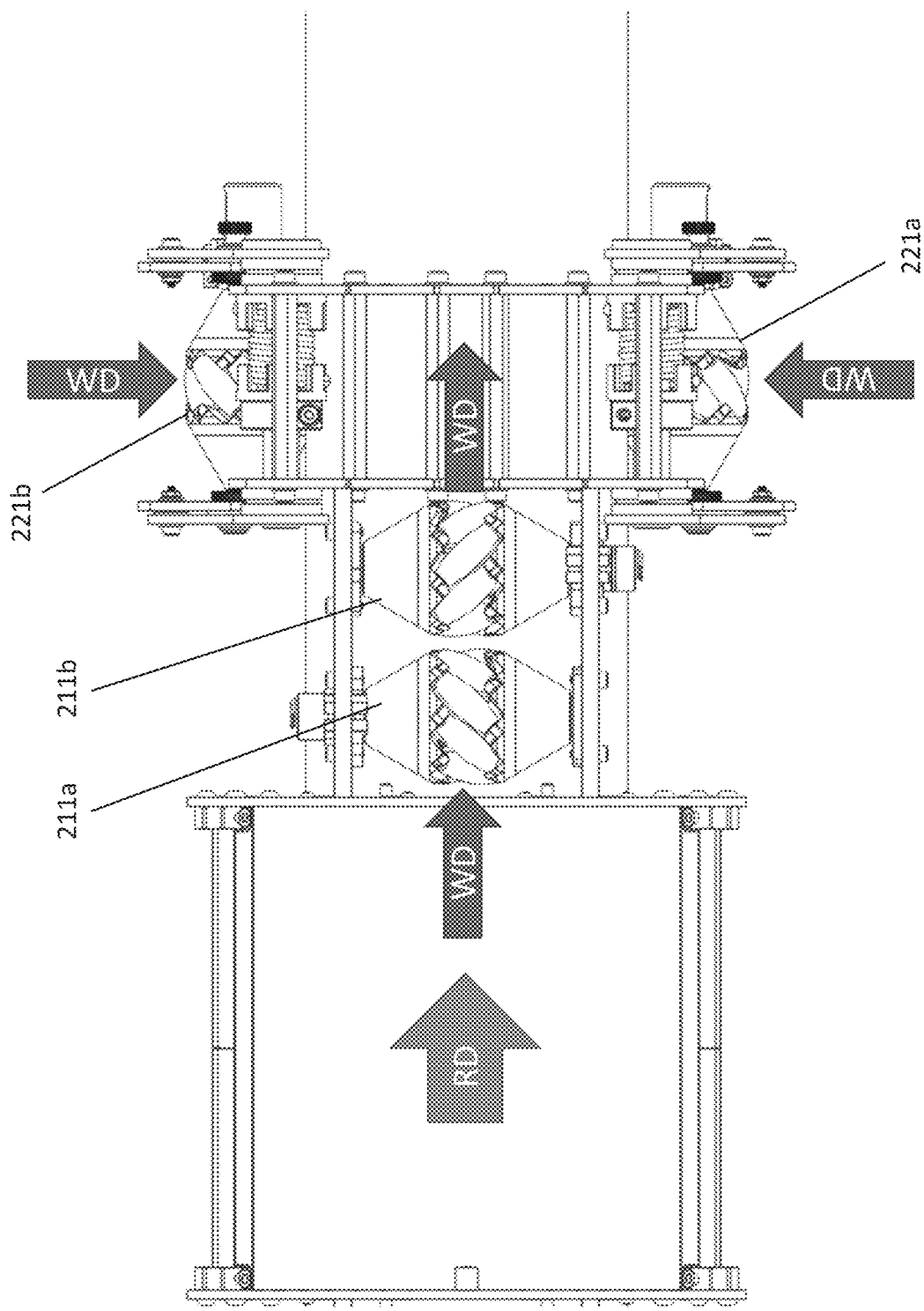
FIG. 31B, FIG. 32B, and FIG. 33B show the directions that the wheels need to be driven, for an exemplary embodiment having a center drive module and one clamping drive module, to drive the whole robotic apparatus axially, circumferentially or helically around the pipe, respectively, in accordance with an embodiment of the present disclosure.
Figure 32B:
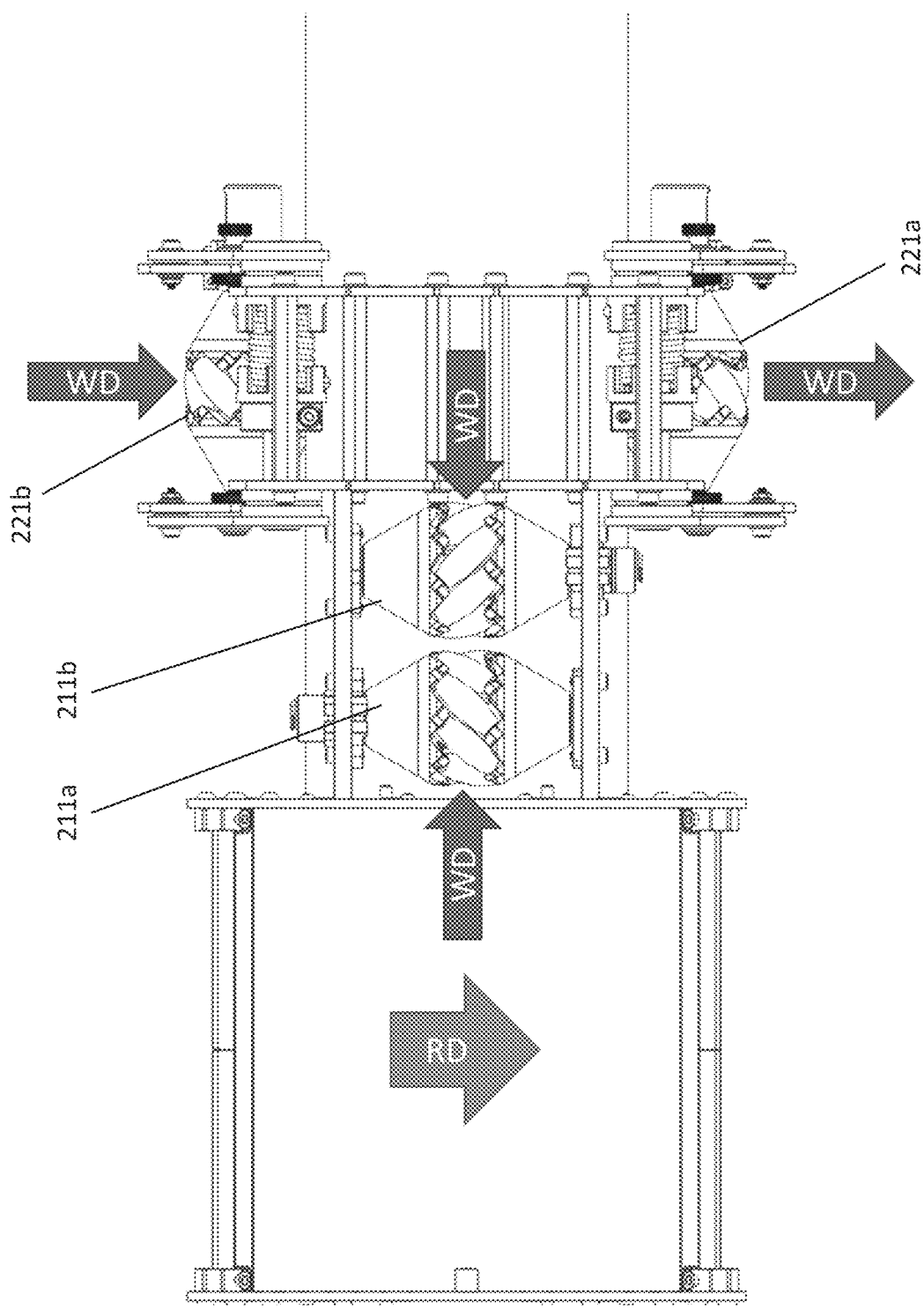
Figure 33B:
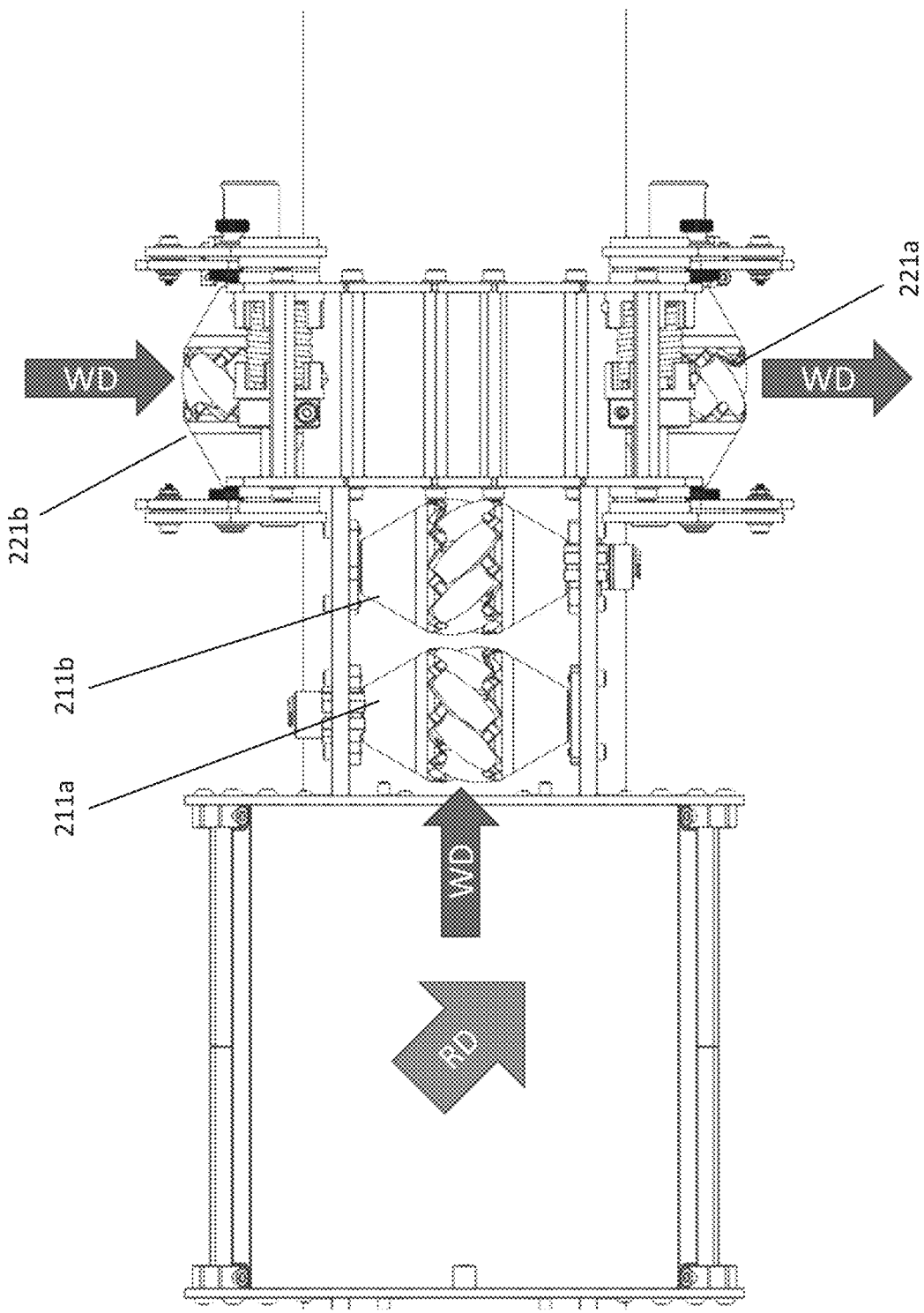

FIG. 31B, FIG. 32B, and FIG. 33B show the directions that the wheels 211, 221 need to be driven, for the another exemplary embodiment similar to that of FIG. 29 but having a center drive module and only one clamping drive module, to drive the whole robotic apparatus axially, circumferentially or helically around the pipe, respectively.

Referring first to FIG. 31B, robotic apparatus 200 may be advanced in an axial direction by (i) simultaneously rotating, at equal speeds, wheels 211a, 211b in the same direction as one another, and (ii) simultaneously rotating, at equal speeds, wheels 221a, 221b in opposing directions. Referring to FIG. 32B, robotic apparatus 200 may be advanced in an circumferential direction by (i) simultaneously rotating, at equal speeds, wheels 211a, 211b in opposing directions, and (ii) simultaneously rotating, at equal speeds, wheels 221a, 221b in the same direction as one another. Referring to FIG. 33C, robotic apparatus 200 may be advanced in an helical direction by (i) rotating wheel 211a in a first direction, and (ii) simultaneously rotating, at equal speeds, wheels 221a, 221b in the same direction as one another. One of ordinary skill in the art can deduce how the wheel driving directions need to change if any wheel handedness (left-hand or right-hand) or wheel orientation changes based on the teachings of the present disclosure.

Furthermore, it should be recognized that, when advancing robotic apparatus 200 in along a helical pathway, the pitch of the helical pathway may be determined based on the rotation speeds of wheels 211 relative to the rotation speeds of wheels 221. For example, rotating wheels 221 faster may impart a tighter pitch while rotating wheels 221 slower may impart a looser pitch.

Robotic Sensing and Controls

Robotic apparatus 200, in various embodiments, may include sensing and control capabilities similar to those shown and described in the "Robotic Sensing and Controls" section of the incorporated patent reference. One having ordinary skill in the art will recognize how to adapt such capabilities to robotic apparatus 200 of the present disclosure without undue experimentation.

Additional Components

Figure 34A:
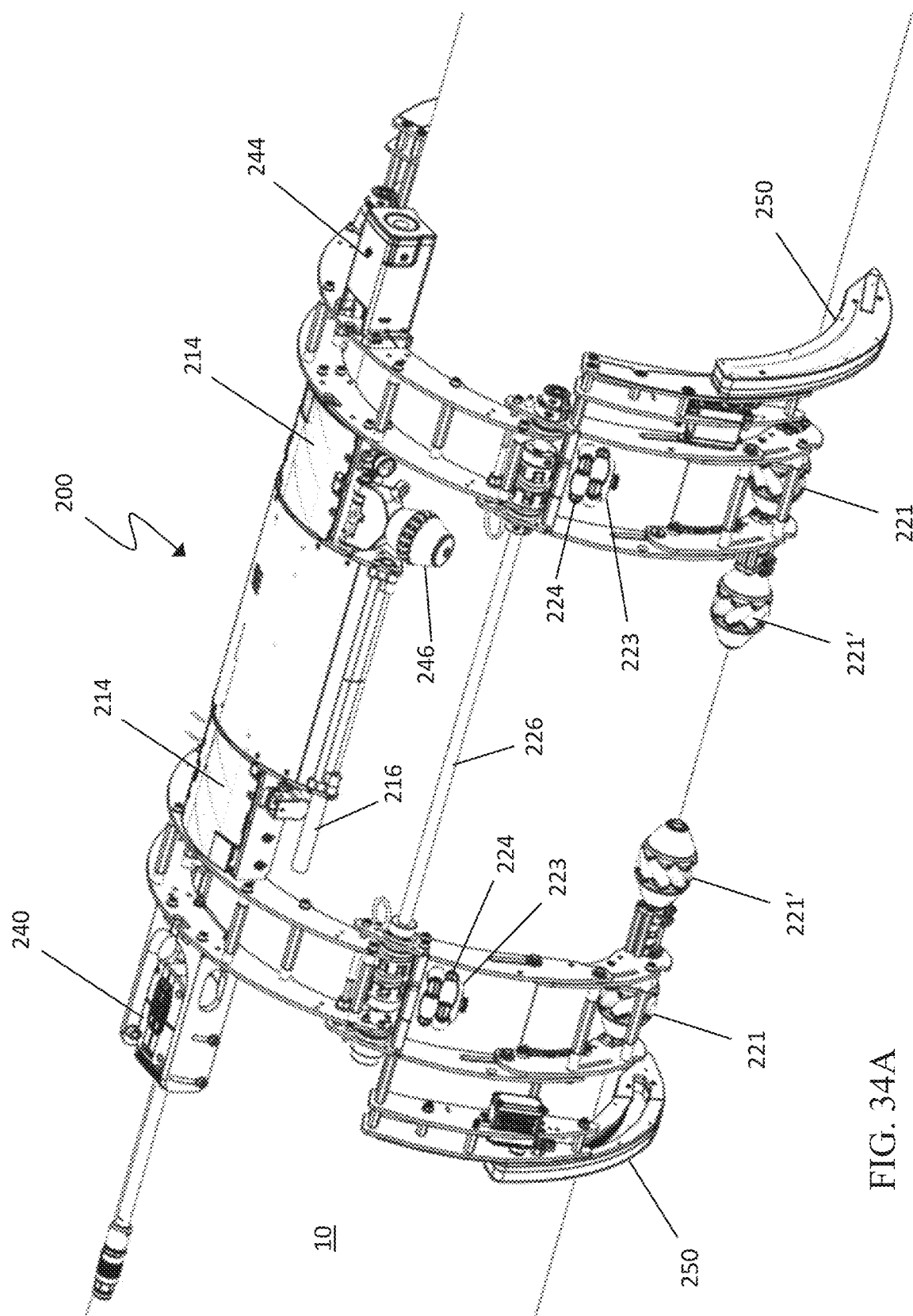
FIG. 34A and FIG. 34B illustrate side perspective and front perspective views of another robotic apparatus on a large diameter pipe, in accordance with an embodiment of the present disclosure.
Figure 34B:
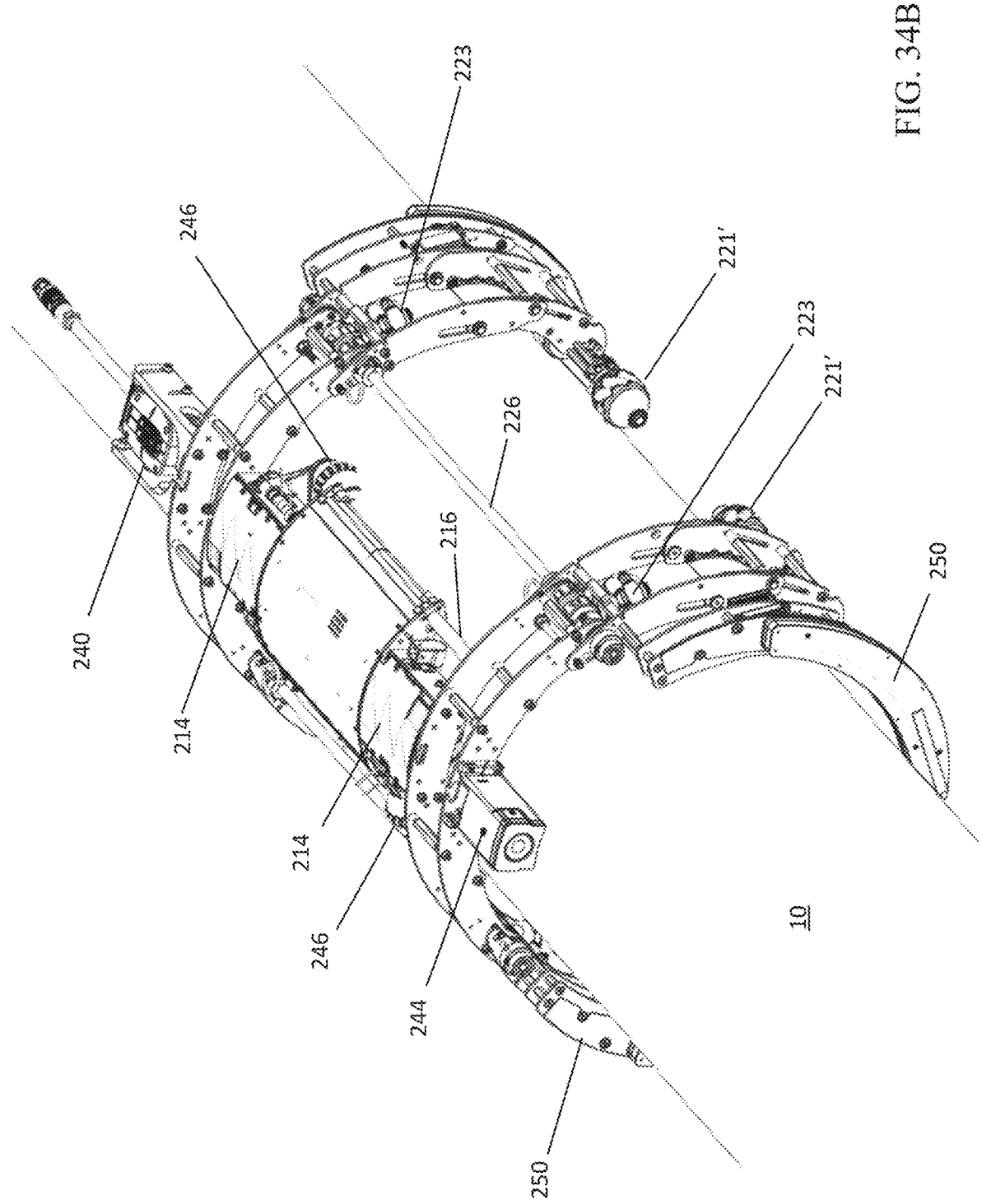
Figure 35:
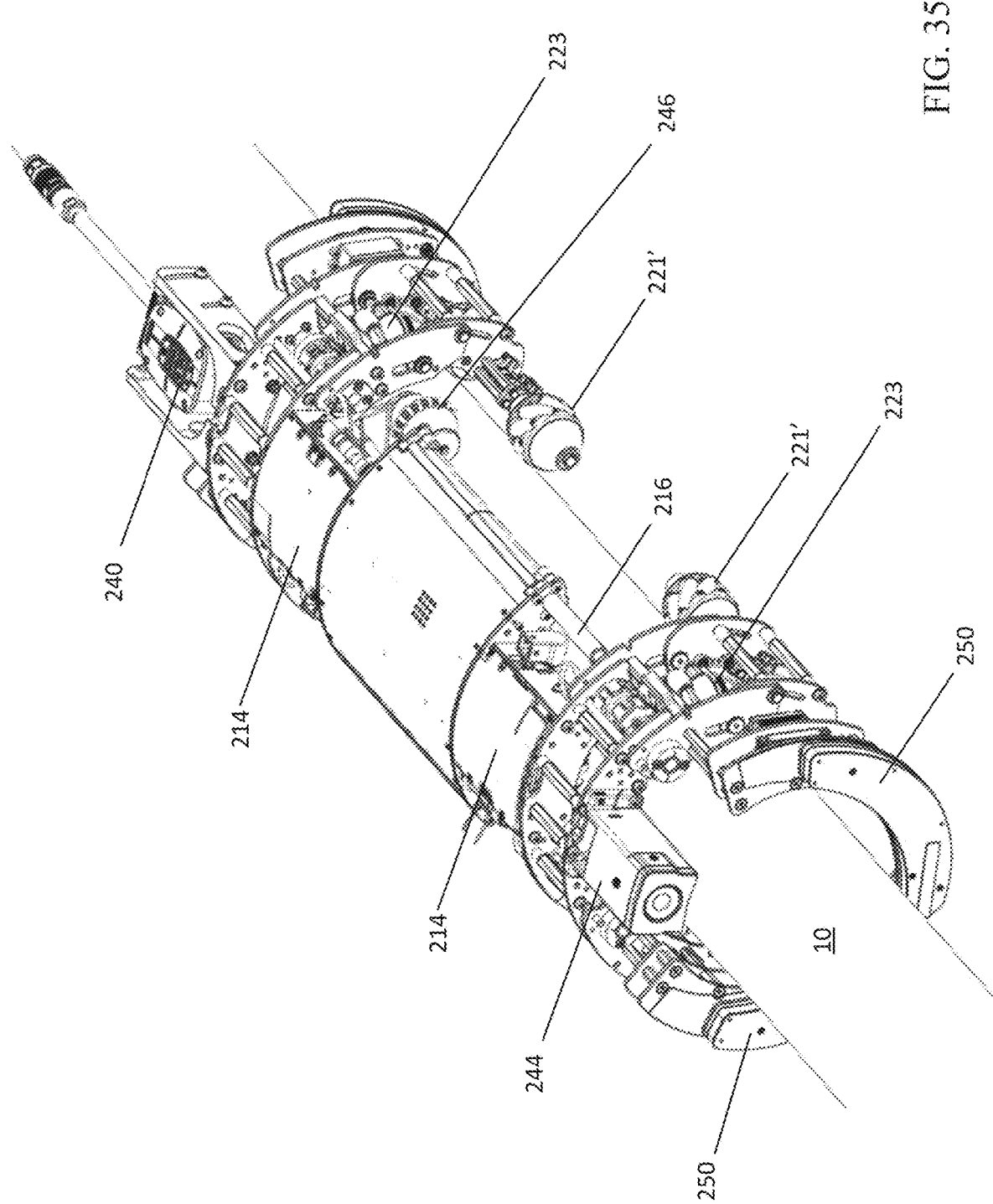
FIG. 35 illustrates a robotic apparatus as that shown in FIG. 34A and FIG. 34B, configured with smaller clamping drive modules for use on a smaller diameter pipe in accordance with an embodiment of the present disclosure.

FIG. 34A and FIG. 34B illustrate side perspective and front perspective views of another embodiment of robotic apparatus 200 on a large diameter pipe 10. Generally speaking, this particular embodiment of robotic apparatus 200 is similar in architecture to previously described embodiments, but may contain one or combination of additional components such as additional covers 214 for wheels 211, a handle 216, additional wheels 221, bumper wheels 223, one or more stiffening rods 2264, a sensor payload 240, a camera 244, one or more encoder wheels 246, fail safe assemblies 250, and spring-loaded assembly 260 for wheels 211. While the present embodiment is shown as equipped with all of these components, the present disclosure is not intended to be limited to such a fully-equipped embodiment; rather, one of ordinary skill in the art will recognize that various embodiments of robotic apparatus 200 may include one or a combination of any of such components. FIG. 35 shows a similar embodiment of robotic apparatus 200 on a smaller diameter pipe 10.

Additional Wheels 221'

As best shown in FIG. 34A, robotic apparatus 200, in various embodiments, may further comprise additional wheels 221' on clamping drive module 220. Additional wheels 221' may be mounted in close proximity to wheels 221, at the same or similar circumferential position so as to ensure good contact with pipe 10 and to balance the normal force (due to clamping) evenly between wheels 221 and wheels 221'. In the embodiment shown, wheels 221' are mounted at axially offset positions from wheels 221 towards a center of robotic apparatus 200 so as to not increase the overall length of robotic apparatus 200. To the extent wheels 221 have angled rollers 222, the rollers 222' of wheels 221' may mirror the orientation of rollers 222 of an adjacent wheel 221, as shown. Adding additional wheels 221' may have the following benefits:

(1) Decreasing localized pressure on surface of pipe 10. A relatively high clamping force may be required to produce enough traction between the wheels 221 and the pipe 10, e.g. when the robot 200 is lifting its own weight (and the weight of a potential cable) driving up a vertical pipe 10. If that clamping force is divided between more wheels (e.g., amongst wheels 221, 221') the pressure from each wheel decreases and the robot 200 is less likely to damage the pipe 10—e.g. dent the jacketing of an insulated pipe.

(2) Cancellation of undesired forces. Undesired forces are cancelled out locally and thus there is less twisting and bending of the structural parts of the robotic apparatus 200. Wheels 221 with angled rollers 222 may work in pairs and together they can provide a force in any desired direction along the surface of pipe 10, in part by cancelling out forces in undesired directions. However, if the pair of wheels 221 are located at opposite ends of the robotic apparatus 200, the structure in between the wheels 221 may bend and twist as it transfers those loads. When a pair of wheels 221, 221' are mounted close to each other, the structure between them tends to not deform as much since the lever arms are shorter and the connecting structure can be stiffer.

(3) Greater thrust. More driving wheels allow for greater thrust. If the thrust of robotic apparatus 200 is not limited by traction, the maximum thrust (force) the robotic apparatus 200 can exert as it drives will depend on the maximum torque of each drive wheel 221 and the number of drive wheels 221. If powered (e.g., by motors 225', not shown), wheels 221' allow robotic apparatus 200 to exert more thrust.

Bumper Wheels 223

Still referring to FIG. 34A, embodiments of robotic apparatus 200 may include, on each clamping drive module 220, two freely-spinning bumper wheels 223 having freely-spinning rollers 224. In an ideal scenario, with identical biasing forces (e.g., from biasing members 233) and no friction, arm members 232 should self-center on the pipe 10 by actuating the two pivot points at the respective junctures of articulating arm members 232 and static member 231 by an equal amount. However, in reality, the robotic apparatus possibly could shift to one side without self-centering, which decreases the amount of clearance on the inside of the robotic apparatus 200 to the point where the robotic apparatus 200 may start to scrape against the pipe 10. Bumper wheels 223, in various embodiments, may serve to mitigate the effect of any side-to-side shifting by contacting and rolling along pipe 10 when such shifting occurs. The exact distance from the pipe 10 to the surface of bumper wheels 223 can be adjusted such that bumper wheels 223 do not touch the pipe 10 when robotic apparatus 200 is properly centered, but if the robotic apparatus 200 starts to shift side-to-side, then bumper wheels 223 will contact pipe 10 and ensure that a certain amount of clearance remains between the articulating arm members 232 and the surface of the pipe 10. In the embodiment shown, bumper wheels 223 has rollers 224 having rotation axes oriented perpendicular to the main axis of rotation of the main wheel portion (an "omniwheel" design) so that bumper wheels 223 may move freely both axially and circumferentially along pipe 10 without adding significant friction.

Fail-Safe Assembly 250

Robotic apparatus 200 may also be provided with fail-safe arms, such as those shown and described in the U.S. patent application Ser. No. 17/887,281 entitled "Radiography Inspection and Fail-Safe Mechanism for Pipe Traversing Robots" filed Aug. 12, 2022, which is incorporated herein in its entirety for all purposes. Such fail-safe arms may be adapted for use with robotic apparatus 200 hereof in any suitable manner including miniaturizing or making the fail-safe arms more compact to fit within a small clearance. Fail-safe arms can also be provided with different tracks of different lengths and/or curvature to fit different pipe sizes.

Figure 36C:
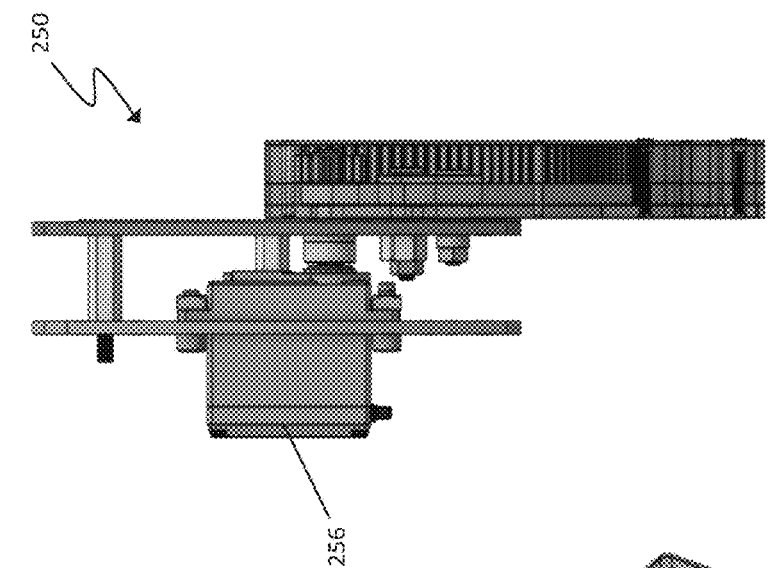
FIG. 36A, FIG. 36B, and FIG. 36C illustrate representative fail-safe mechanisms for a robotic apparatus, in accordance with an embodiment of the present disclosure.
Figure 36B:
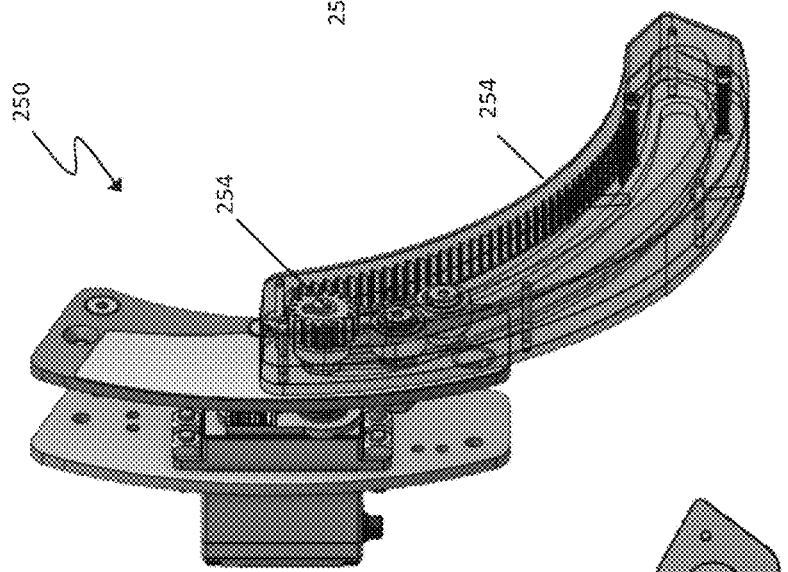
Figure 36A:
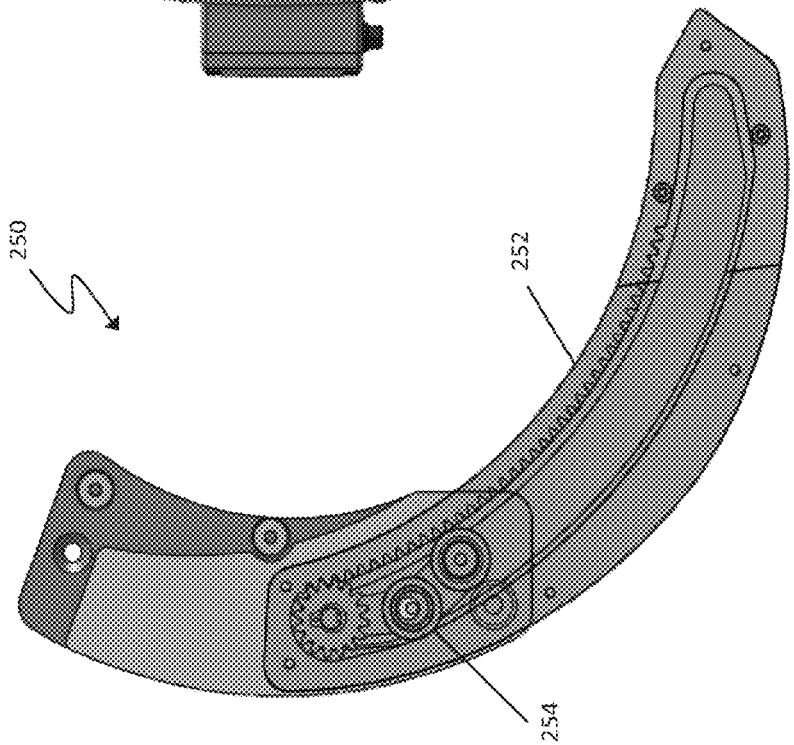

FIG. 36A, FIG. 36B, and FIG. 36C illustrate representative fail-safe mechanisms 250 for robotic apparatus 200. Fail-safe mechanism 250, in various embodiments, may comprise a curved arm 252, a guide 254, and a motor 256 configured to advance and retract curved arm 252 through guide 254. As shown, guide 254, in various embodiments, may comprise three rotational elements positioned to guide curved arm 252 along an intended pathway. The rotational elements are on the inside of the curved arm 252 which has interior surfaces designed for the bearing and spur gear to move against. This allowed for a more compact design. Movement of arm 252 may be driven by motor 256, e.g. via a spur gear configured to mate with a toothed track of curved arm 252. Similar to embodiments of clamping assembly 230, the dimensions and curvature of arm 252 may be selected to complement a diameter of pipe 10 on which robotic apparatus 200 will be secured. In an embodiment, fail-safe mechanism 250 may be considered part of the associated clamping drive module 220 such that, in order to switch to a significantly smaller or larger pipe 10, the user only needs to switch out the clamping drive module(s) 220 and they will automatically have the correctly sized fail-safe arms 252 already attached.

Figure 37:
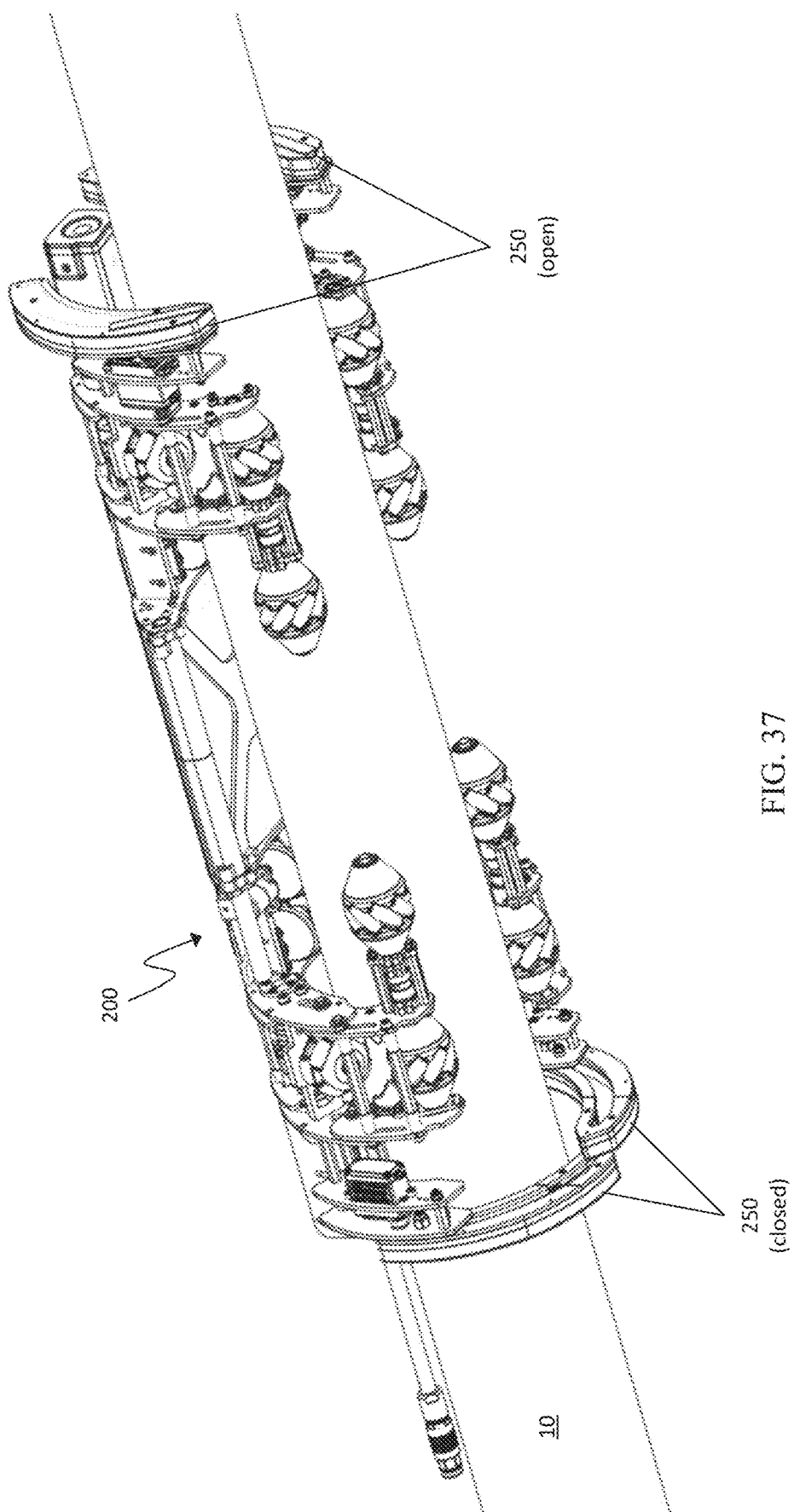
FIG. 37 illustrates a robotic apparatus having fail-safe mechanisms 250 affixed to each clamping drive module thereof, in accordance with an embodiment of the present disclosure.

FIG. 37 shows an embodiment of robotic apparatus 200 having fail-safe mechanisms 250 affixed to each clamping drive module 220 thereof. The fail-safe mechanisms 250 on the left side of the figure are shown in a closed configuration, while the fail-safe mechanisms 250 on the right side of the figure are shown in an open configuration. Generally speaking, fail-safe mechanisms 250 are closed when traversing pipe 10 so as to prevent robotic apparatus 200 from falling off in the event it slips; however, fail-safe mechanisms 250 can be opened when traversing an obstacle such that the obstacle can pass through the open side of robotic apparatus 200.

Spring-Loaded Wheel Assembly 260

Figure 38:
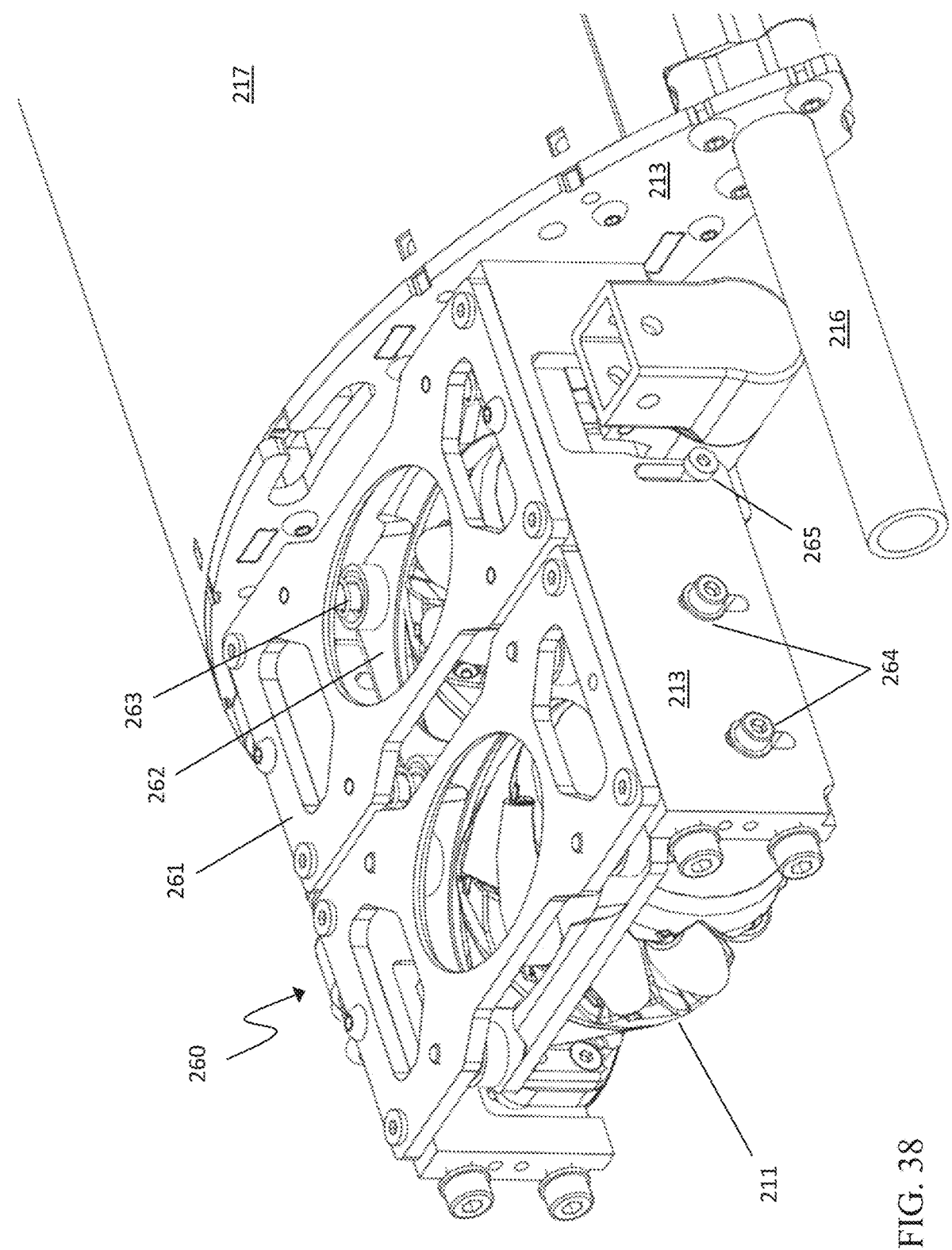
FIG. 38 illustrates a perspective view of a spring-loaded assembly for biasing a subset of wheels of a center drive module of robotic apparatus 200 towards the surface of a pipe, in accordance with an embodiment of the present disclosure.

FIG. 38 illustrates a perspective view of a spring-loaded assembly 260 for biasing a subset of wheels 211 of center drive module 210 towards the surface of pipe 10. Instead of mounting all wheels 211 rigidly to frame 213 of center drive module 210, spring-loaded wheel assembly 260 may be included to bias a subset of wheels 211 (here, two of the four wheels 211) against pipe 10, thereby allowing the biased wheels 211 to travel downwards and upwards relative to the surface of pipe 10. Biasing a subset of wheels 211 ensures that all wheels 211 stay in contact with pipe 10 even as robotic apparatus 200 traverses over obstacles or drives over an uneven surface, thereby improving traction. In some embodiments, it may be preferable to bias only a subset of wheels 211 so as to maintain a certain distance between the center drive module 210 and pipe 10. This could be achieved by biasing all wheels 211; however, such a configuration would require very accurate balancing against the biasing forces generated by clamping drive module 220 for all pipe sizes. In the example shown, the two outermost wheels 211 are rigidly mounted and dictate the distance to the pipe 10. The two innermost wheels 211 are biased using spring-loaded wheel assembly 260 because it tends to keep the center drive module 210 more stable and decreases the amount of tilting due to obstacles and uneven surfaces. The biasing forces may be selected based on the anticipated normal force, which depends on the clamping force from clamping modules 220. The normal force from center drive module 220 may should ideally be evenly distributed between the four wheels 211 to enable a high overall clamping force without causing excessive pressure from an individual wheel 211 that can damage the pipe.

Spring-loaded assembly 260 may be coupled to frame 213 or share components of frame 213. Spring-loaded assembly 260, in various embodiments, may generally comprise a static member 261 and a travelling member 262 there below, separated by a biasing member 263 such as a spring. Wheel 211 may be mounted to travelling member 262 and, as configured, biasing member pushes off of static member to push travelling member 262—and thus wheel 211—towards the surface of pipe 10. Travelling member 262, in various embodiments, may be mounted on a track 265 or other structure configured to guide the movement of travelling member 262 in an up and down direction (i.e., radially relative to pipe 10). One or ordinary skill in the art will recognize, based on the teachings of the present disclosure, alternative mechanisms capably of biasing certain wheels 211 toward the surface of pipe 10 and the present disclosure is not intended to be limited to any particular embodiment.

Encoder Wheels 246

Figure 39B:
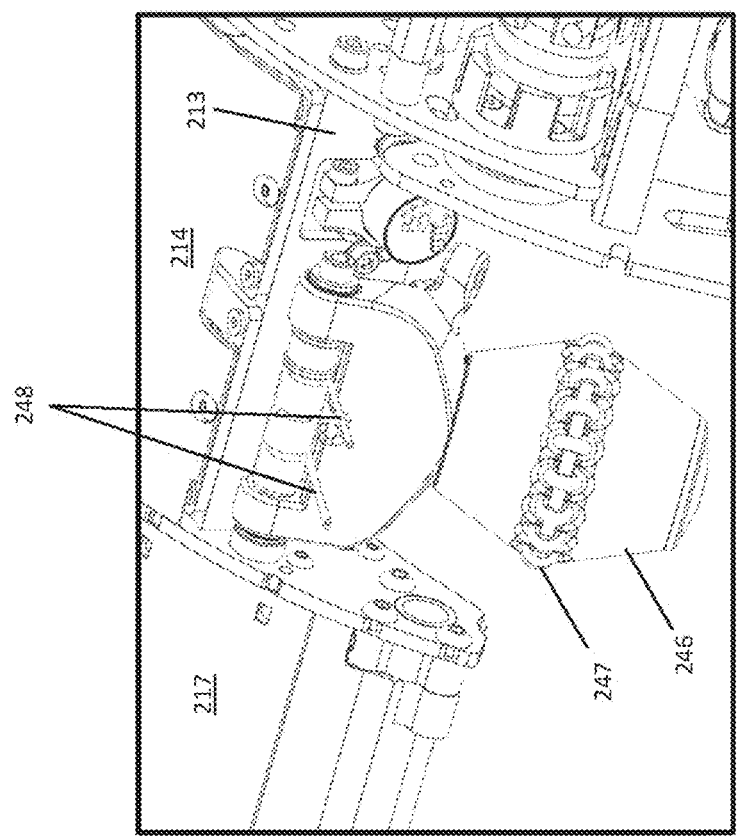
FIG. 39A and FIG. 39B illustrate first and second encoder wheels configured to track the circumferential and axial motion of robotic apparatus on a pipe, respectively, in accordance with an embodiment of the present disclosure.
Figure 39A:
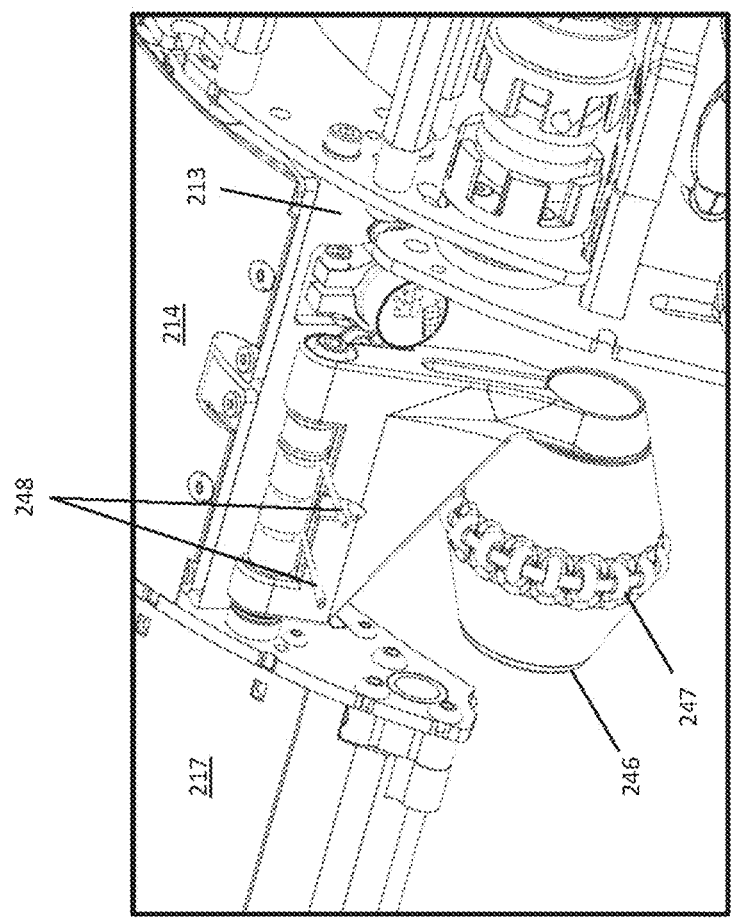

FIG. 39A and FIG. 39B illustrate first and second encoder wheels 246 configured to track the circumferential and axial motion of robotic apparatus 200 on pipe 10, respectively. The encoder wheel 246 of FIG. 39A is mounted with its main rotation axis parallel to the longitudinal axis of pipe 10 such that this encoder wheel 246 rotates when moving circumferentially about pipe 10. Conversely, the encoder wheel 246 of FIG. 39B is mounted with its main rotation axis perpendicular to the longitudinal axis of pipe 10 such that this encoder wheel 246 rotates when moving axially along pipe 10. Encoder wheels measure the number of times the wheel rotates and thus distance travelled in a particular direction can be calculated based on the known diameter of the encoder wheel. In various embodiments, encoder wheels 246 may be coupled to center drive module 210 (e.g., to frame 213 thereof, as shown) rather than to clamping module(s) 220 such that they remain when swapping out clamping drive modules 220.

Encoder wheels 246 each include a plurality of rollers 247 about a circumference of the main wheel along the contact surface. In the embodiment shown, rollers 247 rotate in a direction perpendicular to the direction of rotation of the main wheel portion (e.g., an "omniwheel" design), thereby allowing encoder wheels 246 to slide along the surface of pipe 10 with minimal friction in a direction not necessarily aligned with the direction of rotation of the main wheel portion. In various embodiments, encoder wheels 246 may have conical endcaps, as shown, so that the overall shape of the encoder wheel 246 approximates a bicone. The sloped sides of these endcaps act as ramps and ease the transition over various obstacles along the pipe surface.

Encoder wheels 246, in various embodiments, may comprise a biasing mechanism (e.g., torsional spring and hinge, as shown) 248 for biasing encoder wheels 246 towards the surface of pipe 10. Biasing encoder wheels 246 in this manner ensures good contact between encoder wheels 246 and the surface of pipe 10 within the full range of pipe sizes that the robotic apparatus 200 was designed for.

Miscellaneous

Referring back to FIG. 34A, FIG. 34B, and FIG. 34C, a camera 244, in various embodiments, may be mounted to one side of robotic apparatus 200—e.g., on the opposing side of robotic apparatus 200 on which sensor 240 is mounted. Camera 244, in an embodiment, may point in an axial direction along pipe 10 so as to help a user (or automated control system with computer vision) navigate as it traverses pipe 10. In an embodiment, a mirror can be mounted at the end of the camera to redirect the field of view to look down at the surface of pipe 10.

Robotic apparatus 200, in various embodiments, may additionally or alternatively comprise one or more stiffening rods 226. Stiffening rods 226 may extend between and connect clamping drive modules 220, and serve to increase the stiffness of the overall structure of robotic apparatus 200 and thereby minimize bending of clamping drive modules 220 under various loads. In the embodiment shown, stiffening rods 226 extend between the distal ends of static members 231 of clamping assemblies 230 such that each is circumferentially offset from center drive module 210 so as to better counteract bending moments on clamping assemblies 230. The ends of stiffening rods 226 may be detachable from clamping assemblies 230 such that clamping drive modules 220 can be easily swapped in and out. Stiffening rods 226, in various embodiments, may also serve as handles for carrying robotic apparatus 200 and/or manipulating robotic apparatus 200 during installation on pipe 10.

Robotic apparatus 200, in various embodiments, may additionally or alternatively comprise covers 214 for covering wheels 211 of center drive module 210. These covers 214 can help protect cables and improve aesthetics of robotic apparatus 200.

Robotic apparatus 200, in various embodiments, may additionally or alternatively comprise one or more handles 216 for carrying robotic apparatus 200 and/or manipulating robotic apparatus 200 during installation on pipe 10. While only one can be seen, robotic apparatus 200 may comprise two handles 216—one on each end of center drive module 210.

Figure 40:
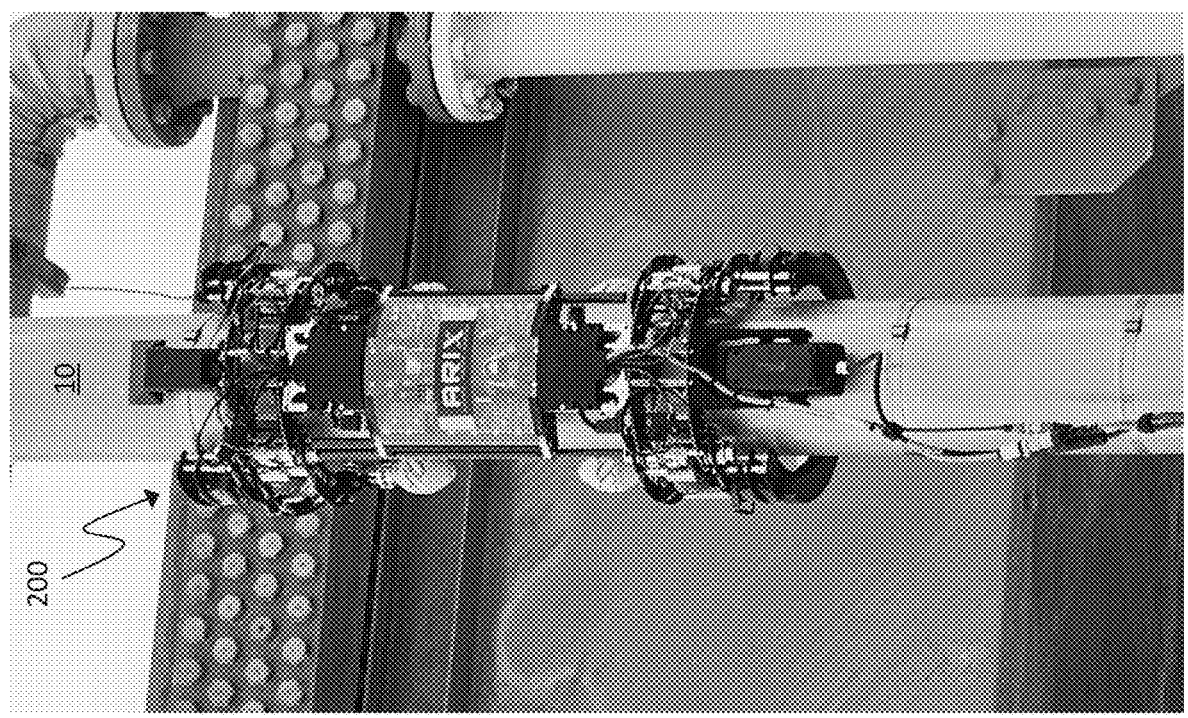
FIG. 40 shows a prototype of a robotic apparatus on a vertical pipe, in accordance with an embodiment of the present disclosure.

FIG. 40 shows a prototype of robotic apparatus 200 on a vertical pipe 10.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A robotic apparatus, comprising:
a first wheel and a second wheel coupled by a frame and configured to be positioned on an outer surface of a pipe, each wheel including a plurality of rollers disposed about a circumference of the wheel;
a third wheel and a fourth wheel configured to be positioned on the outer surface of the pipe at locations circumferentially offset from the first wheel and the second wheel, each wheel including a plurality of rollers disposed about a circumference of the wheel;
a clamping assembly coupled to the frame, the clamping assembly coupling the third wheel and the fourth wheel and configured to apply a force for urging the first, second, third, and fourth wheels towards an outer surface of the pipe for securing the robotic apparatus to the pipe; and
wherein an axis of rotation of the first and second wheels are configured to be perpendicular to a longitudinal axis of the pipe when the robotic apparatus is secured to the pipe, and
wherein an axis of rotation of the third and fourth wheels are configured to be parallel to a longitudinal axis of the pipe when the robotic apparatus is secured to the pipe.

2. The robotic apparatus of claim 1, wherein each of the plurality of rollers on each of the wheels are configured to freely rotate about a rotation axis of the respective roller.

3. The robotic apparatus of claim 1, wherein the first and second wheels are configured to contact the outer surface of the pipe at different longitudinal positions along a length of the pipe and be aligned at a common circumferential position along the outer surface of the pipe when positioned on the surface of the pipe.

4. The robotic apparatus of claim 1, wherein the first and second wheels are configured to contact a first one-third portion of the circumference of the outer surface of the pipe, and the third wheel and the fourth wheel are configured to contact second and third one-third portions of the circumference of the outer surface of the pipe, respectively.

5. The robotic apparatus of claim 1, wherein the clamping assembly comprises:
a static member rigidly attached to the frame, and
a first articulating arm member having a proximal end rotatably coupled to the static member and a second articulating arm member having a proximal end rotatably coupled to the static member, wherein the first articulating arm member and the second articulating arm member are configured to extend around opposing sides of the pipe,
wherein the third wheel is coupled to a distal end of the first articulating member and the fourth wheel is coupled to a distal end of the second articulating member.

6. The robotic apparatus of claim 5, wherein the clamping assembly further comprises one or more biasing members configured to generate moments on the first articulating arm member and the second articulating arm member about their respective rotatable couplings with the static member for urging the third wheel and the fourth wheel towards the outer surface of the pipe for securing the robotic apparatus to the pipe.

7. The robotic apparatus of claim 5,
wherein the frame is configured to position the first and second wheels on a first one-third portion of the circumference of the outer surface of the pipe, and
wherein a length of the first articulating arm member and a length of the second articulating arm member are configured to position the third wheel and the fourth wheel on second and third one-third portions of the circumference of the outer surface of the pipe, respectively.

8. The robotic apparatus of claim 5, wherein a length of the first articulating arm member and a length of the second articulating arm member are configured to be adjusted so as to adjust a position of the third wheel and a position of the fourth wheel on the outer surface of the pipe.

9. The robotic apparatus of claim 1,
wherein the first and second wheels are configured to contact the outer surface of the pipe at different longitudinal positions along a length of the pipe and be aligned at a common circumferential position along the outer surface of the pipe when positioned on the surface of the pipe.

10. The robotic apparatus of claim 9, wherein the first and second wheels are configured to contact a first one-third portion of the circumference of the outer surface of the pipe, and the third wheel and the fourth wheel are configured to contact second and third one-third portions of the circumference of the outer surface of the pipe, respectively.

11. The robotic apparatus of claim 1,
further comprising a fifth wheel and a sixth wheel configured to be positioned on an outer surface of the pipe at locations circumferentially offset from the first wheel and the second wheel; and
a second clamping assembly configured to apply a force for urging the fifth wheel and the sixth wheel towards the outer surface of the pipe for securing the robotic apparatus to the pipe.

12. The robotic apparatus of claim 1,
wherein the first wheel, the second wheel, and the frame define a first module,
wherein the third wheel, the fourth wheel, and the clamping assembly define a second module, and
wherein the clamping assembly of the second module is removably coupled to the frame of the first module.

13. The robotic apparatus of claim 12,
wherein the clamping assembly comprises first and second articulating arm members configured to extend around opposing sides of the pipe, and
wherein the third wheel is coupled to a distal end of the first articulating arm member and the fourth wheel is coupled to a distal end of the second articulating arm member.

14. The robotic apparatus of claim 13, wherein a length of the first articulating arm member and a length of the second articulating arm member are configured to be adjusted so as to adjust a position of the third wheel and a position of the fourth wheel on the outer surface of the pipe.

15. The robotic apparatus of claim 12,
further comprising a third module configured to removably couple to the first module, the third module comprising:
   a fifth wheel and a sixth wheel configured to be positioned on an outer surface of a second pipe having a different diameter than that of the pipe at corresponding circumferential locations on the outer surface of the second pipe as those on the outer surface of the first pipe, each wheel including a plurality of rollers disposed about a circumference of the wheel; and
   a second clamping assembly configured to apply a force for urging the fifth wheel and the sixth wheel towards the outer surface of the pipe for securing the robotic apparatus to the pipe,
wherein the second module is configured to be detached from the first module, and the third module is configured to be removably attached to the first module so as to accommodate the diameter of the second pipe.

16. The robotic apparatus of claim 12, further comprising a third module removably attached to the first module, the third module comprising:
   a fifth wheel and a sixth wheel configured to be positioned on an outer surface of the pipe at locations circumferentially offset from the first wheel and the second wheel, each wheel including a plurality of rollers disposed about a circumference of the wheel; and
   a second clamping assembly configured to apply a force for urging the fifth wheel and the sixth wheel towards the outer surface of the pipe for securing the robotic apparatus to the pipe.

17. The robotic apparatus of claim 15 or claim 16,
wherein the first module further comprises a seventh wheel and an eighth wheel, each wheel including a plurality of rollers disposed about a circumference of the wheel, and
wherein the seventh wheel and the eighth wheel are configured to be positioned on the outer surface of the pipe at positions axially offset from the positions of the first wheel and the second wheel.

* * * * *